(12) United States Patent
Cordua

(10) Patent No.: US 10,900,579 B2
(45) Date of Patent: Jan. 26, 2021

(54) RISER VALVE MANIFOLD

(71) Applicant: Paul M. Cordua, Lindsay, CA (US)

(72) Inventor: Paul M. Cordua, Lindsay, CA (US)

( * ) Notice: Subject to any disclaimer, the term of this patent is extended or adjusted under 35 U.S.C. 154(b) by 32 days.

(21) Appl. No.: 16/355,510

(22) Filed: Mar. 15, 2019

(65) Prior Publication Data

US 2019/0293194 A1 Sep. 26, 2019

Related U.S. Application Data

(60) Provisional application No. 62/646,306, filed on Mar. 21, 2018.

(51) Int. Cl.
| | | |
|---|---|---|
| *F16K 15/04* | (2006.01) | |
| *B05B 1/30* | (2006.01) | |
| *B05B 15/74* | (2018.01) | |
| *A01G 25/00* | (2006.01) | |

(52) U.S. Cl.
CPC .............. *F16K 15/04* (2013.01); *B05B 1/302* (2013.01); *B05B 15/74* (2018.02); *A01G 2025/006* (2013.01)

(58) Field of Classification Search
CPC ......... F16K 15/04; B05B 1/302; B05B 15/74; Y10T 137/6045
See application file for complete search history.

(56) References Cited

U.S. PATENT DOCUMENTS

| | | | | |
|---|---|---|---|---|
| 2,287,633 A * | 6/1942 | Newcum | ................ | F16L 41/03 137/343 |
| 3,760,842 A * | 9/1973 | Mikiya | ................ | F16L 41/02 137/557 |
| 4,708,162 A * | 11/1987 | Bayat | ................ | A01G 25/162 137/382 |
| 5,297,635 A * | 3/1994 | McHugh | ................ | A62C 35/68 169/16 |
| 5,381,902 A * | 1/1995 | Dumser | ................ | F24D 3/1066 137/377 |
| 5,720,351 A * | 2/1998 | Beukema | ................ | A62C 35/62 169/16 |
| 6,070,539 A * | 6/2000 | Flamme | ................ | A01C 21/005 111/177 |
| 6,076,545 A * | 6/2000 | Cooper | ................ | A62C 35/68 137/360 |
| 6,601,604 B1 * | 8/2003 | Cooper | ................ | A62C 37/50 137/269 |
| 6,860,331 B2 * | 3/2005 | Hagen | ................ | A62C 35/68 169/16 |
| 7,063,276 B2 * | 6/2006 | Newton | ................ | A01C 23/04 239/146 |
| 7,237,568 B2 * | 7/2007 | Cooper | ................ | A62C 37/50 137/377 |
| 7,293,576 B2 * | 11/2007 | Royse | ................ | F16K 15/066 137/218 |
| 9,265,980 B2 * | 2/2016 | Johnson | ................ | F16K 31/54 |
| 9,462,750 B2 * | 10/2016 | Cavkusic | ................ | A01D 57/01 |
| 9,568,138 B2 * | 2/2017 | Arizpe | ................ | E21B 41/00 |

(Continued)

*Primary Examiner* — Kevin R Barss
(74) *Attorney, Agent, or Firm* — Fulwider Patton LLP

(57) ABSTRACT

A ball valve for controlling the flow of water to a drip hose is provided. The ball valve includes a manifold including a manifold inlet configured to attach to a riser hose, and one or more valves integrated with the manifold. One or more outlet fittings are attached to each valve adjacent to each valve outlet.

4 Claims, 91 Drawing Sheets

(56) References Cited

U.S. PATENT DOCUMENTS

| | | | |
|---|---|---|---|
| D803,985 S * | 11/2017 | Yung | D23/233 |
| 2014/0251474 A1 * | 9/2014 | Oltman | F16K 17/00 |
| | | | 137/614.2 |
| 2016/0025231 A1 * | 1/2016 | Watanabe | F16K 5/0647 |
| | | | 251/279 |
| 2016/0208936 A1 * | 7/2016 | Gomi | F16K 5/0694 |
| 2016/0319940 A1 * | 11/2016 | Funato | F16K 5/06 |
| 2016/0369908 A1 * | 12/2016 | Kurincak | F16K 5/0642 |
| 2017/0138504 A1 * | 5/2017 | Hoots | F16K 5/0689 |

* cited by examiner

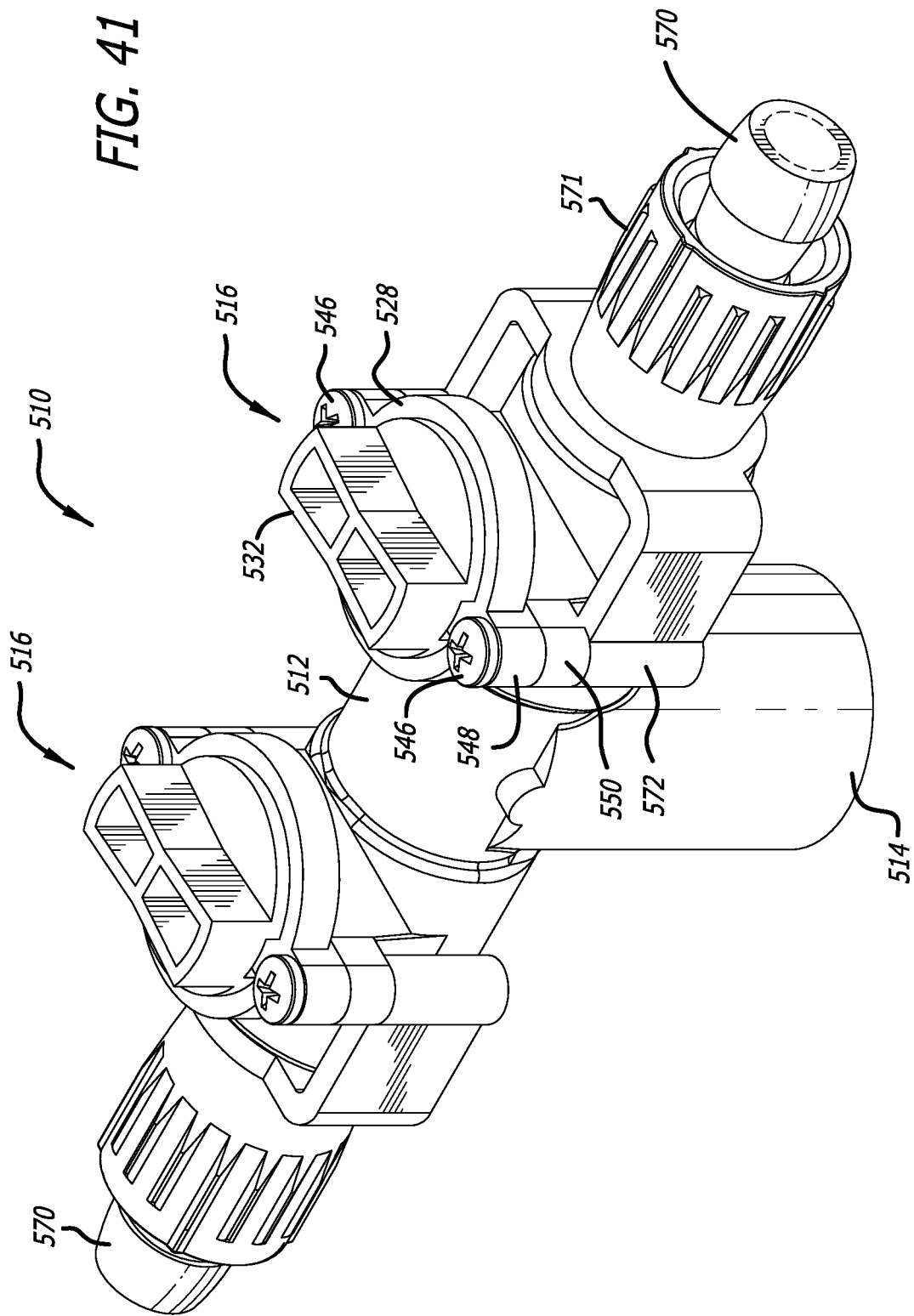

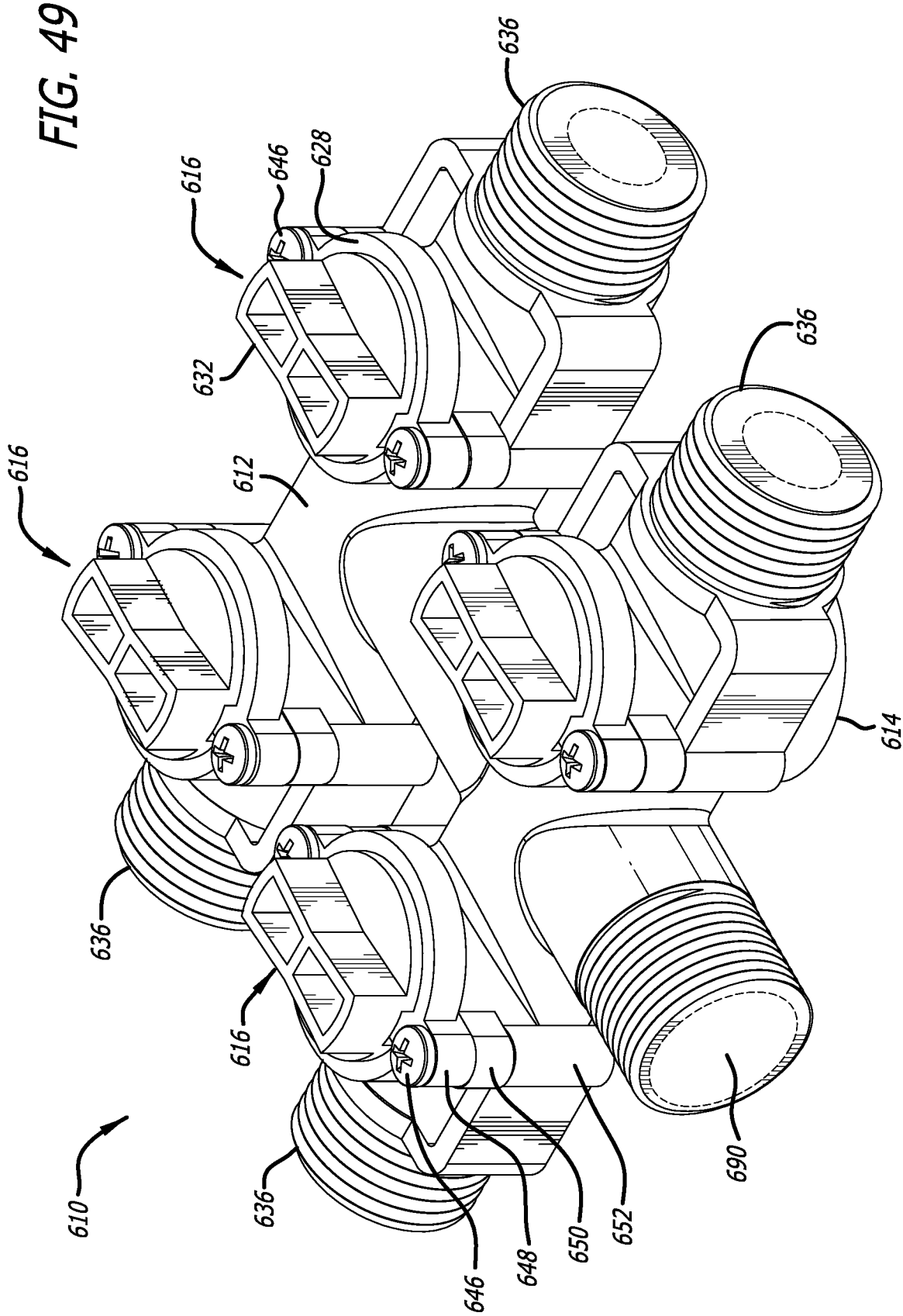

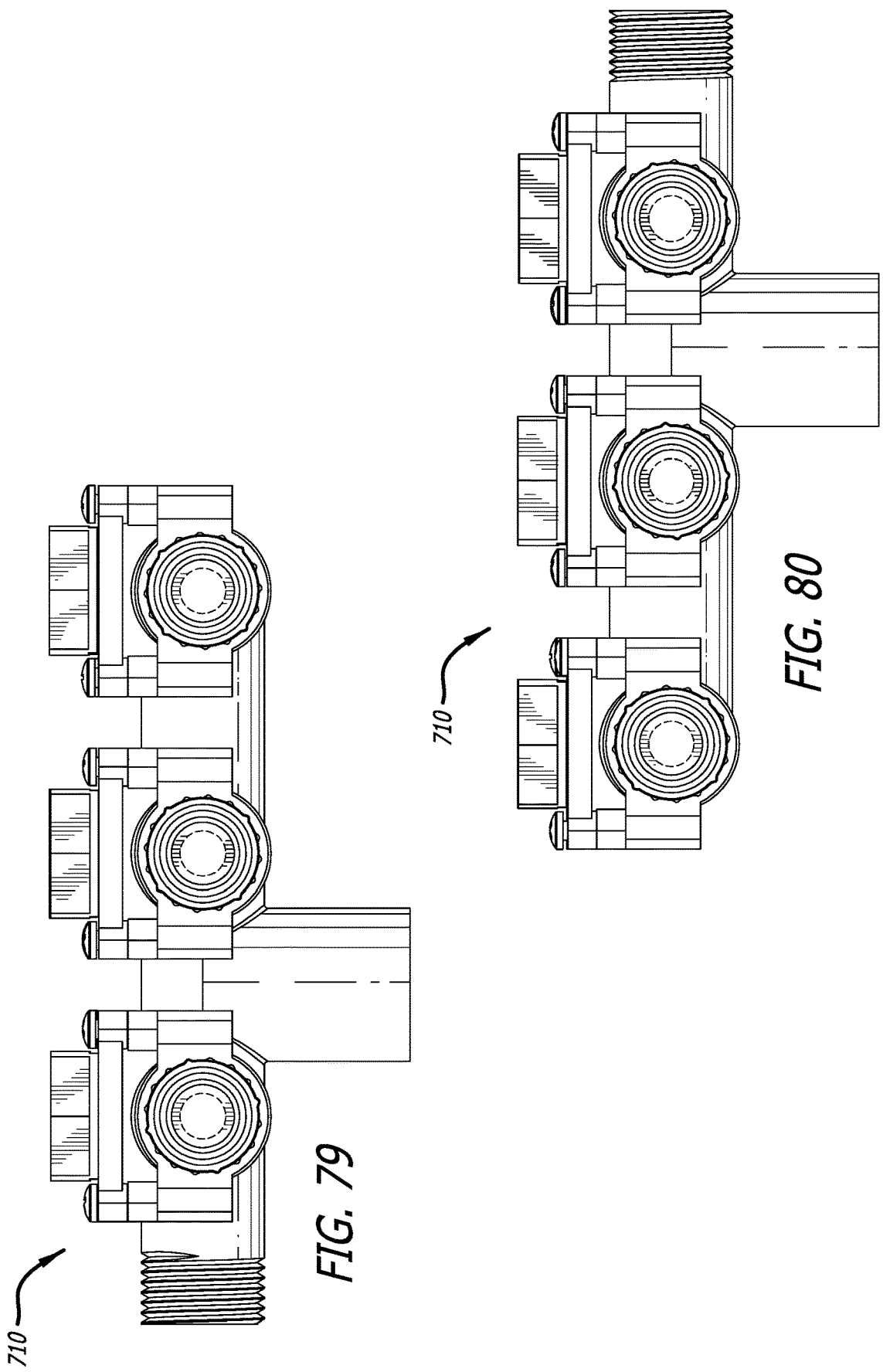

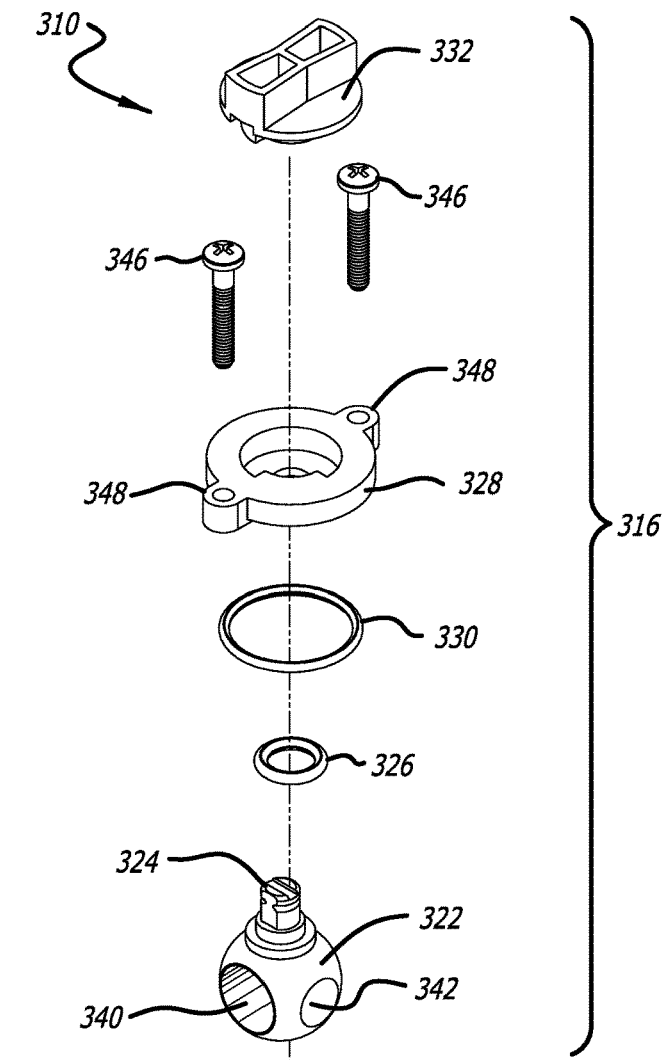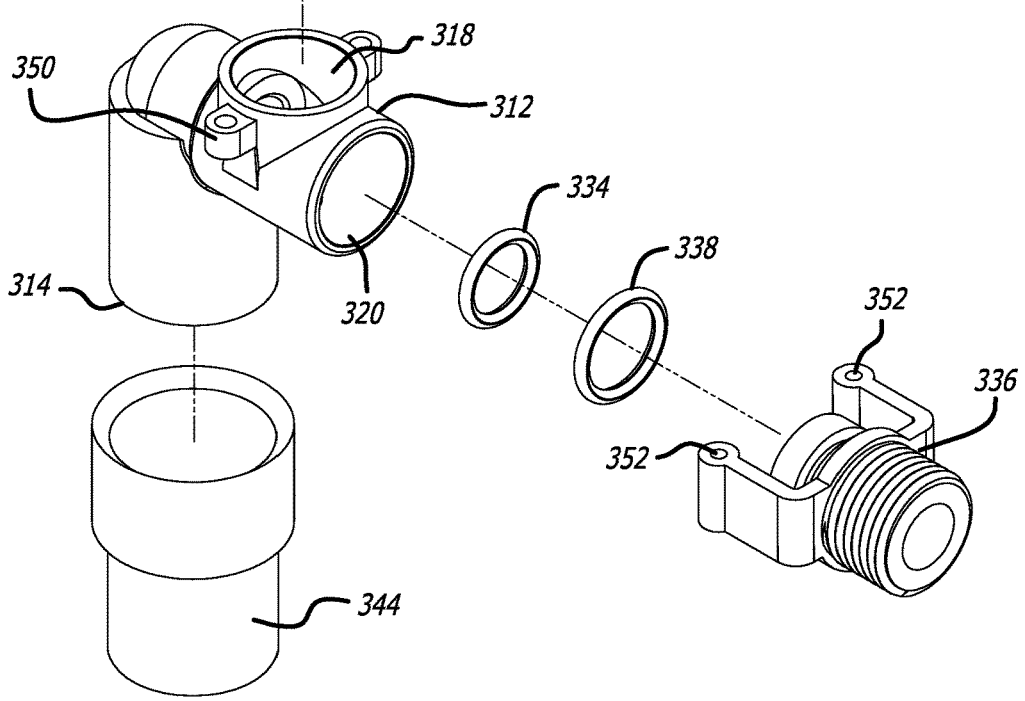
FIG. 97

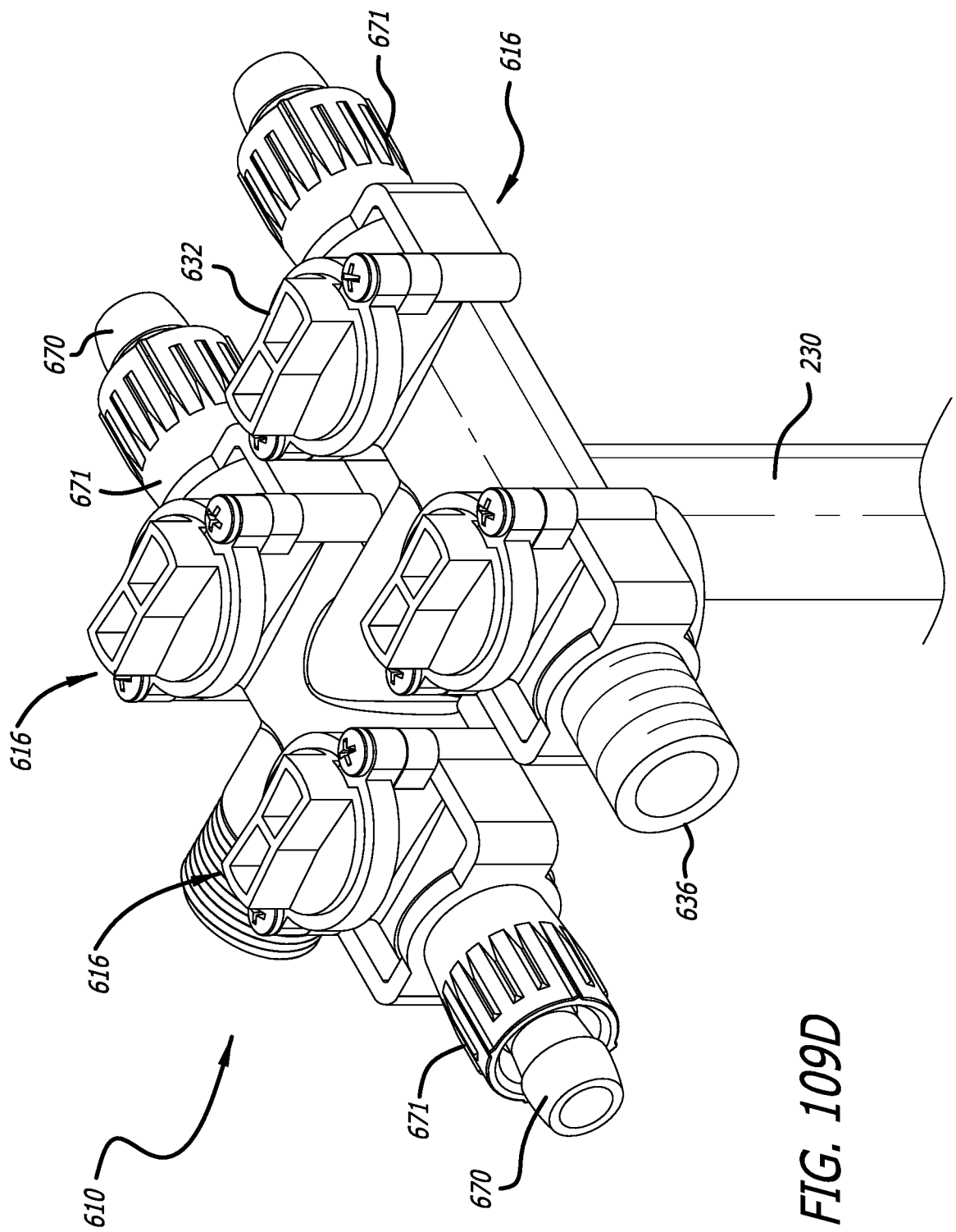

RISER VALVE MANIFOLD

CROSS-REFERENCES TO RELATED APPLICATIONS

This application claims priority from U.S. Ser. No. 62/646,306, filed Mar. 21, 2018, the contents of which are fully incorporated by reference herein.

BACKGROUND

In the agricultural and landscape turf industry, drip, low flow and micro irrigation is one primary way to irrigate crops and plants in order to save water, as compared with high flow sprinklers or flood irrigation. Presently, many hose fittings comprise ¾" female-end and male-end hose fittings. The ¾" female hose fittings have a hose washer inserted into the fitting that, when attached to a male end, prevents the fitting from leaking. These fittings are designed to be hand tightened without the use of a tool. Over time, in many cases the hose washer "sets," becoming more rigid which leads to leakage, and the fitting must be tightened with a tool or replaced to prevent leaking.

Referring to FIG. 109, prior art agricultural installations of a drip irrigation system for trees or crops, two hoses or drip lines 110 normally stretch down the outer boundaries of each row of trees 120. Drip emitters (not shown) are attached to the drip hose 110 at predetermined, fixed intervals between 12" and 36". A pipeline connected to a water source (not shown) is buried within the field for attachment to these hoses or drip lines 110. A tee 130 or saddle is attached to the pipeline at each row of trees where the drip lines 110 or hoses are located. A riser hose 140 pipe (a "riser") is further attached to the tee or saddle which extends from the buried pipeline to the surface of the ground.

FIG. 109C illustrates a traditional "dual line" drip hose 210 used to irrigate trees on a field. Presently, a male hose thread by socket fitting ("riser fitting" 220) is attached to the riser 230 by way of solvent welding or adhesive. A tee 240 is attached to the riser fitting 220 and includes an inlet 242 of ¾" female hose thread with washer (not shown) and two outlets 244 with male hose threads, facing in opposite directions. Each male hose thread 244 of the tee 240 is attached to a ball valve 250. The ball valves 250 each have a ¾" female hose thread inlet 252 with washer (not shown) and a male hose thread outlet 254. Each ball valve outlet 254 is attached to a tee 260 having a ¾" female hose thread inlet 262 with hose washer (not shown) and two outlets 264 with barb and tightening nuts (not shown). Each tee outlet 264 connects to the hose or drip line 110 installed along the row of trees or vines.

Since the ¾" female ends 242, 252, 262 can swivel, they need to be tightened and adjusted to be straight and level. This process takes labor and time. As can be seen, the assembly of the "dual line" drip hose 210 combines six different fittings (i.e. one riser fitting 220, one tee 240, two ball valves 250, and two tees 260) with five ¾" female hose swivels and hose washers that will eventually have to be tightened or replaced to prevent leaking in the future.

In some cases, a third hose or drip line may be desired for frost protection or extra irrigation in hot weather. In the traditional "dual line" drip hose 210 of FIG. 109C, such installation would require additional fittings to be added for attaching the third drip line or hose. For example, the user may be required to install an additional tee 240, set of two ball valves 250, and two tees 260. This could result in a total of around eleven fittings for the assembly, with around eight ¾" female hose thread swivels.

In the above example of FIGS. 109A-C, each ball valve 250 controls the flow of water to its respective drip line or hose 110 heading in opposite directions along the row of trees 120. In the case of the third drip line or hose, an additional ball valve controls the flow of water to the third drip line heading in both directions.

If any of these fittings or valves were to leak, the defective part(s) would need to be replaced by disassembling the connecting hoses and fittings, swapping the defective part(s), and reassembling the connecting hoses and fittings. This process can be labor-intensive to perform, especially if the part which needs to be replaced is common to multiple hoses and fittings. Additionally, care must be taken when choosing an original or replacement fitting to ensure that the fitting is sized to precisely match the drip tubing used; otherwise, a variety of problems like leaks, blow-outs, or stripped threads on fittings may result from mismatching. Extra care and expense would need to be taken in the case of multiple fitting arrangements.

In another example relating to vineyards of grapes or other vine-type produce, the riser 230 is in each row of vines. A male hose thread by socket fitting (riser fitting 220) is attached to the riser 230. The ball valve 250 is then attached to the male thread 220 by a ¾" female hose thread 252 with hose washer. The tee 260 with a ¾" female hose thread 262 with hose washer is then attached to the ball valve outlet 254. Finally, the drip lines or hoses 110 are attached to each side of the tee 260 by a barb and nut.

In turf landscape where drip or low flow irrigation is used, the installation can be similar, or more complex.

In typical irrigation systems, as one or more drip lines are attached to a valve that operates the irrigation system, multiple fittings commonly known as manifolds must be used to connect the one or multiple drip lines or hoses to the valve. These manifolds may be assembled similarly to those in agricultural systems, or may be glued together with PVC pipe fittings. This latter process entails cutting pipe and adhering (e.g. gluing) all the fittings together to make enough outlets to connect all the drip lines or hoses to the manifold.

The ball valves typically used in these agricultural and landscape systems, such as ball valve 250, are generally composed of a body, a ball, O-rings, ¾ female hose thread swivels, hose washers, male threads usually molded on the body, a handle, and a screw to hold the handle on the ball.

To assemble the ball valve 250, the ball is inserted into the body through an inlet of the body. The diameter of the inlet is limited in size because of the limitations of the diameter of the ¾" female hose thread swivel. The ball is generally small and limits the flow of water. In bigger ball valves, the diameter of the inlet is larger and an extra fitting must be used in the assembly of the ball valve to attach the female hose thread swivel onto the ball valve. An O-ring is assembled onto the stem of the ball and is located inside the body. The handle is attached to the stem and a screw is inserted into a hole in the stem of the ball. However, in many cases, if the screw is not screwed in straight it will split the stem of the ball and cause a leak and destroy the valve. Moreover, once assembled, it is generally impossible to remove the ball to service the O-ring in case of failure. If failure occurs, the ball valve must be replaced.

In some instances, a filter screen (not shown) may also need to be installed on the outlet of the riser 230 before the fittings (220, 240, 250, 260) are installed. Installation of the filter screen would require one or more additional fittings to be used.

There is a need for a riser manifold which solves and improves upon the above-mentioned type of systems.

SUMMARY OF THE INVENTION

The present invention is directed to a manifold system which incorporates an inlet that attaches directly to the riser, and individual ball valves molded on the manifold having individual outlets of any size that can be mixed with any size of drip lines or hoses. Typical hose or drip line sizes range from ¼" to 1" in diameter. In some cases where the riser and pipeline are located in an orchard, with one drip line or hose size of ½" running in one direction and ¾" running in the other direction, the present invention is capable of having these two or more different sizes on the riser manifold without any reducing fittings. Where a third dripline or hose is required, this dripline or hose generally has a larger diameter than that of the other driplines or hoses since it is required to carry more water than the other two drip lines or hoses for micro sprinkler or micro jets. These micro sprinkler or micro jets are generally used for frost protection or adding more water to the tree or vine quickly. Thus, a larger outlet fitting can be on the third outlet of the riser manifold.

The ball valve is a large ball and is capable of more flow of water than the above-described ball valves of traditional irrigation systems. The ball valve of the present invention is completely serviceable in the field. All the components of the manifold system can be changed in the field to repair the product, without the need for replacing the entire product unless the manifold body itself is damaged.

In the above-described, prior art ball valves in traditional irrigation systems, the ball is inserted into the ball valve through the inlet side of the valve body, and there is an O ring on the outlet side of the valve body against which the ball presses to seal the valve in the off position. In contrast, the present invention's manifold with valves does not allow the ball to be inserted from the inlet side of the valve; rather, the ball is inserted from the top of the valve. An O ring is subsequently inserted on the stem of the ball, and a seal cap is then placed over the ball and O ring. An O ring is also on the seal cap. Two or more screws or bolts are then used to hold the seal cap in place to the ball valve, and the handle is then "snapped" on the stem of the ball.

These two or more screws or bolts serve more than one purpose. In addition to holding the seal cap in place, these screws also hold the outlet of the valve in place, which can be tailored to any size of drip line or hose. Additionally, since the present invention allows the handle to snap on, it does not require a screw to be bored into the stem of the ball as in the above-described traditional ball valves.

In one exemplary embodiment of the present invention, a six-outlet manifold (or six-way ball valve) is provided. The two outer outlets on both sides of the manifold serve drip lines, and the middle outlets on both sides of the manifold each serves a micro sprinkler hose. The outer outlets could be sized for a ½" diameter dripline, and the middle outlet could be sized for a ¾" hose. In some cases where the length of the field from the riser is shorter on one side of the riser and longer on the other side of the riser, different sized outlets can be used. For example, on one side of the manifold, one outer outlet going in one direction could be sized for a ⅜" diameter drip line, while the other outer outlet going in the opposite direction could be sized for a ⅝" dripline. The same size differences are present on the other side of the manifold. Additionally, the middle outlets could be also have two different sizes of dripline or hose, as needed for the flow of water required. This capability of the present invention will save money on the purchase of smaller diameter driplines or hoses for the owner of the property.

The present invention's manifold system with valves on all outlets allows for energy savings compared to prior manifolds. This advantage is illustrated, for example, by an exemplary embodiment of the present invention's four-outlet manifold (or four-way ball valve). In contrast to the traditional four-outlet manifold such as that shown in FIG. 109C, which uses a single valve to control the flow of water for both directions of a single drip line, an exemplary embodiment of the four-outlet manifold of the present invention allows half the water to travel through one valve only in a single direction of the drip line, thus reducing friction loss through the valve. Reduced friction loss allows for the system to run at a lower pressure than in the traditional, prior art four-outlet manifold of FIG. 109C, thus saving energy at the pumping station and cost.

The present invention can also be adapted to prior art manifolds. For example, the end user may convert the prior four-outlet manifold 210 illustrated in FIG. 109C into a four-outlet system using two, two-outlet riser manifolds (or two-way ball valves) according to another exemplary embodiment of the present invention. These two-outlet riser manifolds each include a tee which would connect to a valve 250 on the two-outlet manifold 210 with the two or more screws, eliminating all the ¾" female hose swivels and hose washers. The dripline or hoses would connect to the outlets of the tee, resulting in a four-outlet manifold with only two valves.

The riser manifold of the present invention completely eliminates all the ¾" female swivel connections with hose washers generally present in prior art manifolds. This elimination is advantageous since all these hose washers are prone to leak, wasting precious water, and generally need to be replaced.

The riser manifold of the present invention also aids in flushing the entire system. If the system becomes contaminated with a possibility of plugging up the drip emitters on the drip lines, the present invention allows for all the valves to be shut off. A flush cap of the riser manifold can be removed, and water can be run through the system flushing all contaminates. The cap can subsequently be reinstalled and the valves turned back on, allowing clean water to flow through the drip lines.

Two or more riser manifolds of the present invention can be connected together to create more outlets as required.

In a preferred embodiment, the present invention may also comprise a standard, standalone ball valve.

The present invention's unique assembly system of allowing the ball to be inserted into the ball valve from the top and using two or more screws to hold the top seal plate and the valve outlets onto the manifold, provides a higher flow valve than that of prior manifolds and the option of using multiple size outlets without the need for additional fittings as required in prior manifold systems.

In a preferred embodiment of the present invention, the riser manifold can have side inlet which allows a filter screen to be installed in the middle of the manifold, without the need for additional fittings. This design allows for the manifold to be flushed simply by removal of the filter screen, or alternatively without removal of the filter screen at all. No additional fittings are needed for the filter screen in the present invention, in contrast to prior manifold systems.

Therefore, the present invention is significantly advantageous over prior manifold systems for at least the following reasons: (1) the ball is inserted from the top of the valve as opposed to the inlet, allowing for the ball to have a larger orifice to enable more water flow; (2) the handle for the ball valve is snapped rather than screwed onto the manifold, eliminating the chance of splitting the ball stem and damaging the ball valve beyond repair; (3) the ball valve's two or more screws serve dual purposes of not only keeping the seal plate tight but attaching a variety of outlets to the manifold; (4) the riser manifold can include a filter screen without additional fittings required for installation; (5) the riser manifold is a single piece in contrast to prior manifolds which require many fittings that must be assembled to achieve the same purpose as the present invention; (6) the riser manifold eliminates the need for the hose washers in the ¾" female swivels used in prior manifolds, these hose washers of which are known in the art to require continuous replacement; (7) any part in the riser manifold can be serviced in the field; (8) the riser manifold is a complete unit so the inlet and outlets are always straight, in contrast to prior manifolds in which the outlets must be aligned by hand, thus saving labor, time and money; (9) the ball valves are bi-directional, in contrast to those in traditional manifold systems where the ball is inserted from the inlet side of the ball valve and a fixed component for holding an O-ring is inserted on the inlet side to seal the other direction of flow. In the present invention's riser manifold, the O-ring seat can be easily molded in place on the inlet side of the ball, and the outlet fittings carry the O ring that is attached by the two or more screws to valve body; and (10) the riser manifold can be attached using a reducing coupler to the riser. The inlet of the riser manifold has two inlet sizes, namely that of the socket diameter into which the riser is glued, and that of the outside socket diameter (a nominal one size bigger spigot). If for any reason the glue joint is defective and leaks, the riser manifold can be cut off and the reducing coupler can be glued on the riser manifold spigot and riser.

Hence, the present invention provides for a riser manifold which allows for two or more screws or other fasteners or attachments to hold the seal plate and outlets in combination; which includes outlets which can be connected to the manifold valves in multiple ways such as above-described, or by way threads, connecting pins, or the like; which allows for the ability to change out the outlets to any size required; which eliminates the use of hose washers in all the fittings; which can be made of any combination of one or more outlets having any identical size or mixed sizes; which provides for the ability to install larger high flow balls without the need of additional fittings; which is a one unit product which eliminates the assembly of many fittings; which serves as an energy, labor and money saving product; which allows for a filter screen to be inserted without adding additional fittings; and which can be serviced in the field.

BRIEF DESCRIPTION OF THE DRAWINGS

FIG. 41 is a front, perspective view of a two-way ball valve with tube outlets according to another preferred embodiment of the present invention;
FIG. 49 is a front, perspective view of a four-way ball valve with threaded outlets according to another preferred embodiment of the present invention.

FIG. 79 is a front side elevational view thereof;

FIG. 80 is a rear side elevational view thereof;

FIG. 97 is an exploded view of the elbow ball valve with threaded outlet of FIG. 9 further including a reducing coupler;

FIG. 109B is an enlarged view of the prior art, traditional dual line drip hose depicted in FIG. 109A;

FIG. 109D illustrates the preferred embodiment of the four-way ball valve with tube outlets depicted in FIGS. 57 and 104.

DETAILED DESCRIPTION OF THE PREFERRED EMBODIMENTS

Figure 9:
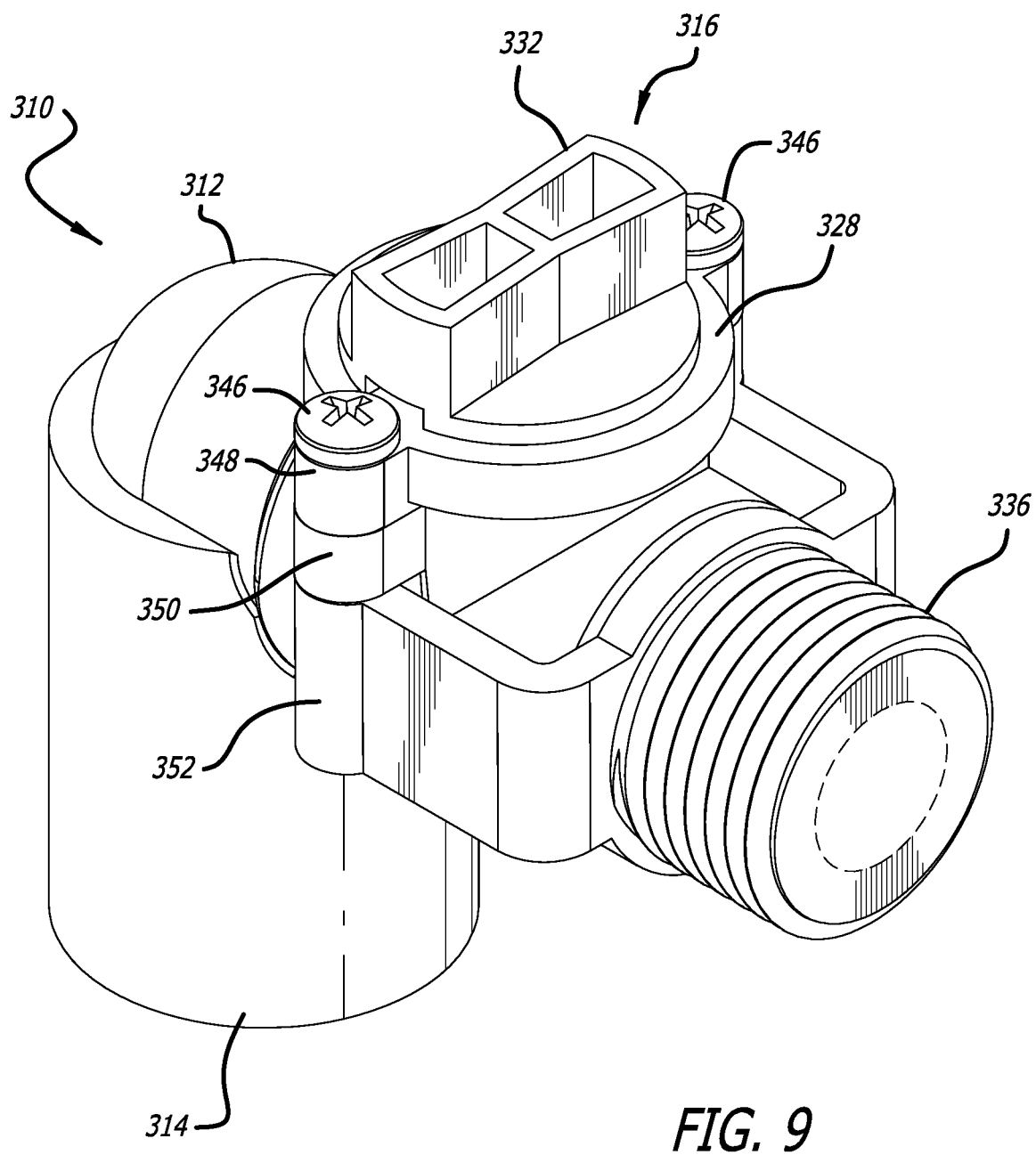
FIG. 9 is a front, perspective view of an elbow ball valve with threaded outlet according to another preferred embodiment of the present invention.
Figure 10:
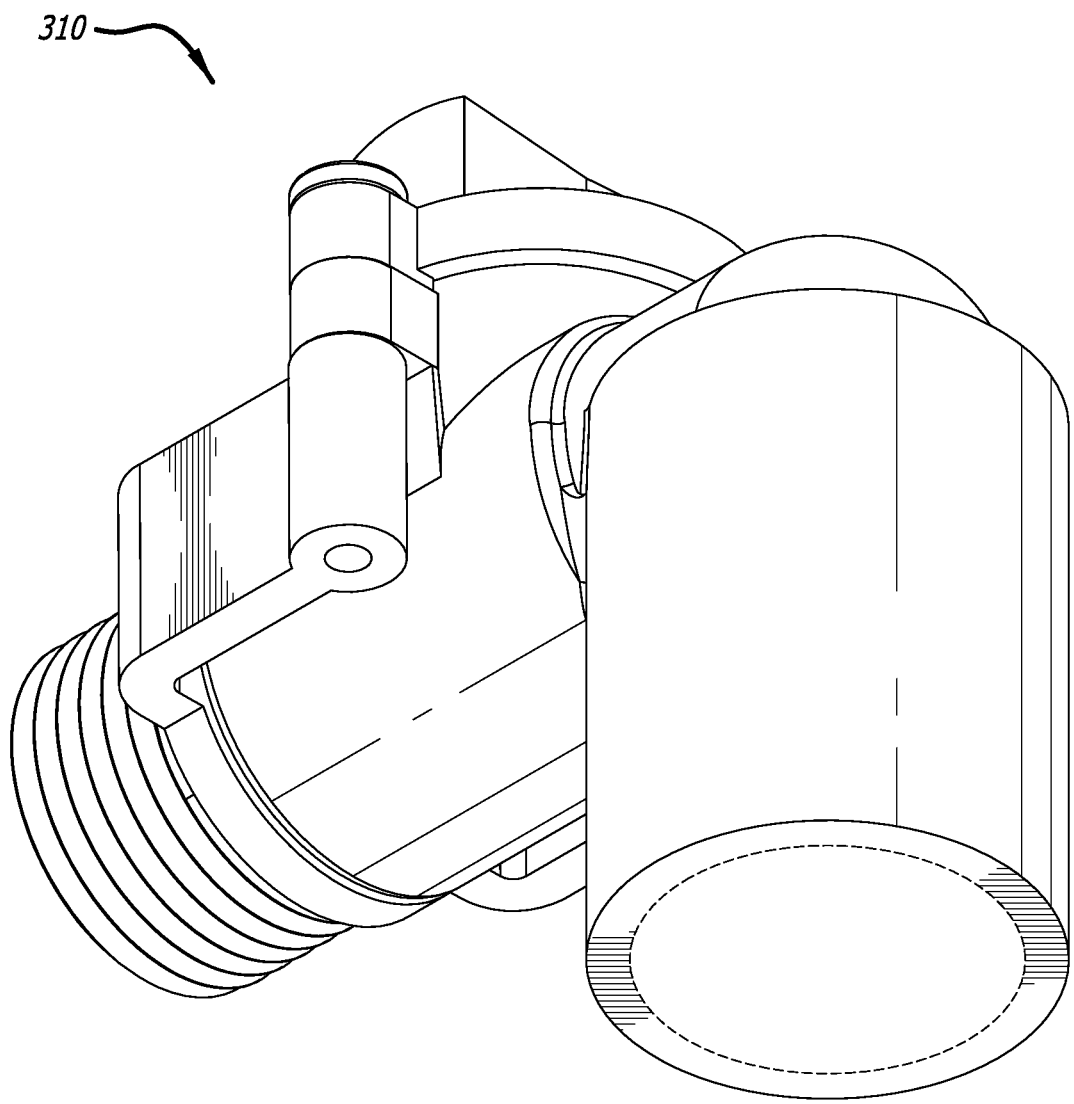
FIG. 10 is rear perspective view thereof.
Figure 11:
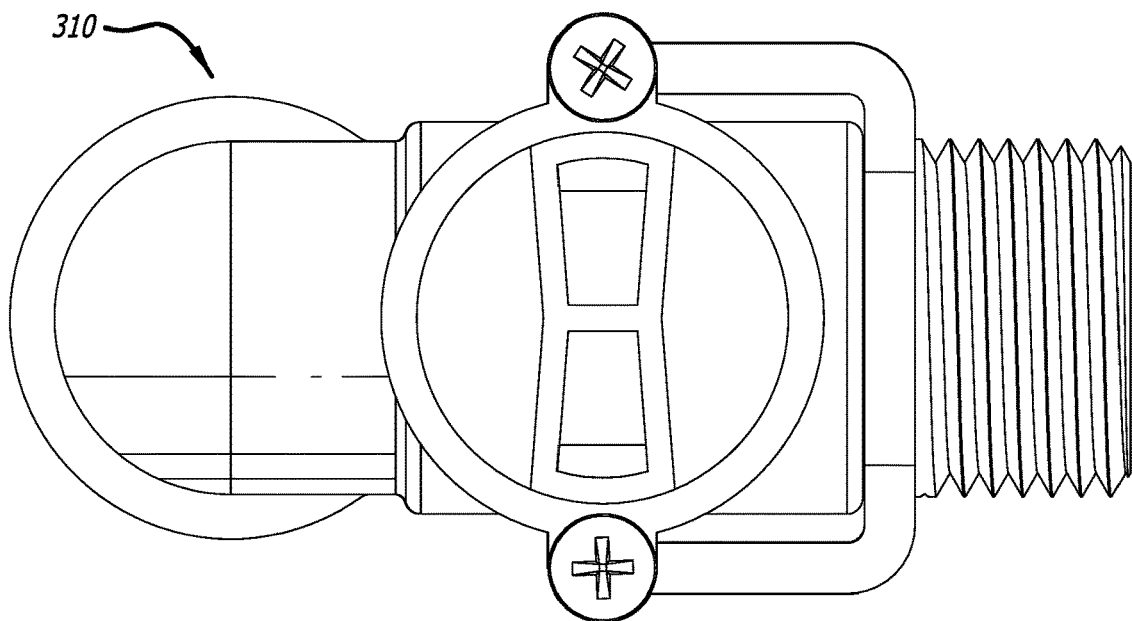
FIG. 11 is a top plan view thereof.
Figure 12:
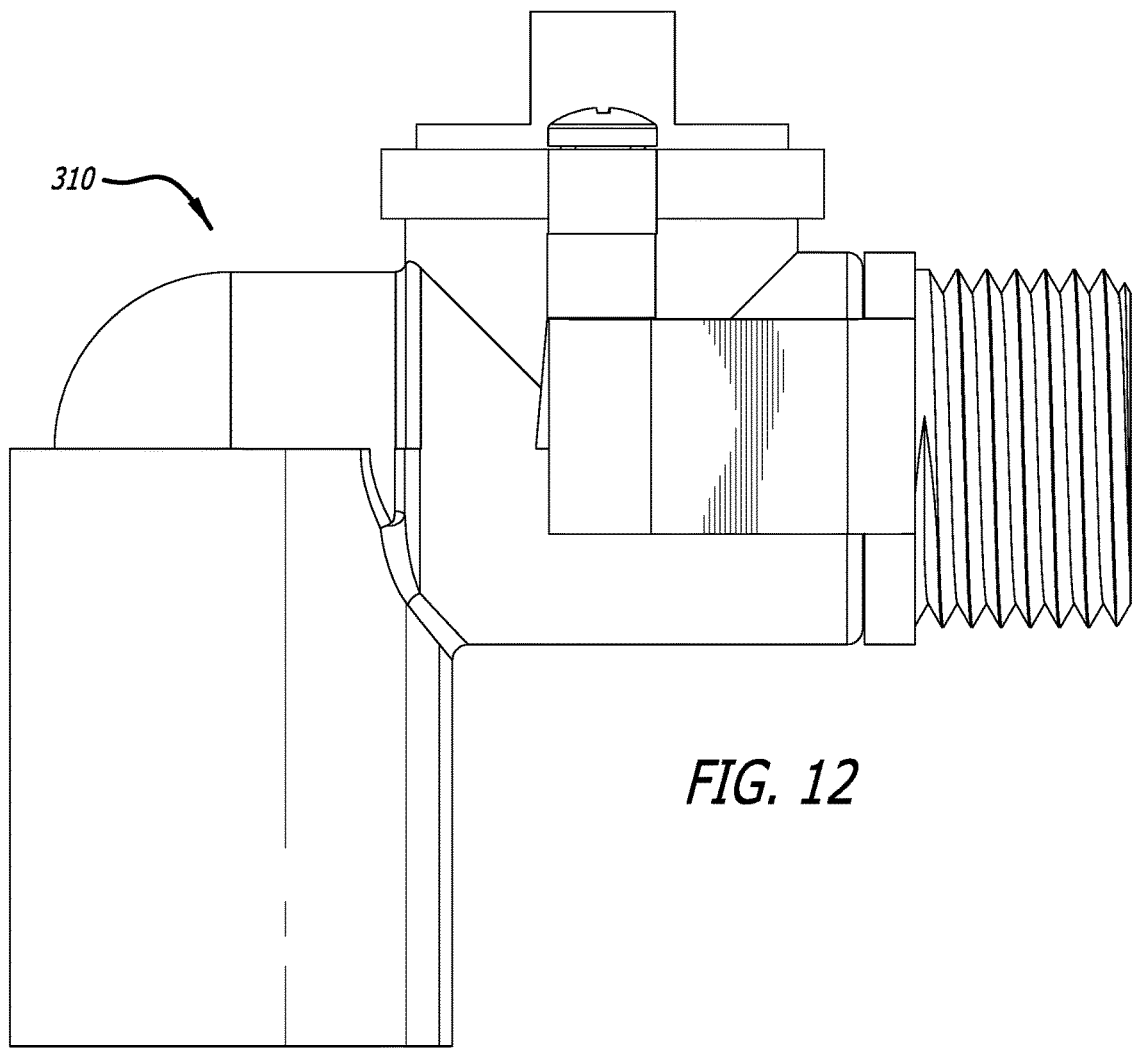
FIG. 12 is a left side elevational view thereof.
Figure 13:
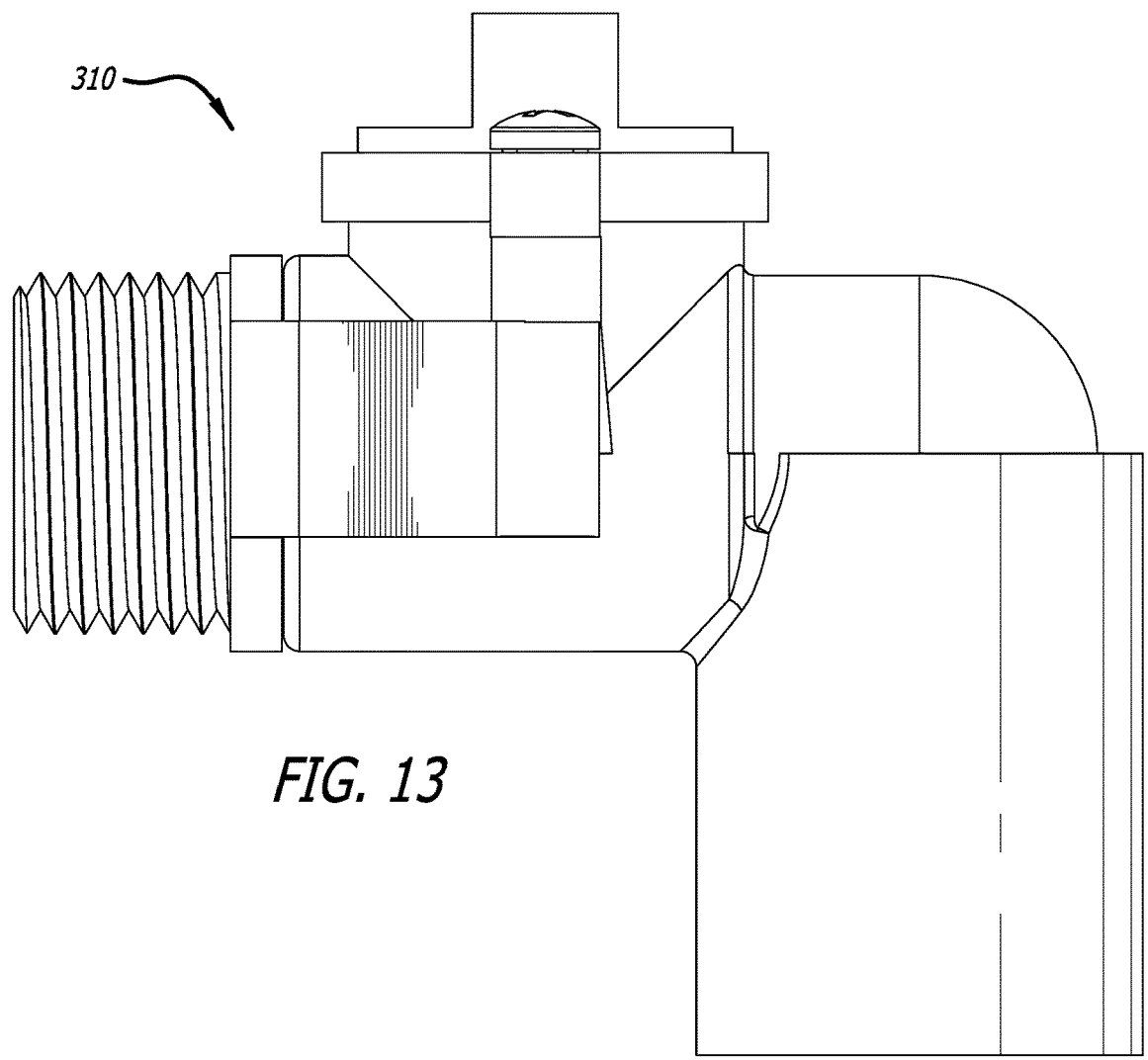
FIG. 13 is a right side elevational view thereof.
Figure 14:
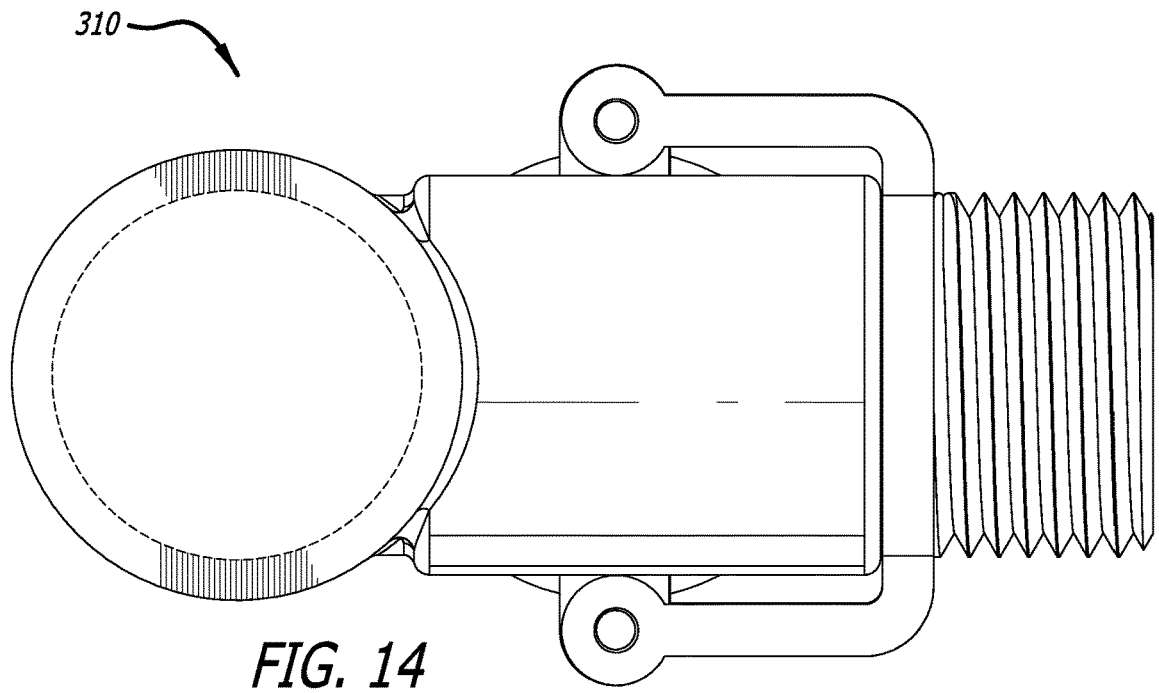
FIG. 14 is a bottom plan view thereof.
Figure 16:
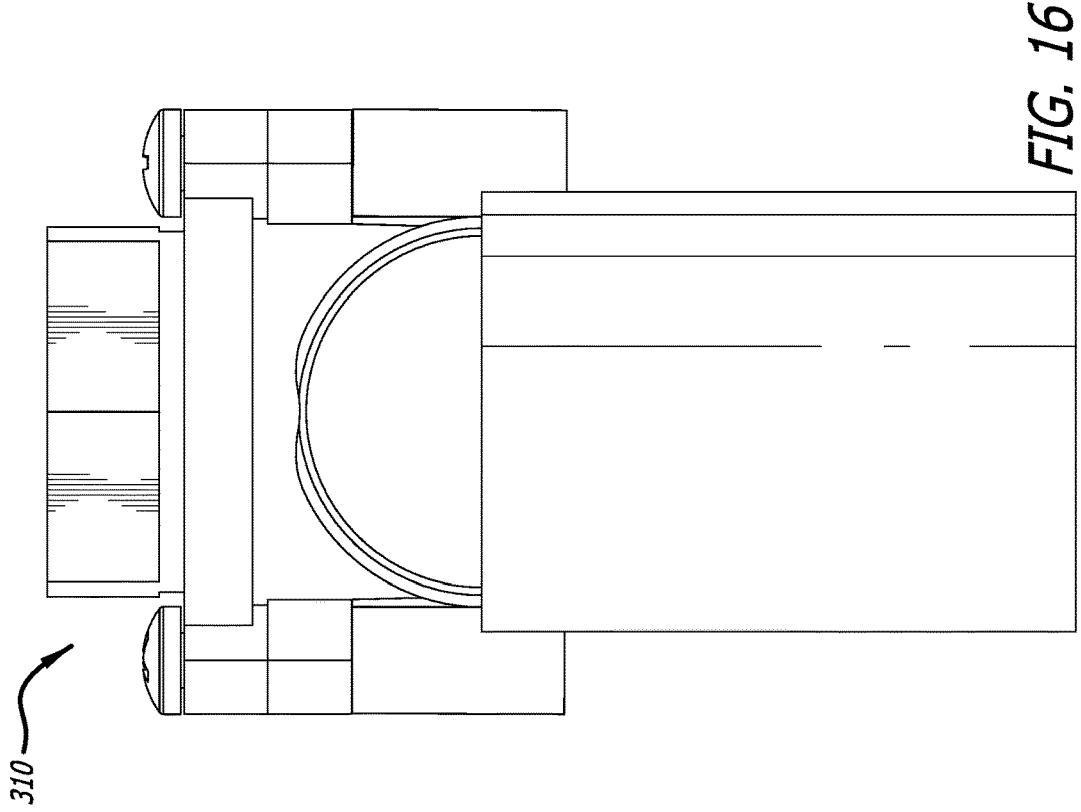
FIG. 16 is a rear side elevational view thereof.
Figure 15:
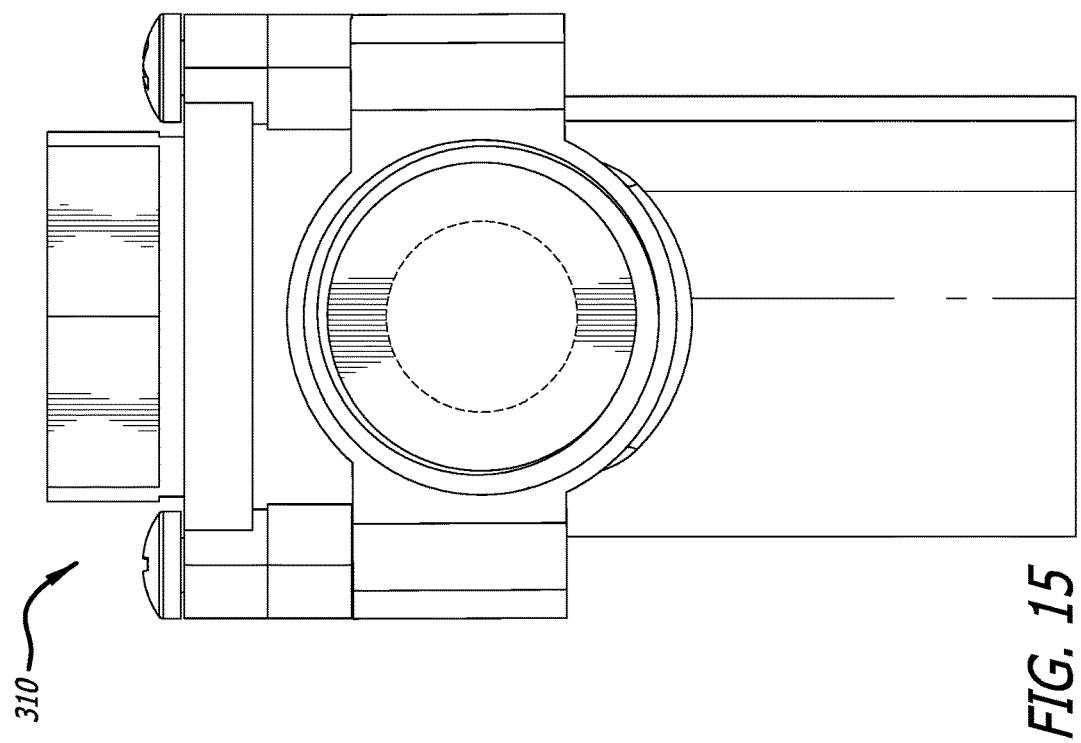
FIG. 15 is a front side elevational view thereof.

Referring to FIGS. 9-16 and 97, in accordance with a preferred embodiment of the present invention, an elbow ball valve 310 is provided for controlling the flow of water to a drip hose 110.

The elbow ball valve 310 includes a manifold 312 including a manifold inlet 314 configured to attach to a riser hose, and a valve 316 integrated with the manifold. The valve 316 includes a top valve inlet 318 and a valve outlet 320. A ball 322 having a stem 324 is received inside the valve 316 through the top valve inlet, and a first inlet seal 326 is received on the stem of the ball. A cap 328 is attached to the valve 316 adjacent to the top valve inlet, and a second inlet seal 330 is received by the cap adjacent to the ball. A handle 332 is attached to the cap opposite the second inlet seal, and the handle receives the stem of the ball. A first outlet seal 334 is also received in the valve outlet.

Figure 1:
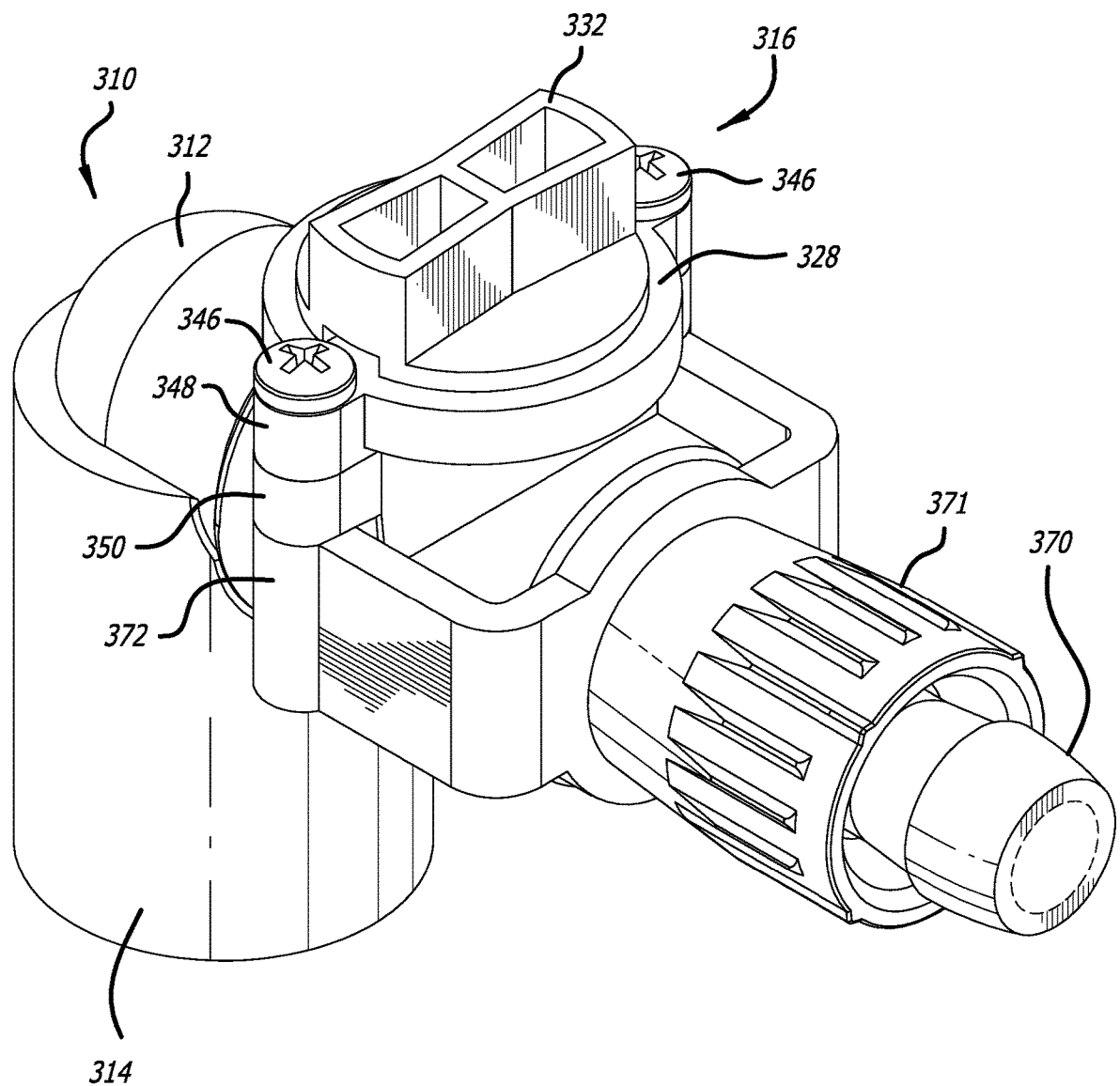
FIG. 1 is a front, perspective view of an elbow ball valve with tube outlet according to a preferred embodiment of the present invention.
Figure 2:
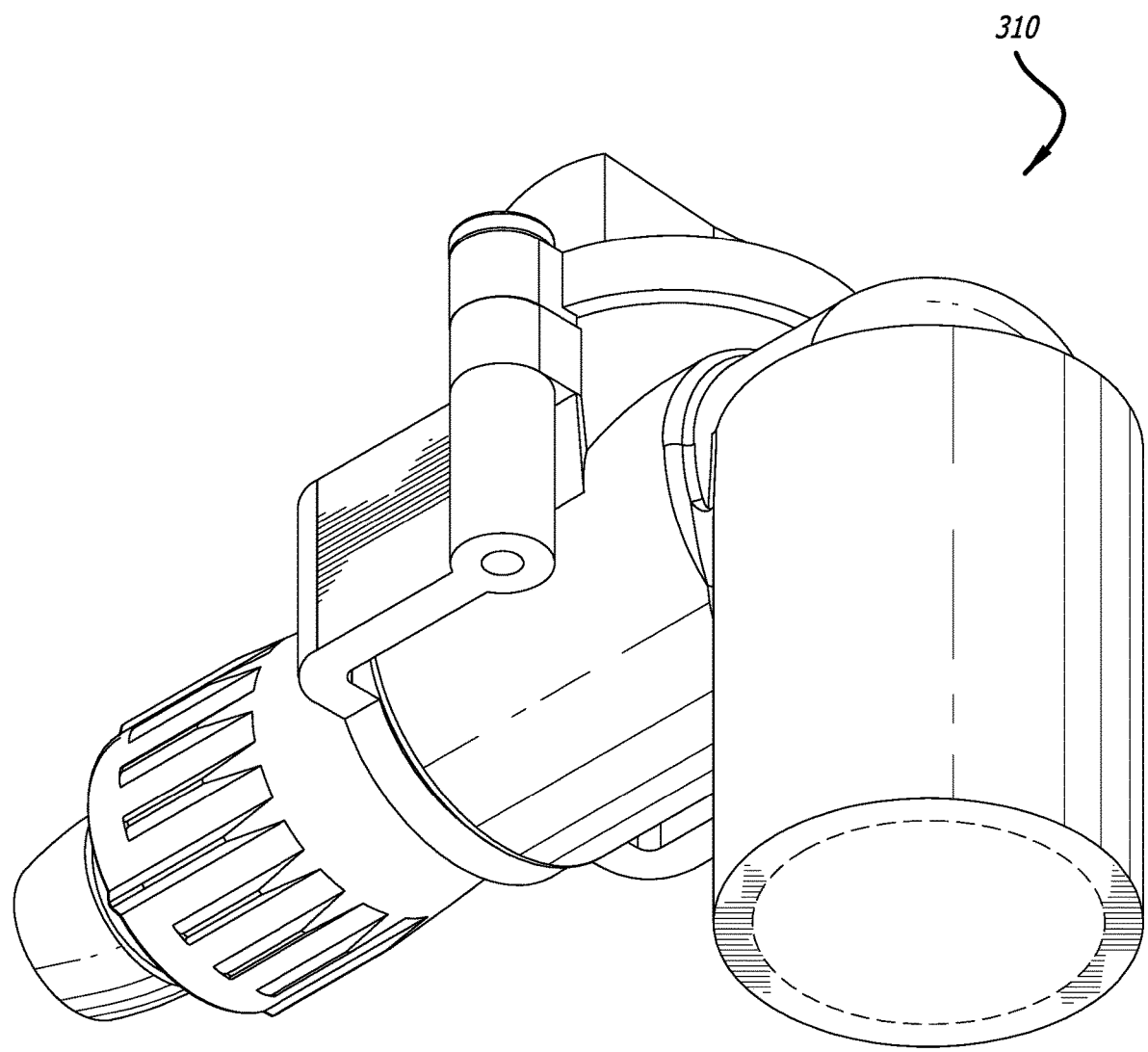
FIG. 2 is rear perspective view thereof.
Figure 3:
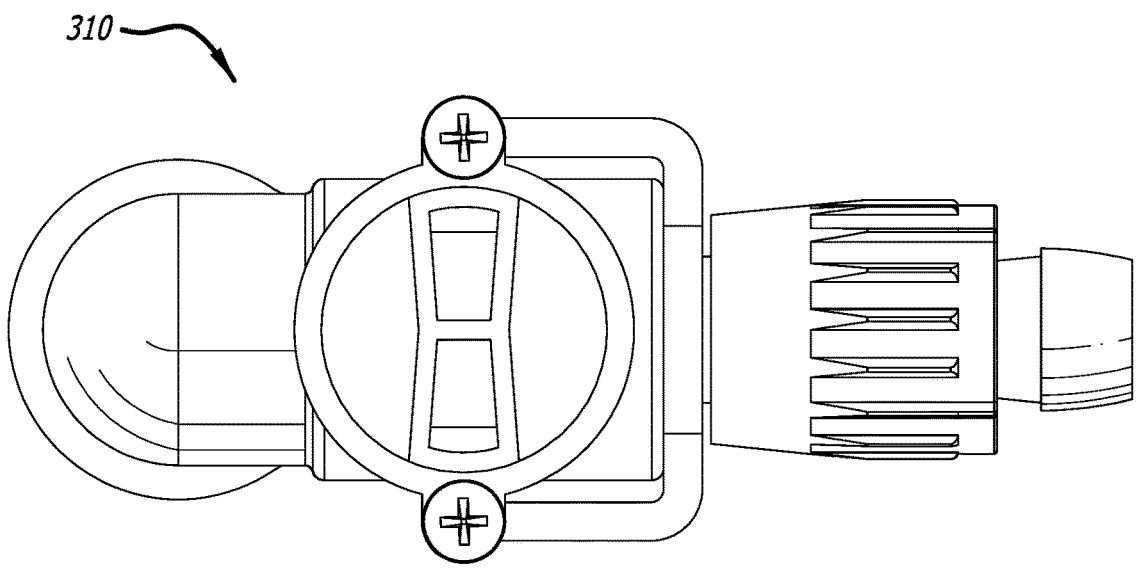
FIG. 3 is a top plan view thereof.
Figure 4:
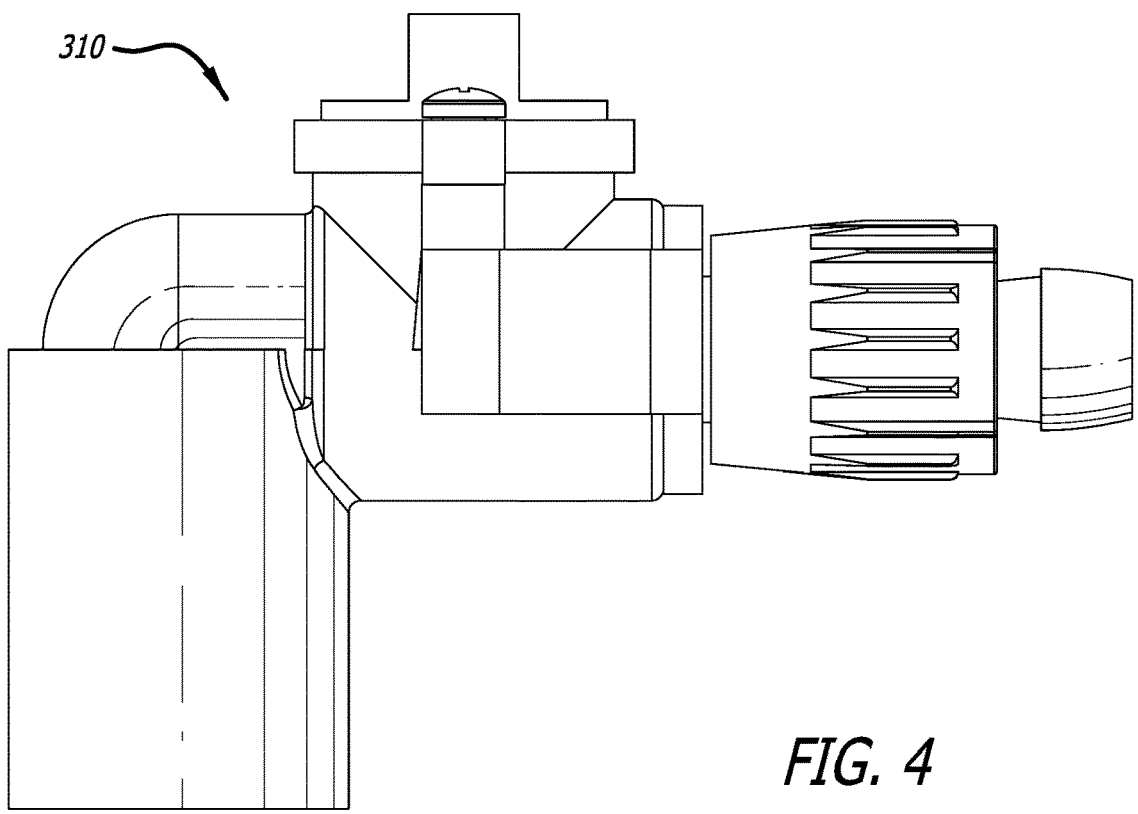
FIG. 4 is a left side elevational view thereof.
Figure 5:
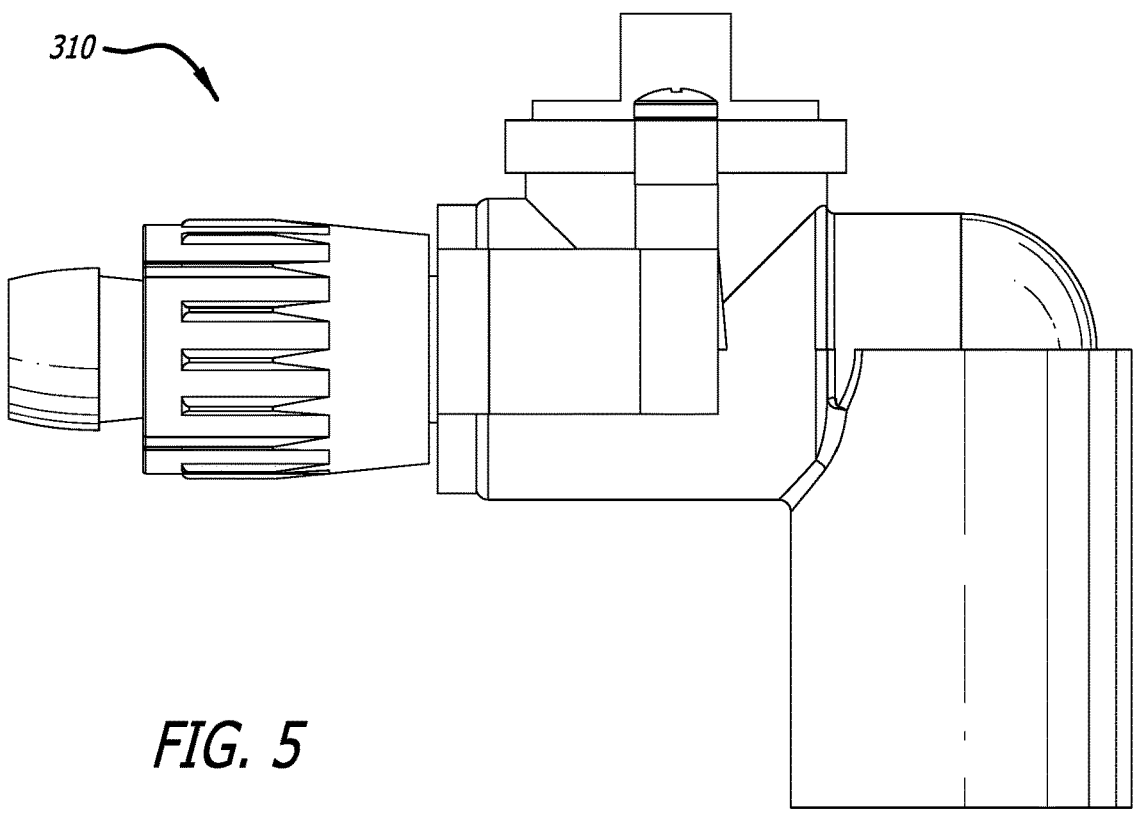
FIG. 5 is a right side elevational view thereof.
Figure 6:
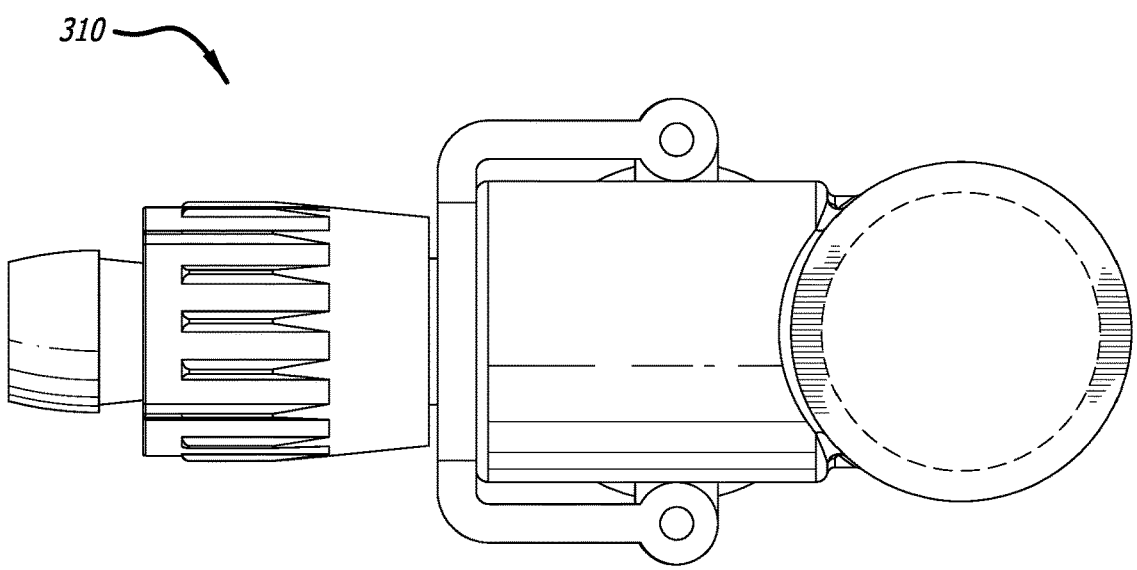
FIG. 6 is a bottom plan view thereof.
Figure 7:
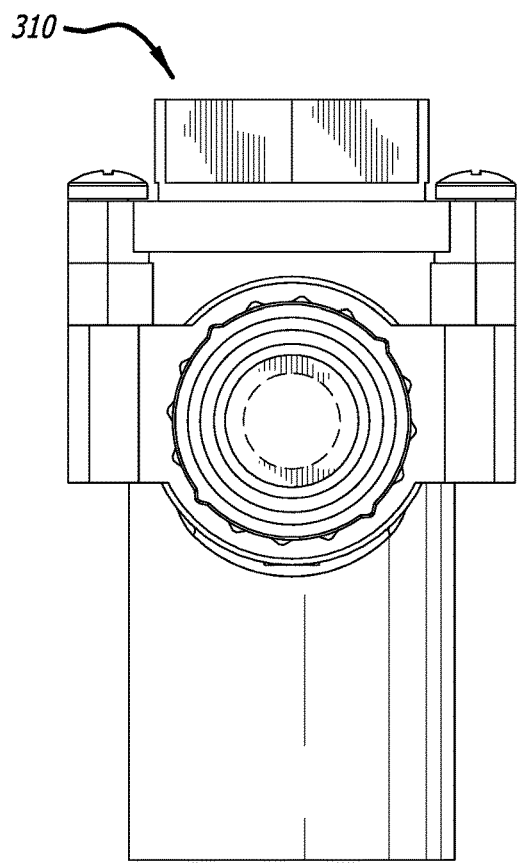
FIG. 7 is a front side elevational view thereof.
Figure 8:
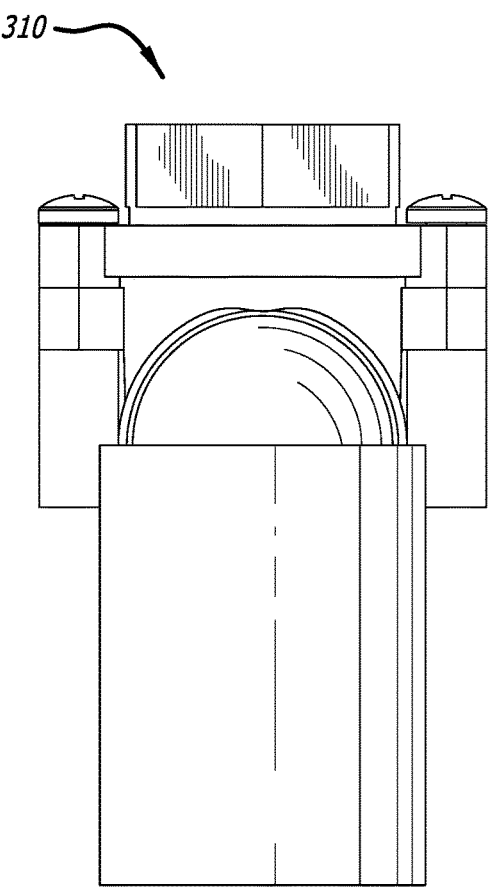
FIG. 8 is a rear side elevational view thereof.
Figure 98:
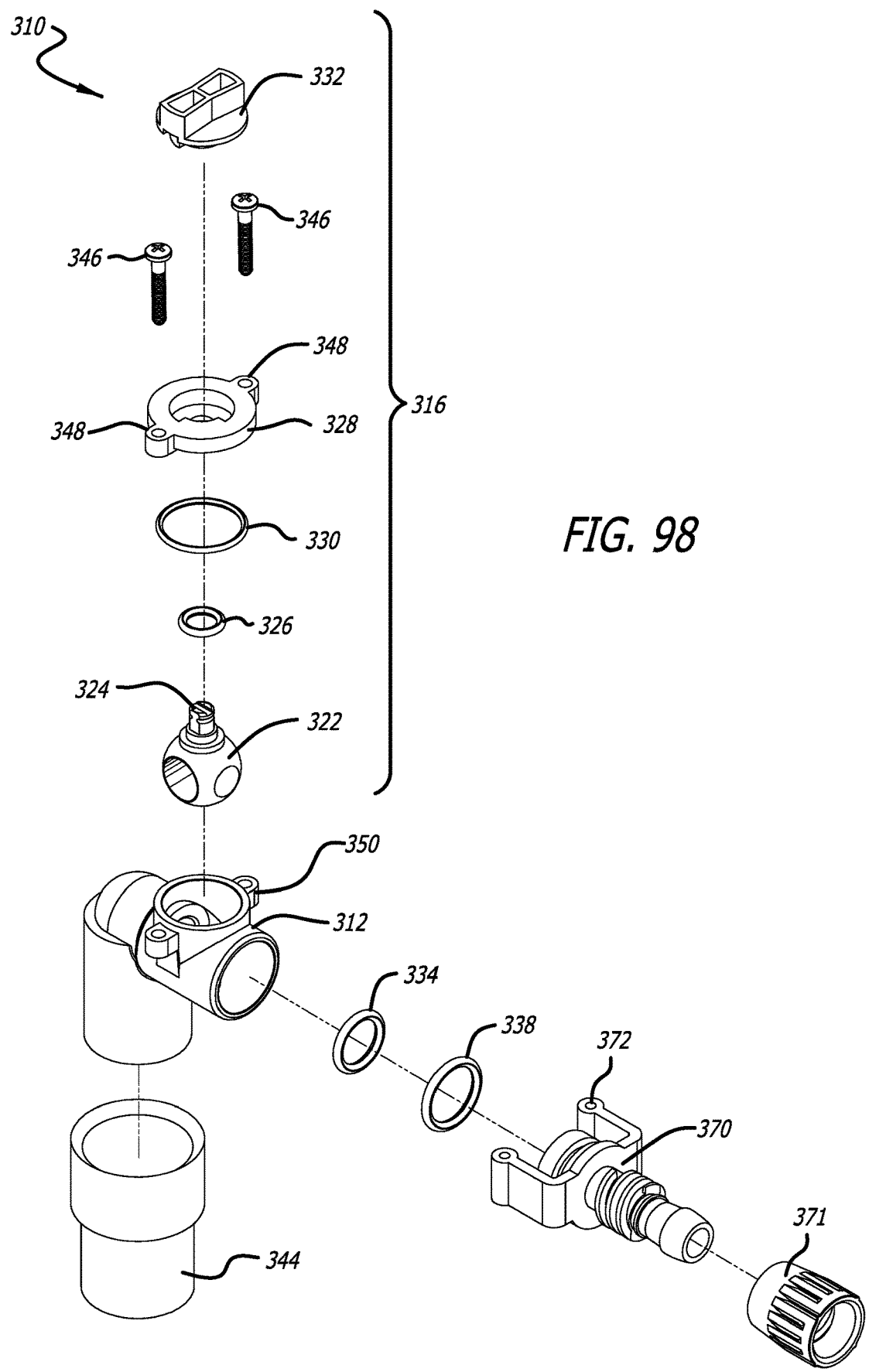
FIG. 98 is an exploded view of the elbow ball valve with tube outlet of FIG. 1 further including a reducing coupler.

An outlet fitting 336 is attached to the valve 316 adjacent to the valve outlet 320, and a second outlet seal 338 is received by the outlet fitting. In the preferred embodiment depicted herein, the outlet fitting is illustrated as a ¾" MHT threaded outlet, although other sizes and outlet types may be used according to user preference. For example, in the elbow ball valve 310 illustrated in FIGS. 1-8 and 98, the threaded outlet fitting 336 has been switched out and replaced with a tube outlet fitting 370 and threaded outlet cap 371 in which the outlet fitting 370 is received.

In preferred aspects of the present invention, the ball 322 includes a through bore 340 allowing for bidirectional water flow through the valve, and includes a side 342 which abuts the first outlet seal 334. Moreover, the first inlet seal 326, second inlet seal 330, first outlet seal 334, and second outlet seal 338 can be O-rings or any type of seal known to one of ordinary skill in the art. Furthermore, the manifold inlet 314 can be attached directly to the riser hose, or indirectly attached to the riser hose through a reducing coupler 344. Other forms of attachment are also possible without departing from the present invention.

In the preferred embodiment illustrated herein, the cap 328 is simultaneously fastened to the valve 316 and to the outlet fitting 336. In particular, the valve 316 includes two fasteners 346 such as screws, bolts, or the like. The cap includes two flanges each having a cap aperture 348 configured to receive the fasteners 346. The valve 316 further includes two flanges each having a valve aperture 350 correspondingly aligned with the cap apertures which also receive the fasteners 346. Additionally, the outlet fitting includes two flanges each having a fitting aperture 352 correspondingly aligned with the valve apertures which further receive the fasteners 346.

In this way, the ball valve 310 allows for a single set of fasteners 346 to hold the cap 328 and outlet fitting 336 in place, while also allowing the outlet fitting to be easily replaced with other desired fittings. For example, the threaded outlet fitting illustrated herein may be replaced with the tube outlet fitting 370, which itself can be fastened to the ball valve 310 similarly through its own two flanges with fitting apertures 372. Additionally, the ball valve 310 thus facilitates repair of either the valve or outlet fitting in the field, since a user can simply unfasten the screws 346 to repair a defective part therein. Although the preferred embodiment uses two screws inserted in three sets of flanges and apertures, any number of screws or other fasteners or fastening mechanisms can be used, for example threads, connecting pins, or the like.

Figure 17:
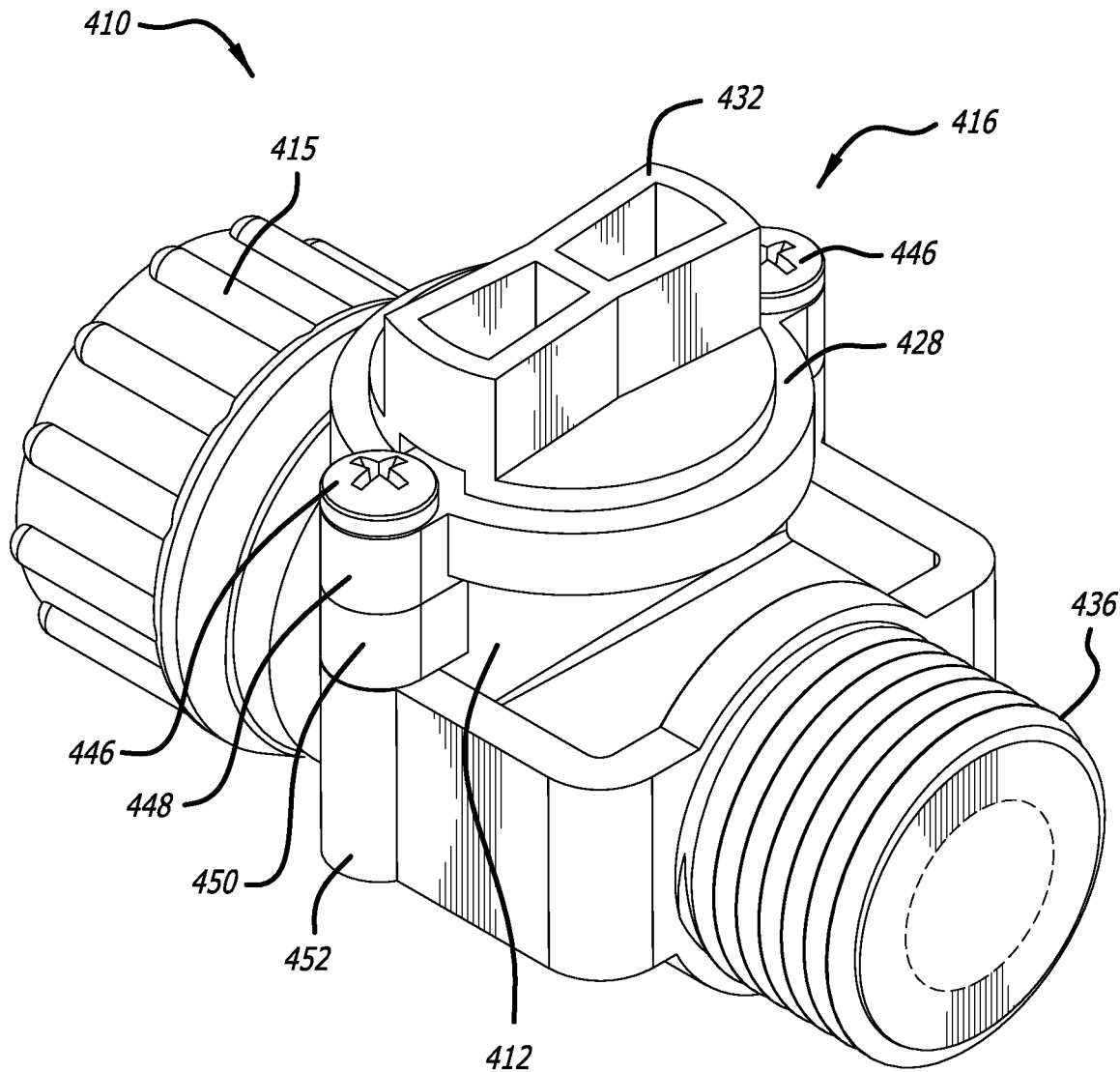
FIG. 17 is a front, perspective view of a swivel ball valve with threaded outlet according to another preferred embodiment of the present invention.
Figure 18:
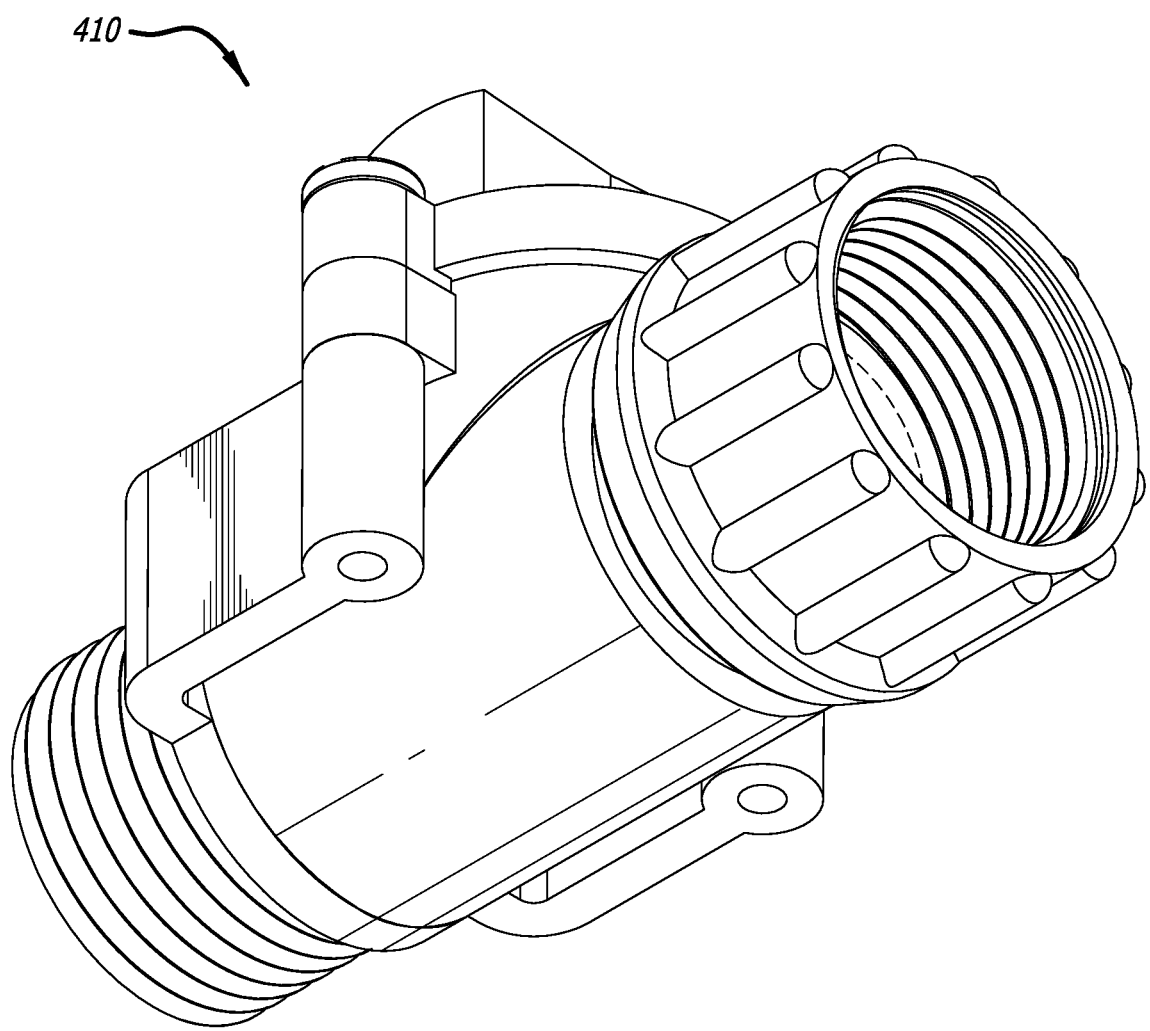
FIG. 18 is rear perspective view thereof.
Figure 19:
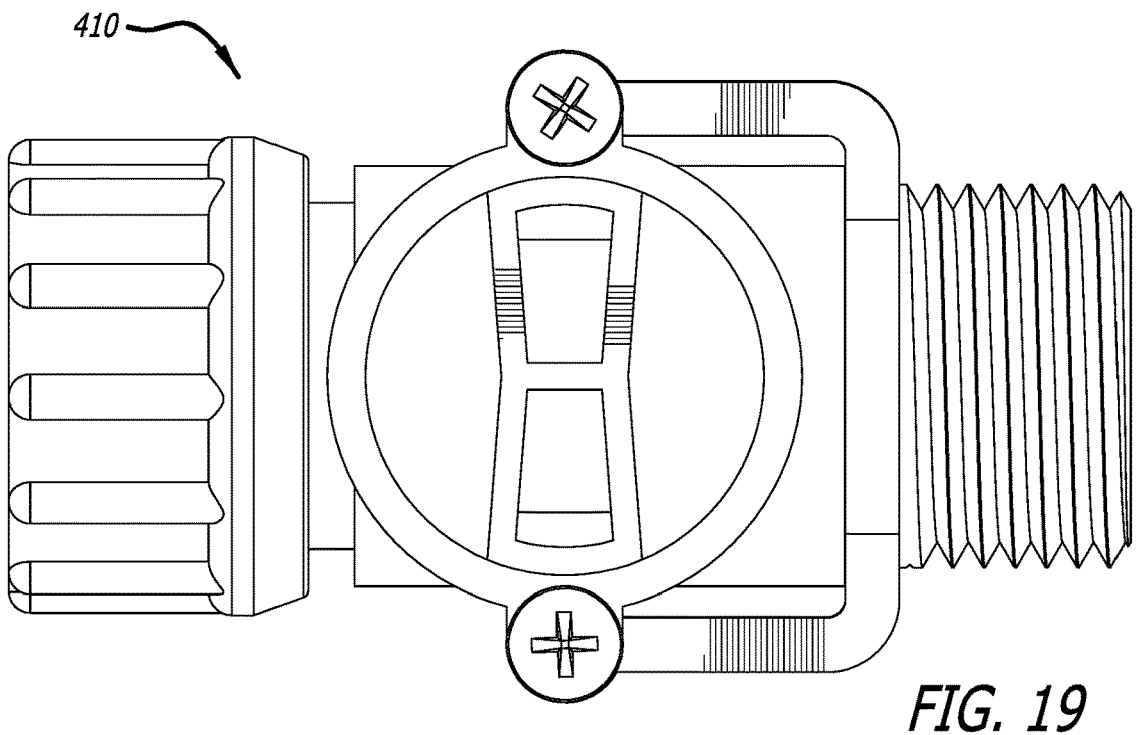
FIG. 19 is a top plan view thereof.
Figure 20:
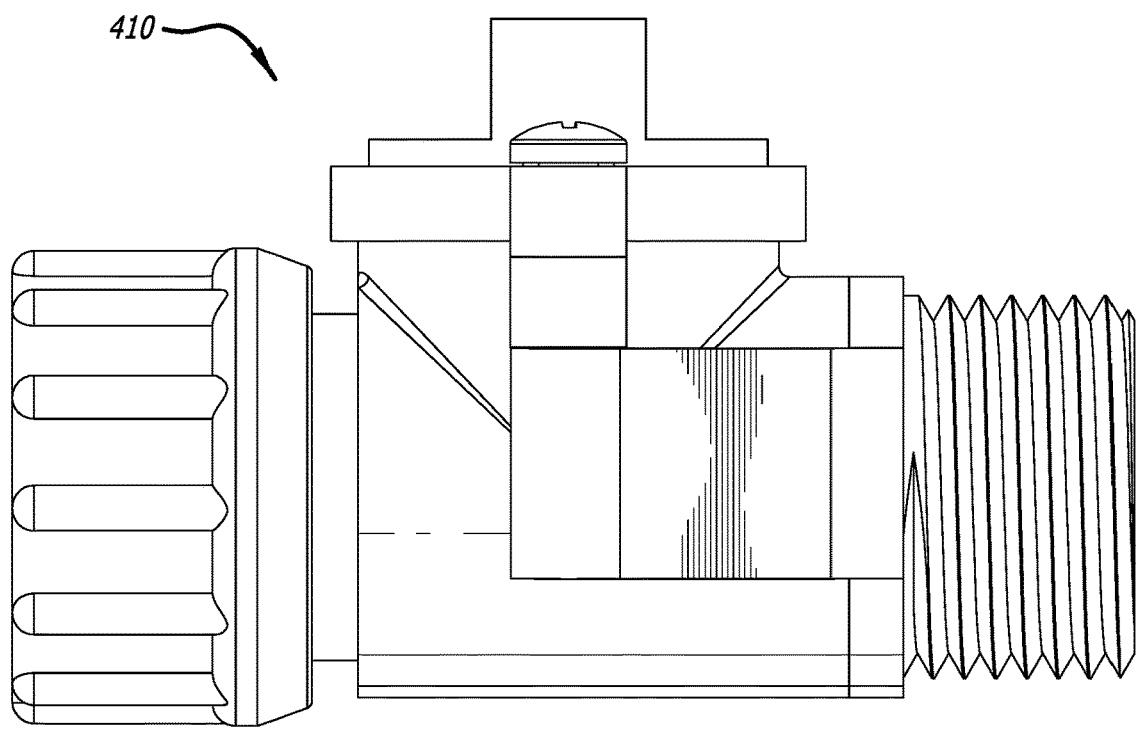
FIG. 20 is a left side elevational view thereof.
Figure 21:
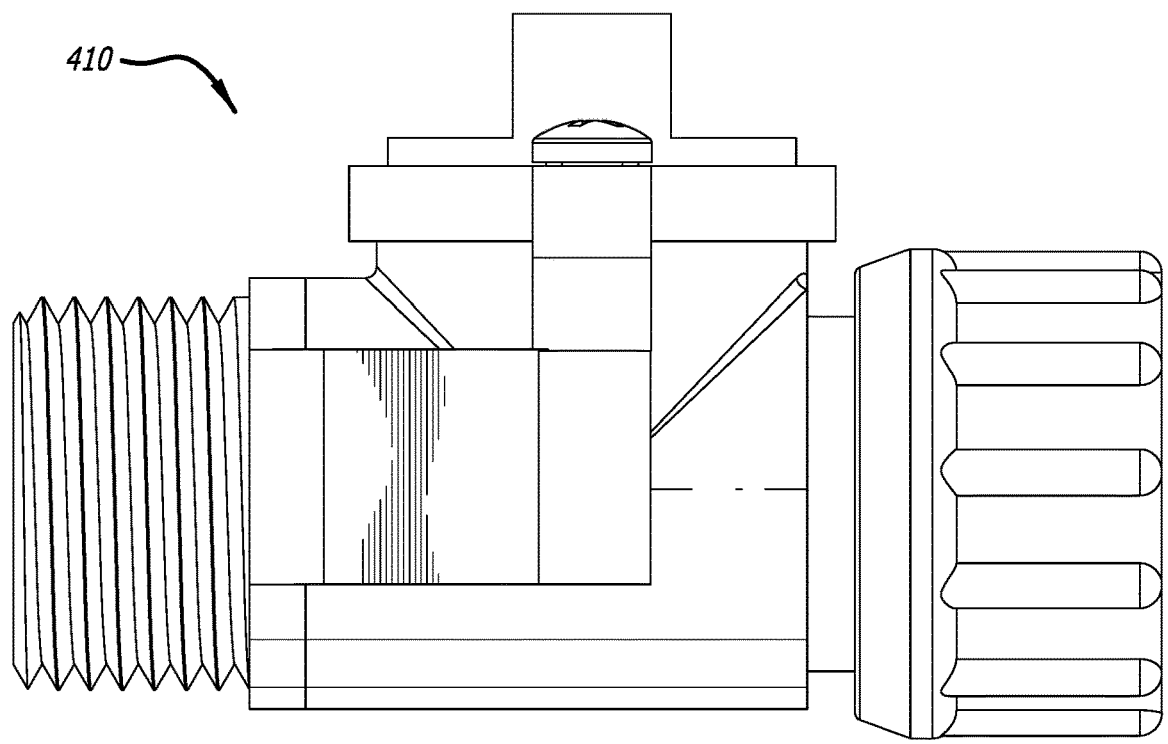
FIG. 21 is a right side elevational view thereof.
Figure 22:
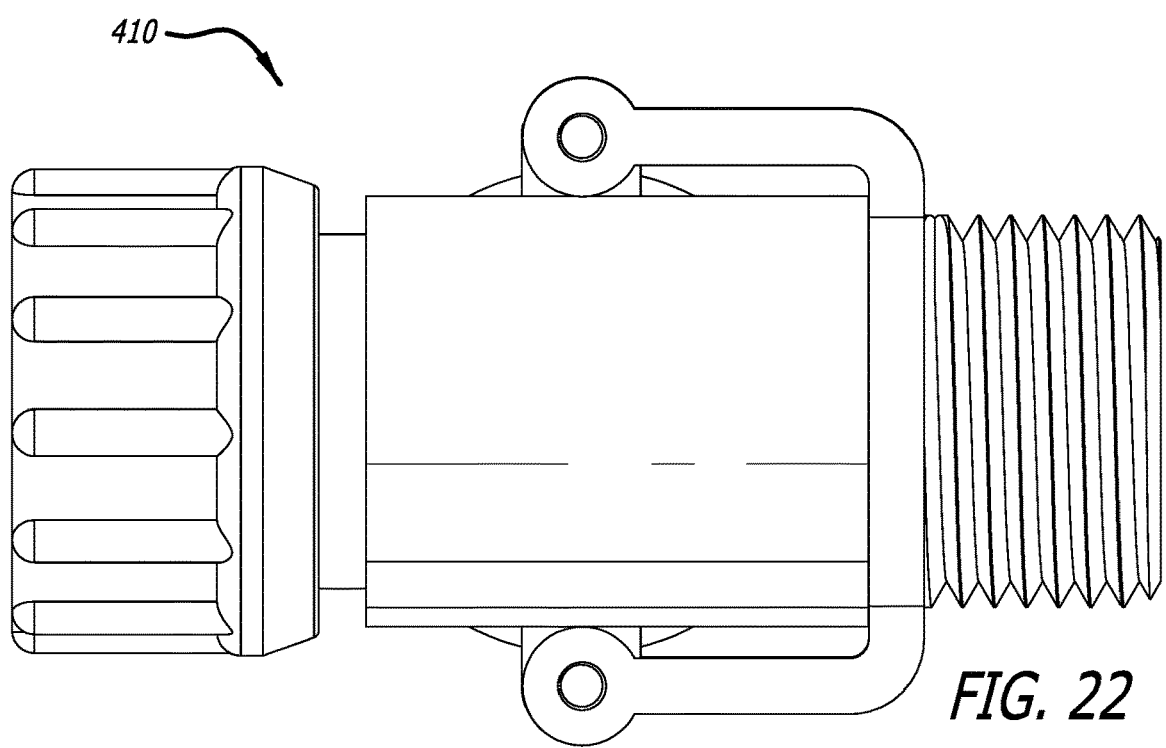
FIG. 22 is a bottom plan view thereof.
Figure 23:
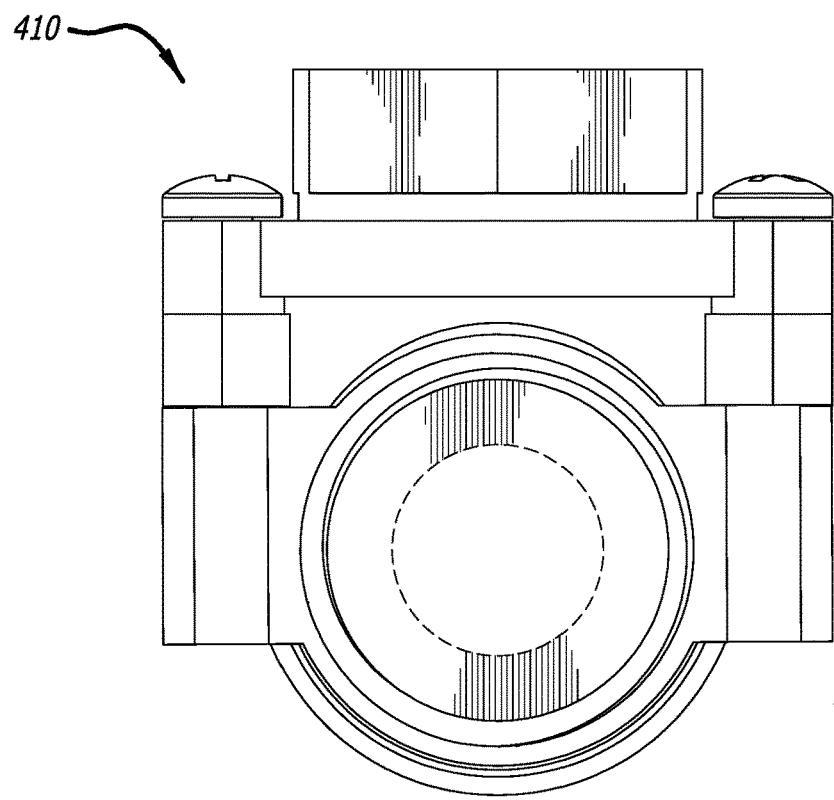
FIG. 23 is a front side elevational view thereof.
Figure 24:
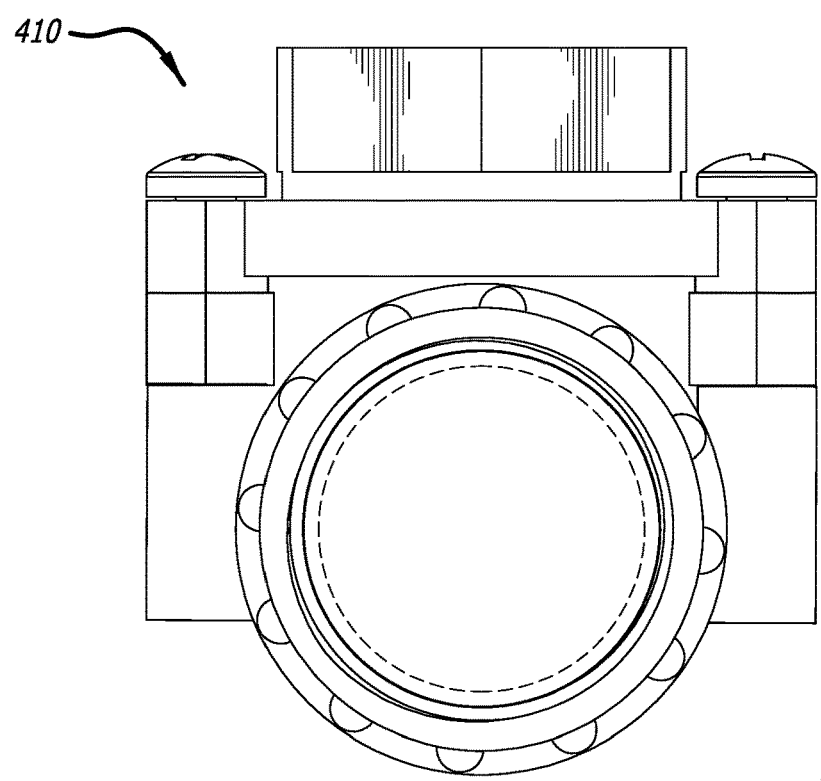
FIG. 24 is a rear side elevational view thereof.
Figure 99:
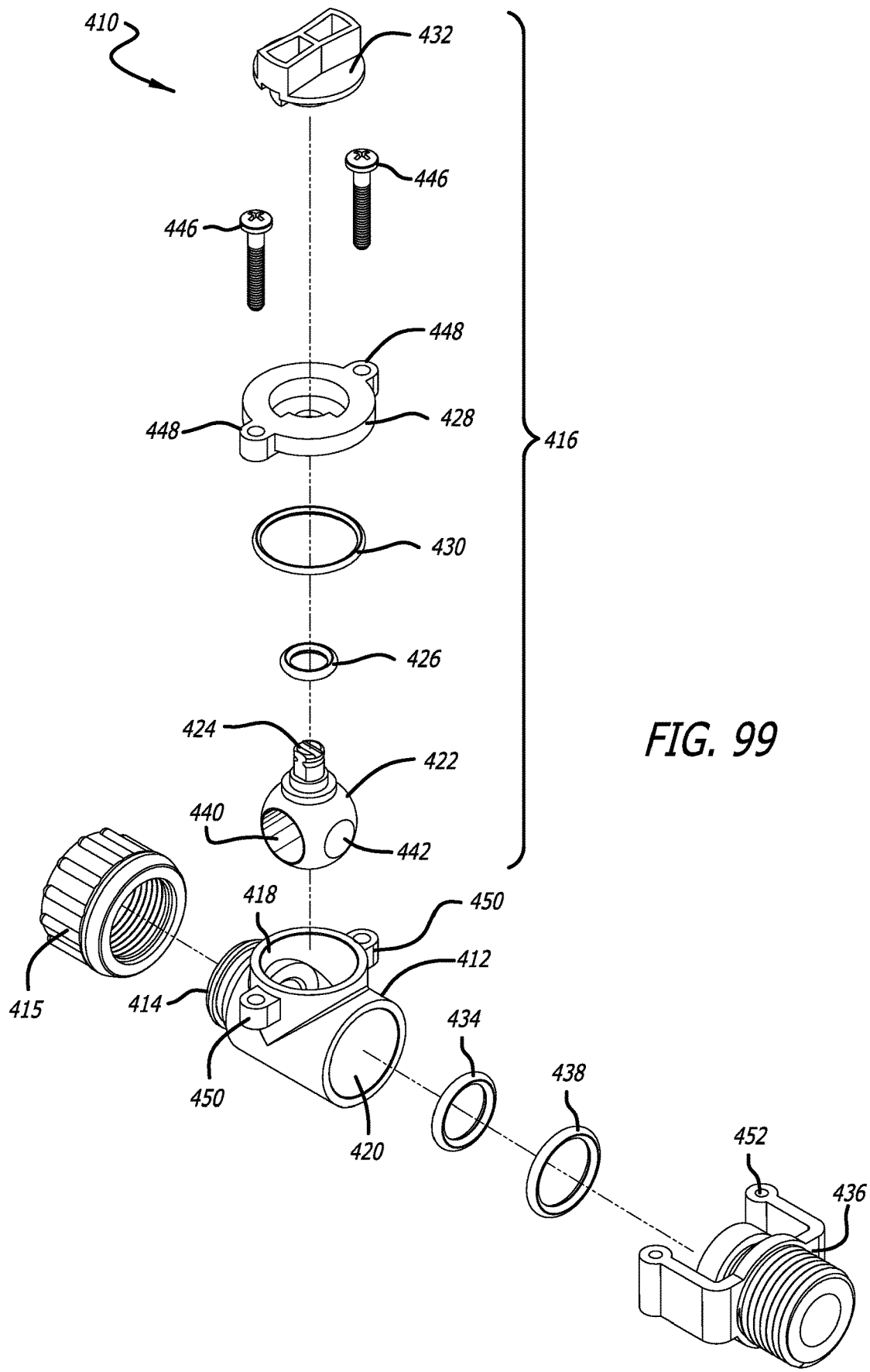
FIG. 99 is an exploded view of the swivel ball valve with threaded outlet of FIG. 17 further including a reducing coupler.

Referring to FIGS. 17-24 and 99, in accordance with a preferred embodiment of the present invention, a straight through ball valve 410 is provided for controlling the flow of water to a drip hose 110.

The straight through ball valve 410 includes a manifold 412 including a manifold inlet 414 configured to attach to a riser hose via a swivel 415 attached to the manifold inlet 414, and a valve 416 integrated with the manifold. A ¾" FHT swivel 415 is illustrated herein, although other sizes and types can be used. The valve 416 includes a top valve inlet 418 and a valve outlet 420. A ball 422 having a stem 424 is received inside the valve 416 through the top valve inlet, and a first inlet seal 426 is received on the stem of the ball. A cap 428 is attached to the valve 416 adjacent to the top valve inlet, and a second inlet seal 430 is received by the cap adjacent to the ball. A handle 432 is attached to the cap opposite the second inlet seal, and the handle receives the stem of the ball. A first outlet seal 434 is also received in the valve outlet.

Figure 25:
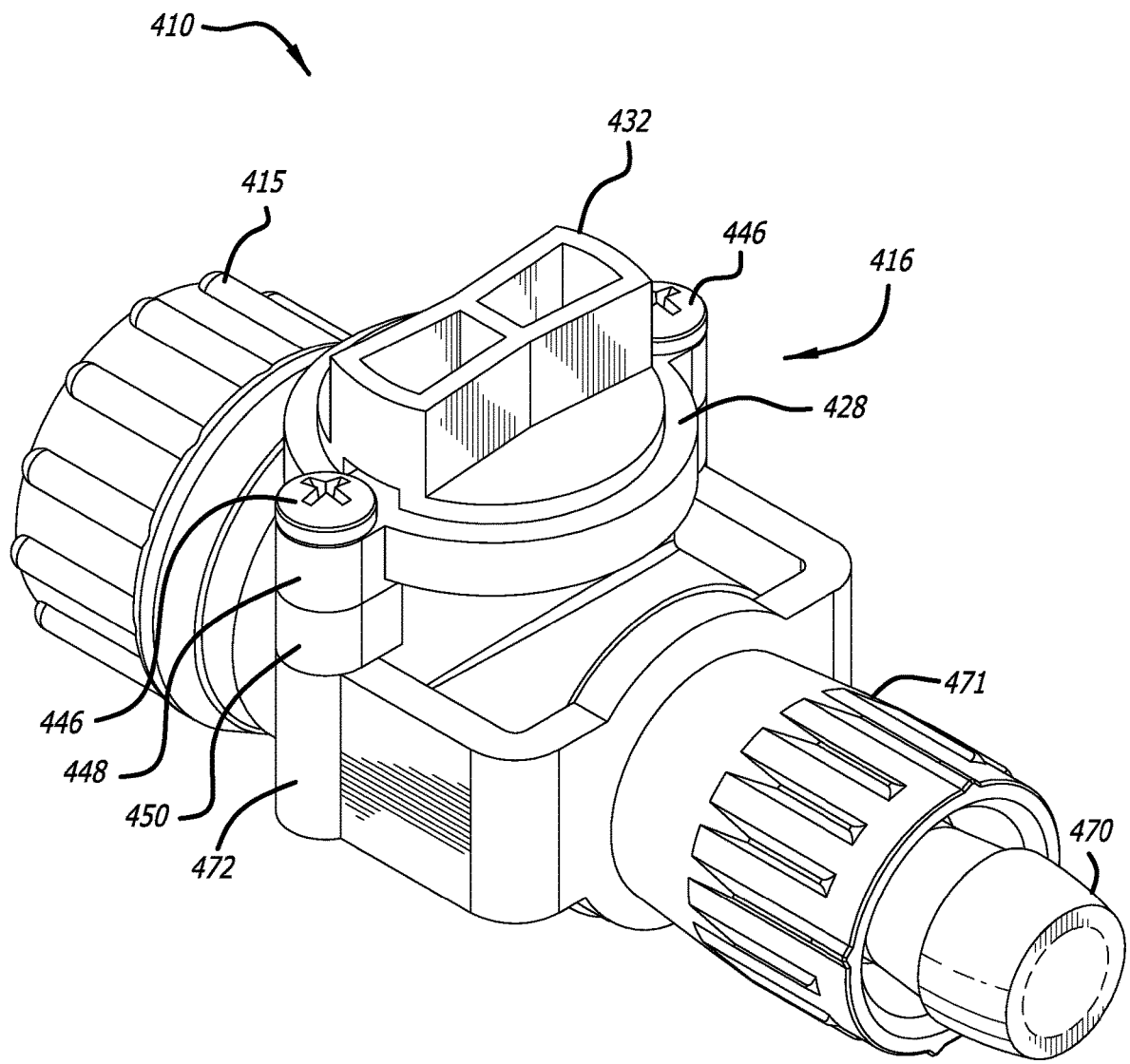
FIG. 25 is a front, perspective view of a swivel ball valve with tube outlet according to another preferred embodiment of the present invention.
Figure 26:
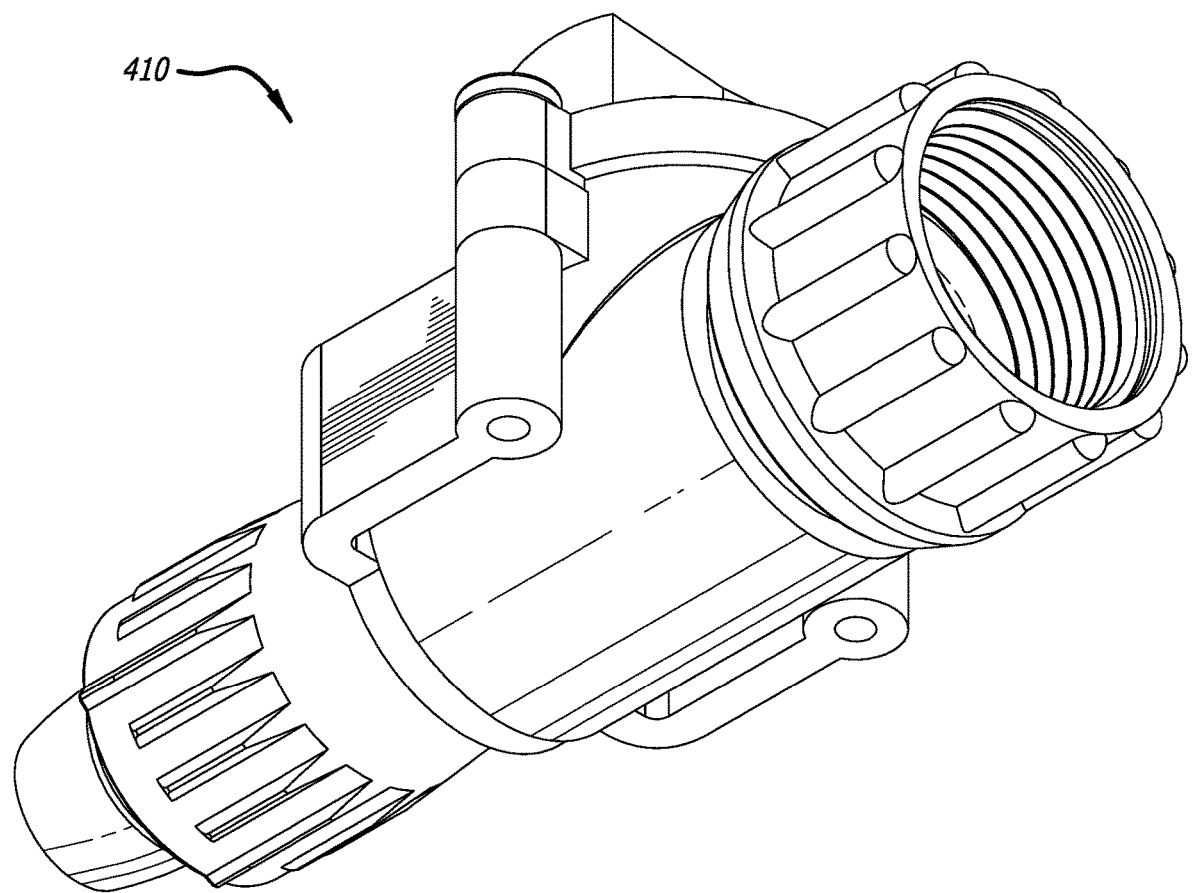
FIG. 26 is rear perspective view thereof.
Figure 27:
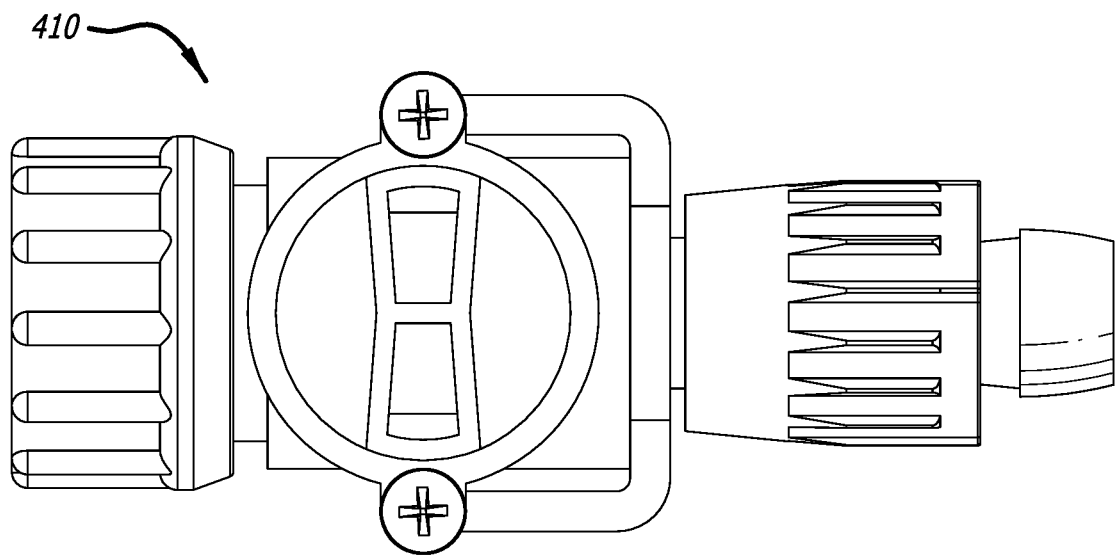
FIG. 27 is a top plan view thereof.
Figure 28:
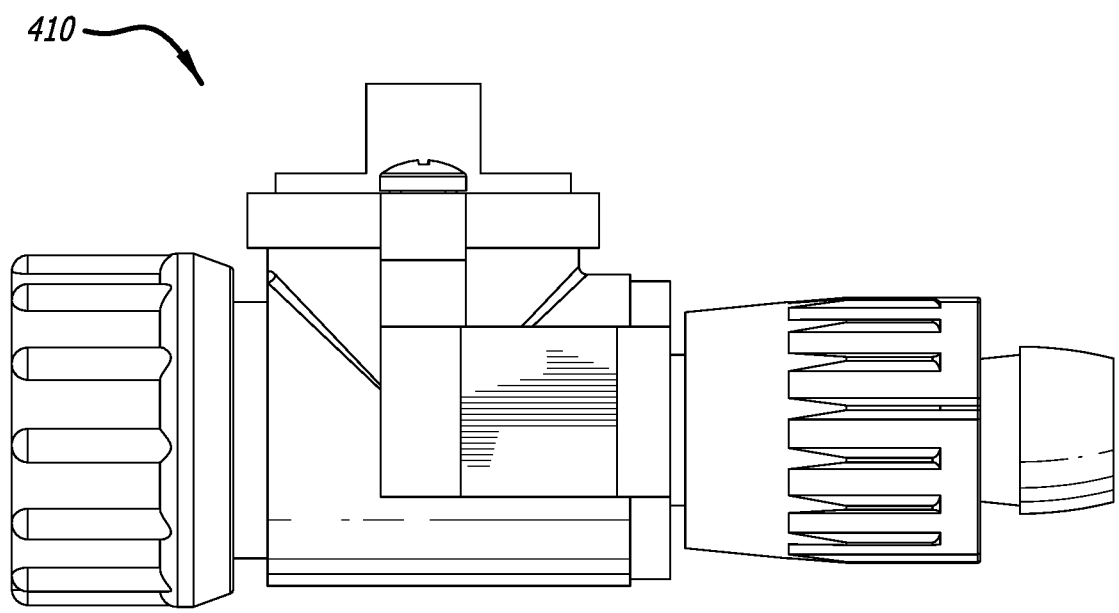
FIG. 28 is a left side elevational view thereof.
Figure 29:
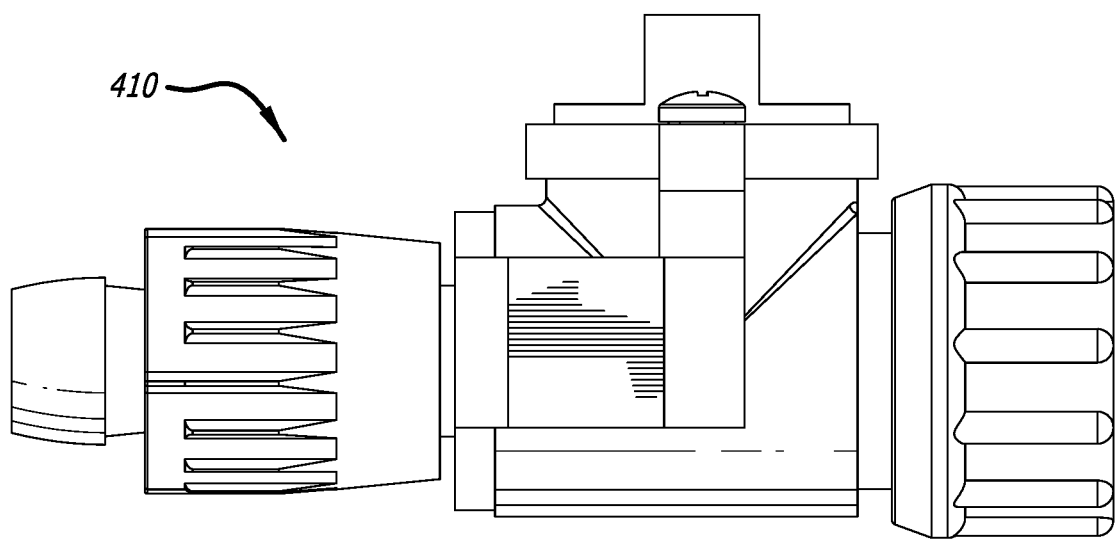
FIG. 29 is a right side elevational view thereof.
Figure 30:
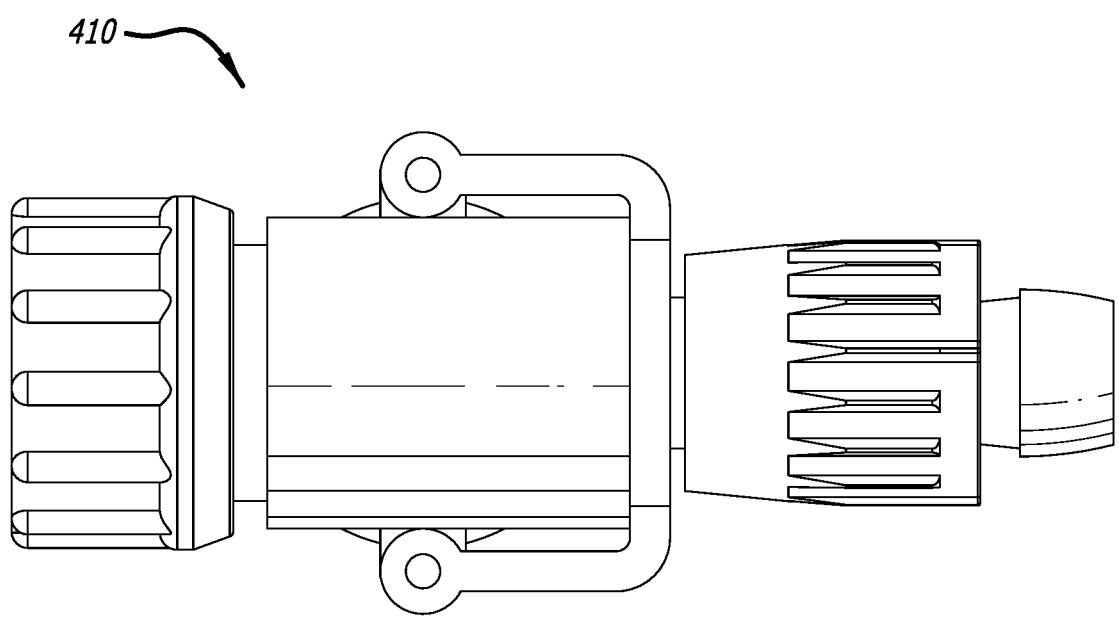
FIG. 30 is a bottom plan view thereof.
Figure 31:
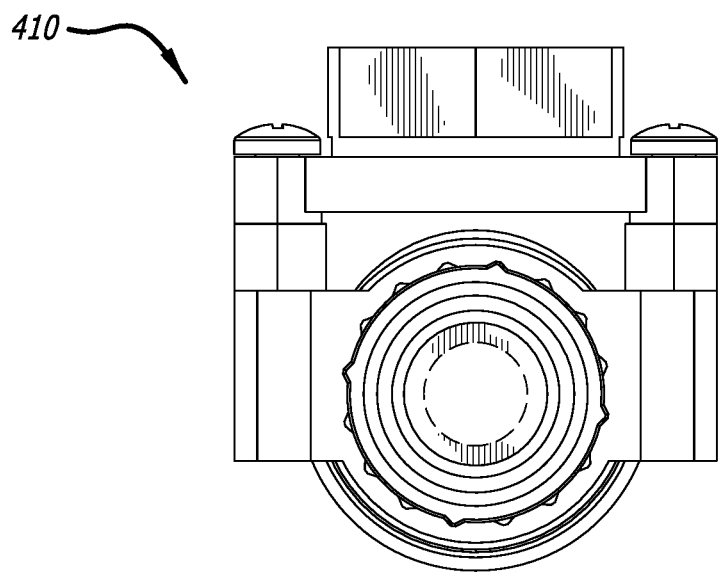
FIG. 31 is a front side elevational view thereof.
Figure 32:
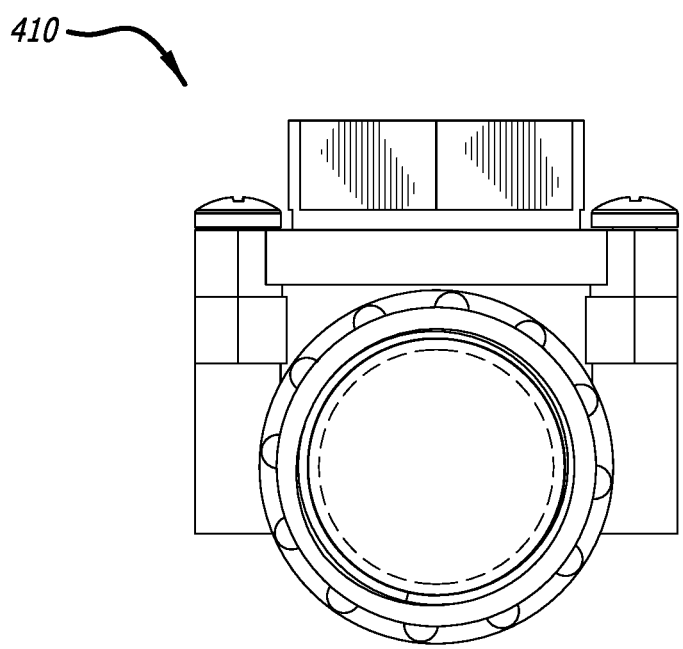
FIG. 32 is a rear side elevational view thereof.
Figure 100:
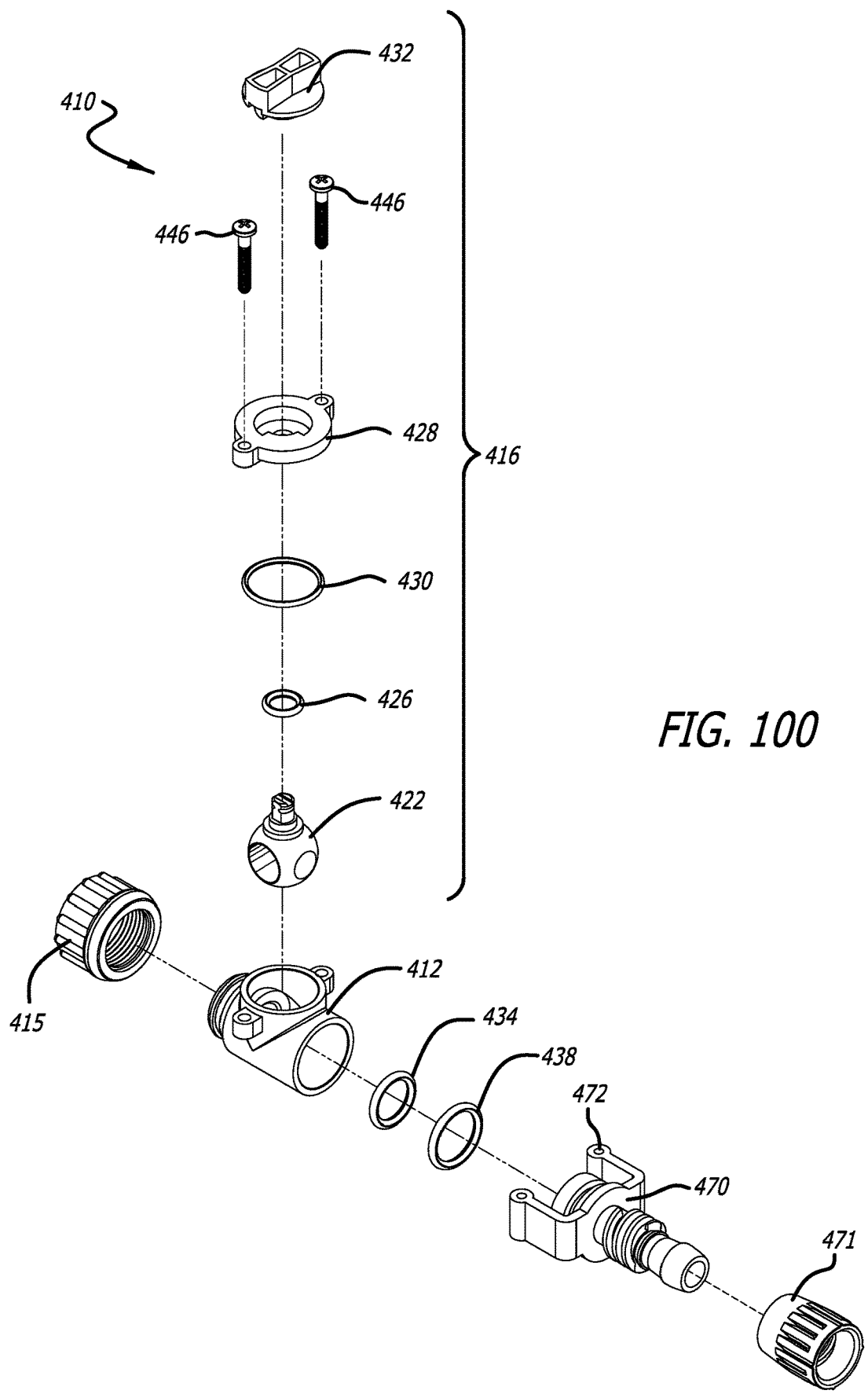
FIG. 100 is an exploded view of the swivel ball valve with tube outlet of FIG. 25 further including a reducing coupler.

An outlet fitting 436 is attached to the valve 416 adjacent to the valve outlet 420, and a second outlet seal 438 is received by the outlet fitting. In the preferred embodiment depicted herein, the outlet fitting is illustrated as a ¾" MHT threaded outlet, although other sizes and outlet types may be used according to user preference. For example, in the straight through ball valve 410 illustrated in FIGS. 25-32 and 100, the threaded outlet fitting 436 has been switched out and replaced with a tube outlet fitting 470 and threaded outlet cap 471 in which the outlet fitting 470 is received.

In preferred aspects of the present invention, the ball 422 includes a through bore 440 allowing for bidirectional water flow through the valve, and includes a side 442 which abuts the first outlet seal 434. Moreover, the first inlet seal 426, second inlet seal 430, first outlet seal 434, and second outlet seal 438 can be O-rings or any type of seal known to one of ordinary skill in the art.

In the preferred embodiment illustrated herein, the cap 428 is simultaneously fastened to the valve 416 and to the outlet fitting 436. In particular, the valve 416 includes two fasteners 446 such as screws, bolts, or the like. The cap includes two flanges each having a cap aperture 448 configured to receive the fasteners 446. The valve 416 further includes two flanges each having a valve aperture 450 correspondingly aligned with the cap apertures which also receive the fasteners 446. Additionally, the outlet fitting includes two flanges each having a fitting aperture 452 correspondingly aligned with the valve apertures which further receive the fasteners 446.

In this way, the ball valve 410 allows for a single set of fasteners 446 to hold the cap 428 and outlet fitting 436 in place, while also allowing the outlet fitting to be easily replaced with other desired fittings. For example, the threaded outlet fitting illustrated herein may be replaced with the tube outlet fitting 470, which itself can be fastened to the ball valve 410 similarly through its own two flanges with fitting apertures 472. Additionally, the ball valve 410 thus facilitates repair of either the valve or outlet fitting in the field, since a user can simply unfasten the screws 446 to repair a defective part therein. Although the preferred embodiment uses two screws inserted in three sets of flanges and apertures, any number of screws or other fasteners or fastening mechanisms can be used, for example threads, connecting pins, or the like.

Figure 33:
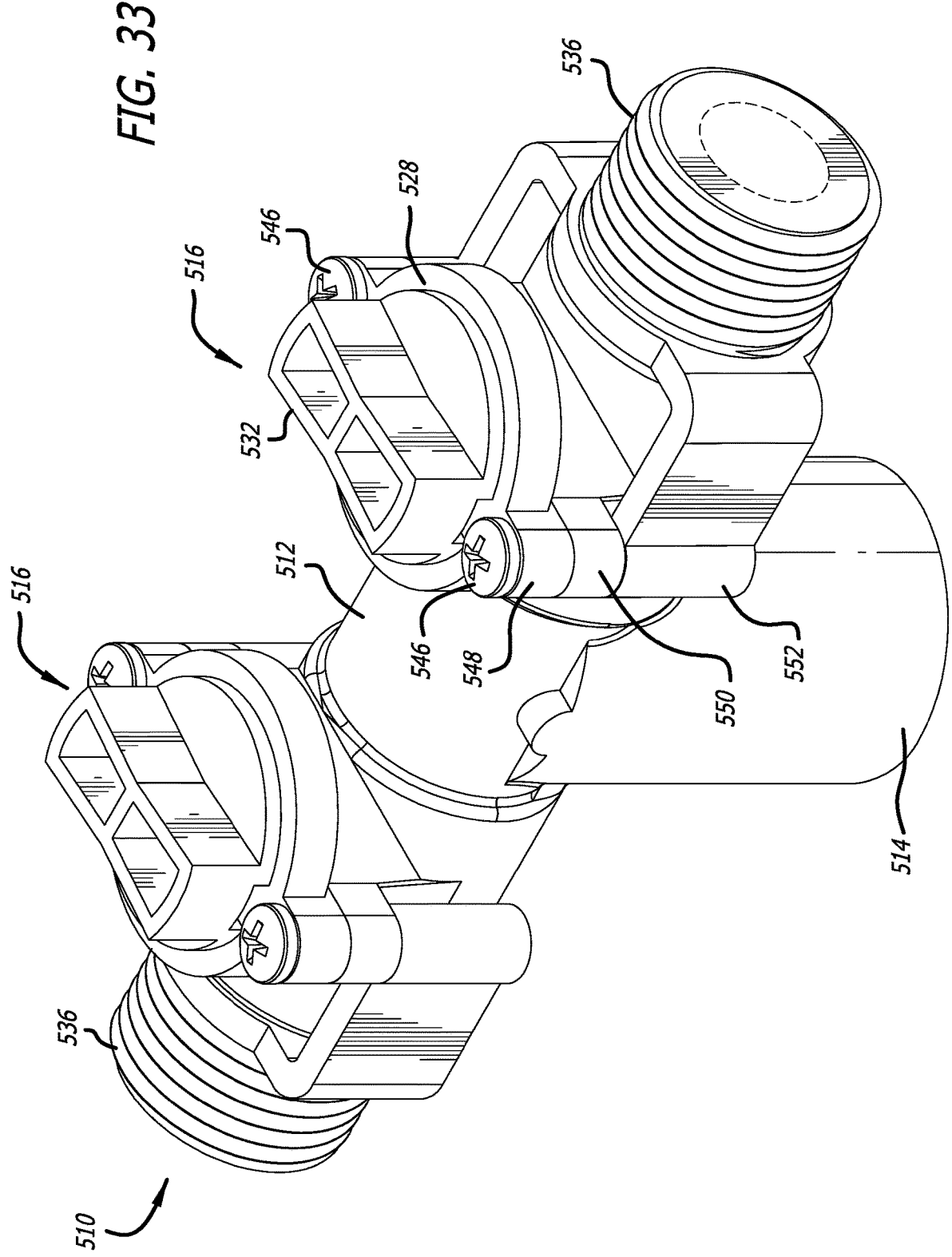
FIG. 33 is a front, perspective view of a two-way ball valve with threaded outlets according to another preferred embodiment of the present invention.
Figure 34:
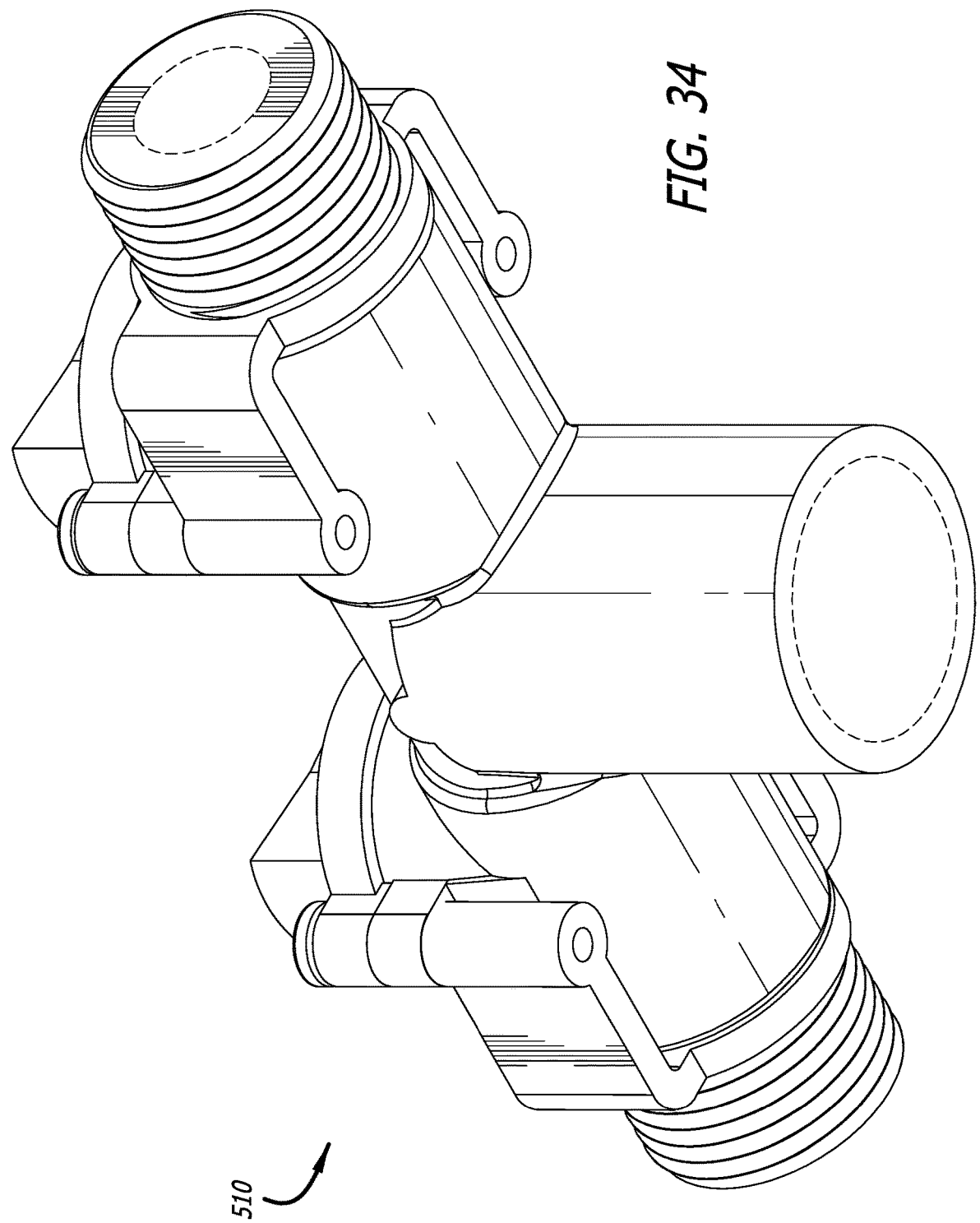
FIG. 34 is rear perspective view thereof.
Figure 35:
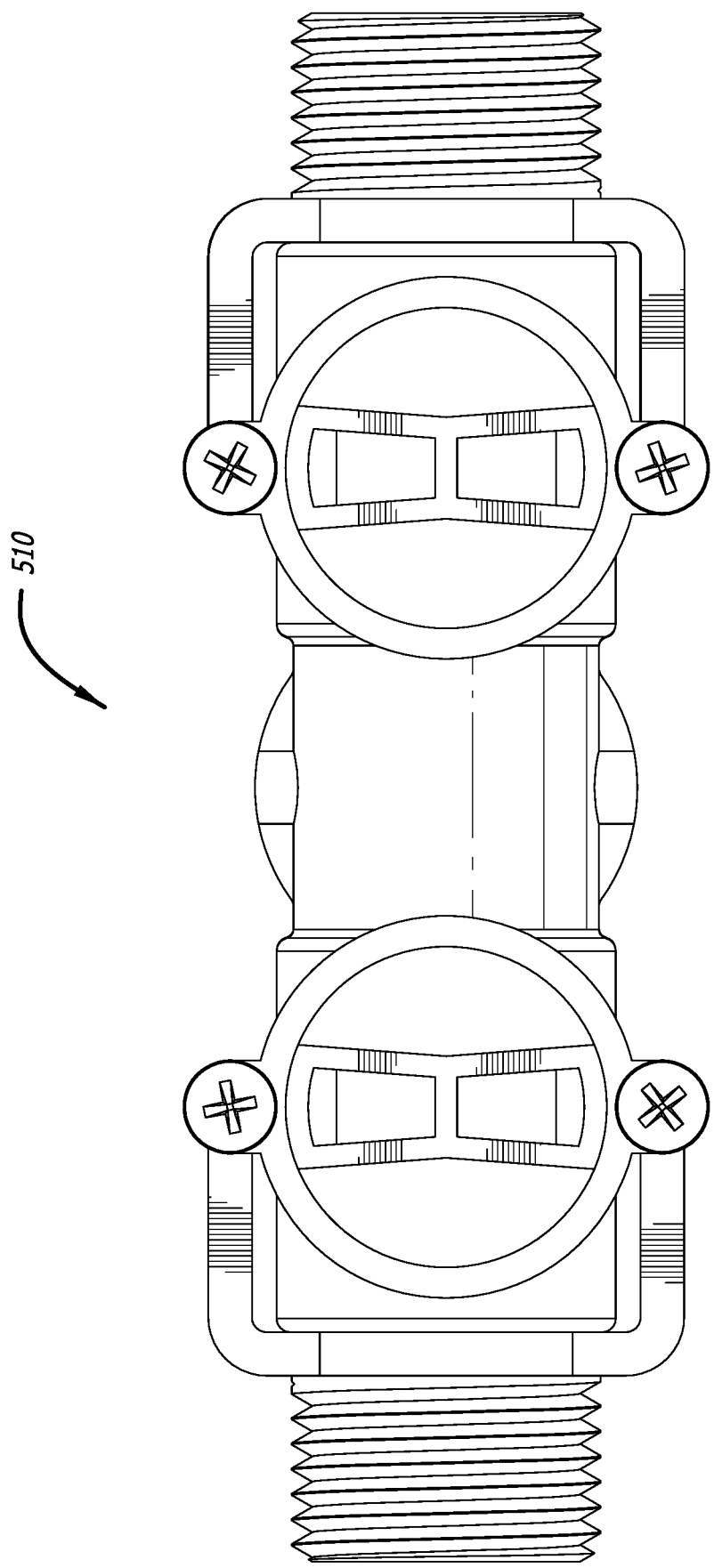
FIG. 35 is a top plan view thereof.
Figure 36:
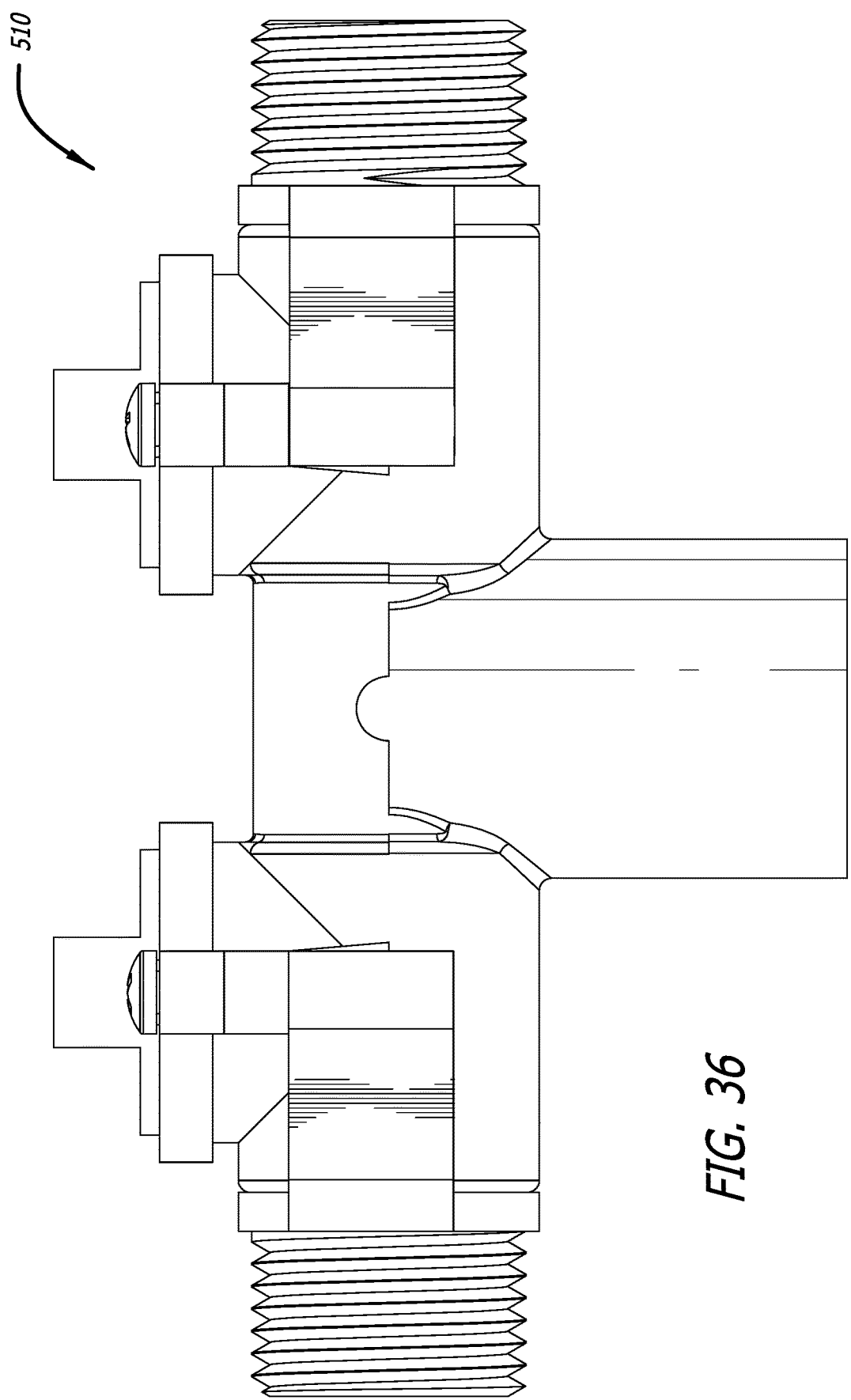
FIG. 36 is a left side elevational view thereof.
Figure 37:
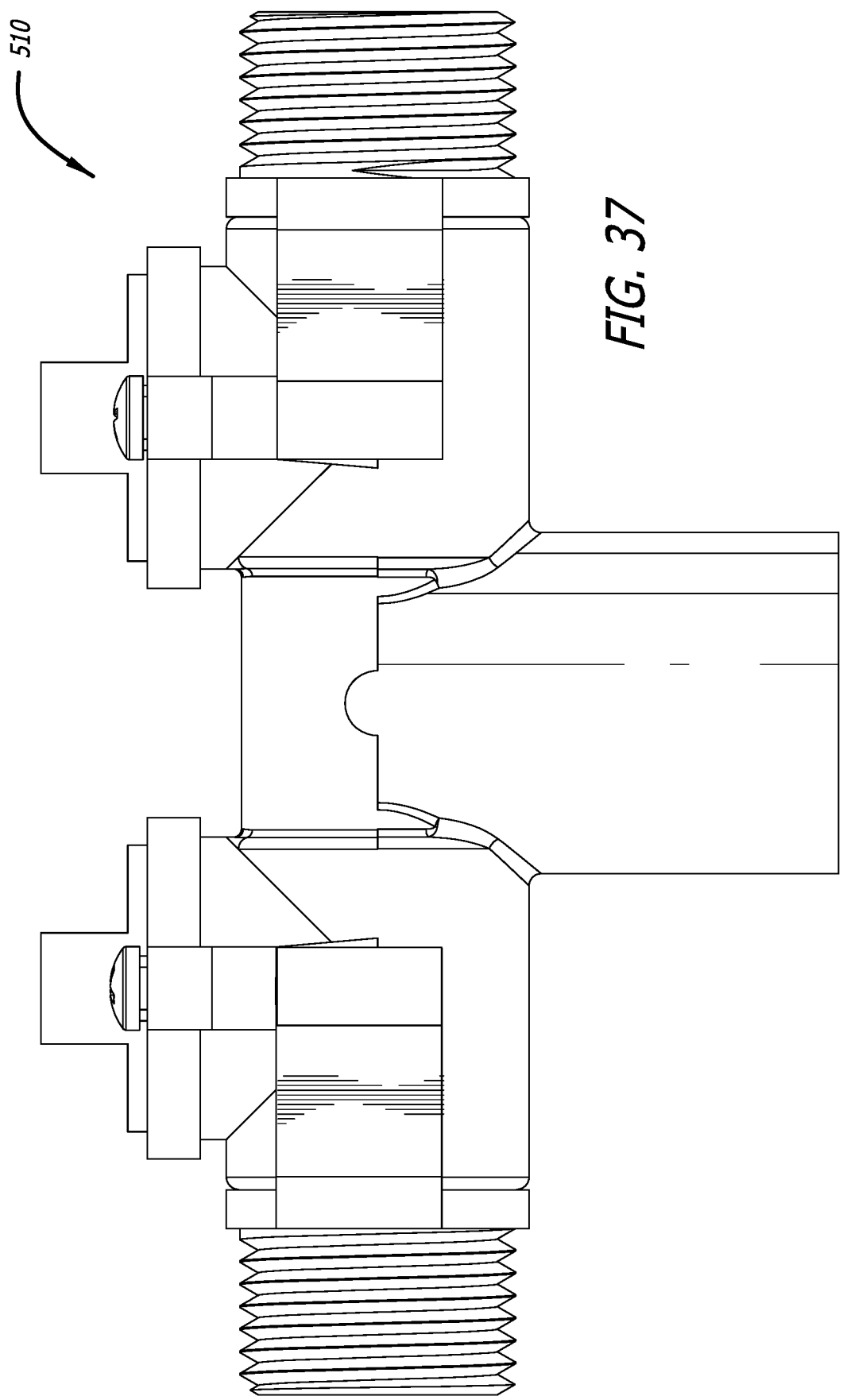
FIG. 37 is a right side elevational view thereof.
Figure 38:
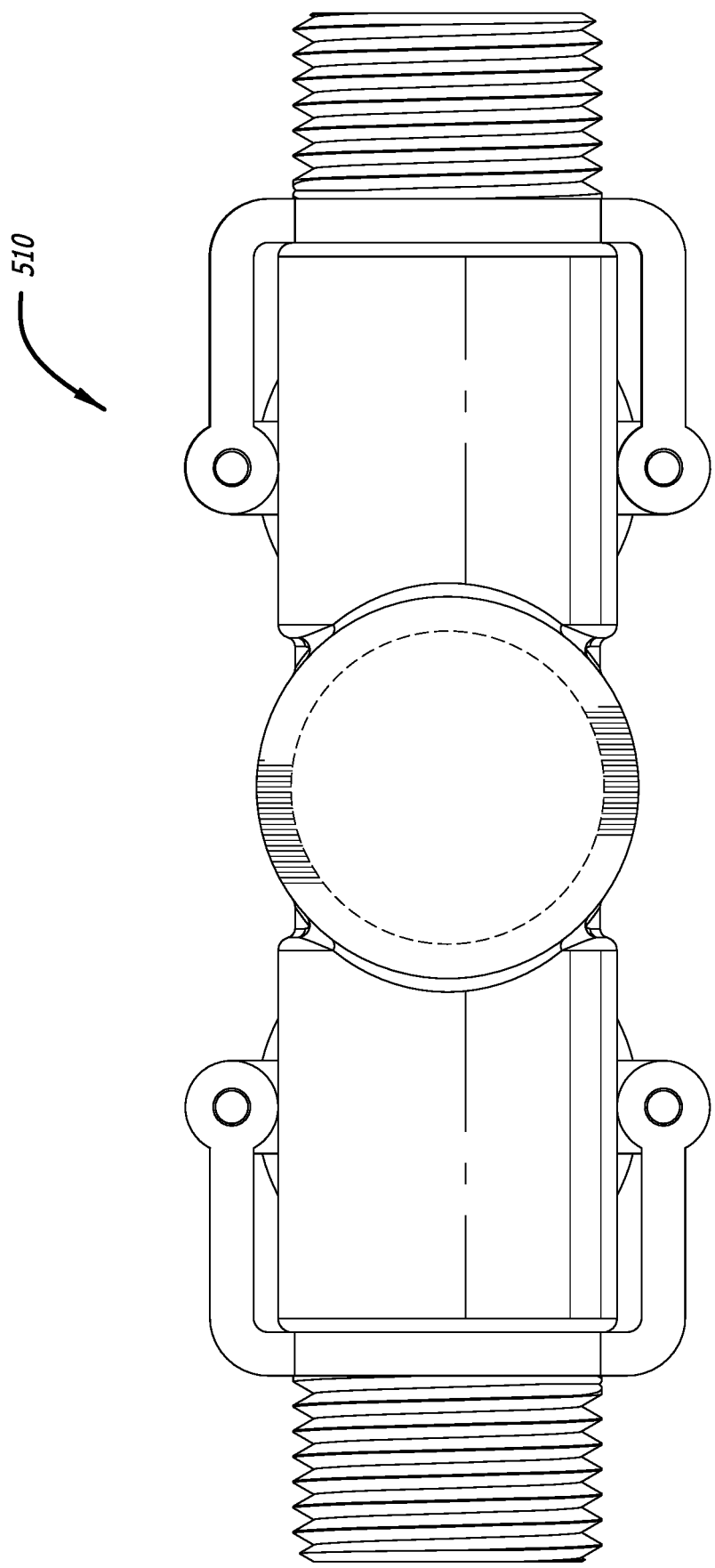
FIG. 38 is a bottom plan view thereof.
Figure 40:
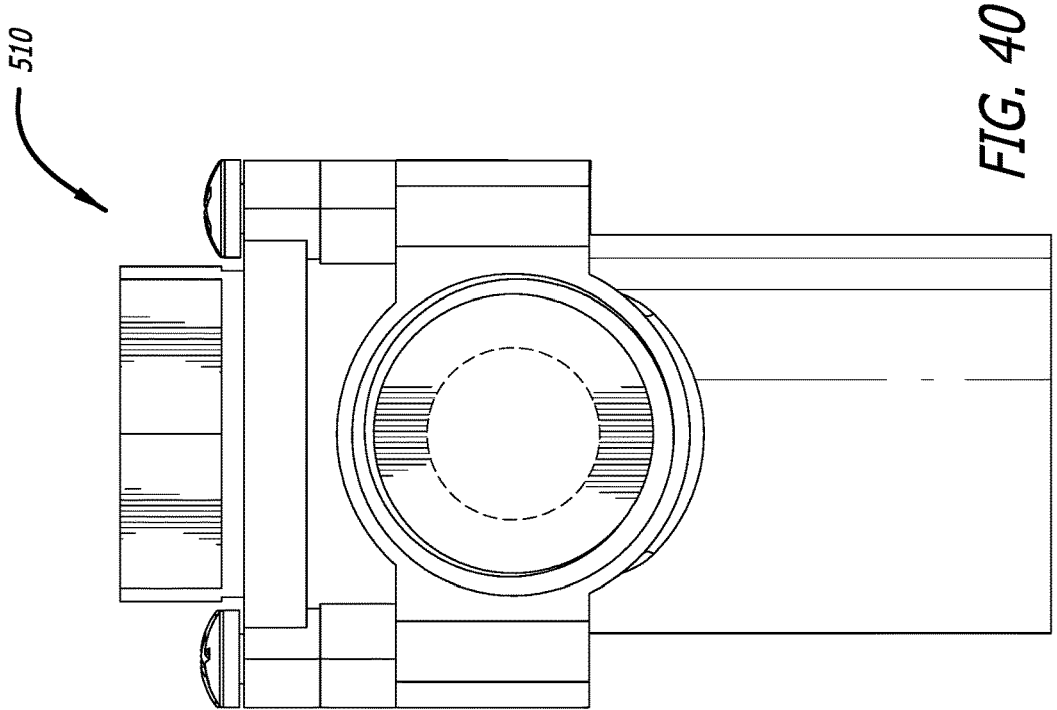
FIG. 40 is a rear side elevational view thereof.
Figure 39:
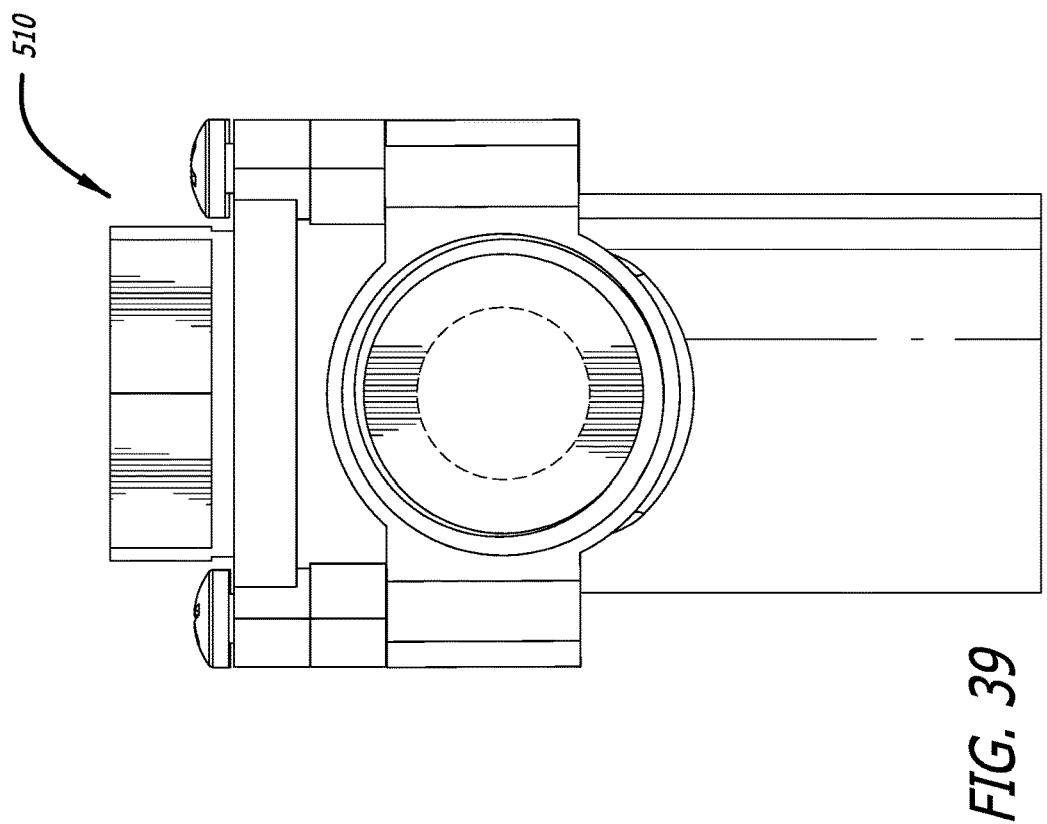
FIG. 39 is a front side elevational view thereof.
Figure 101:
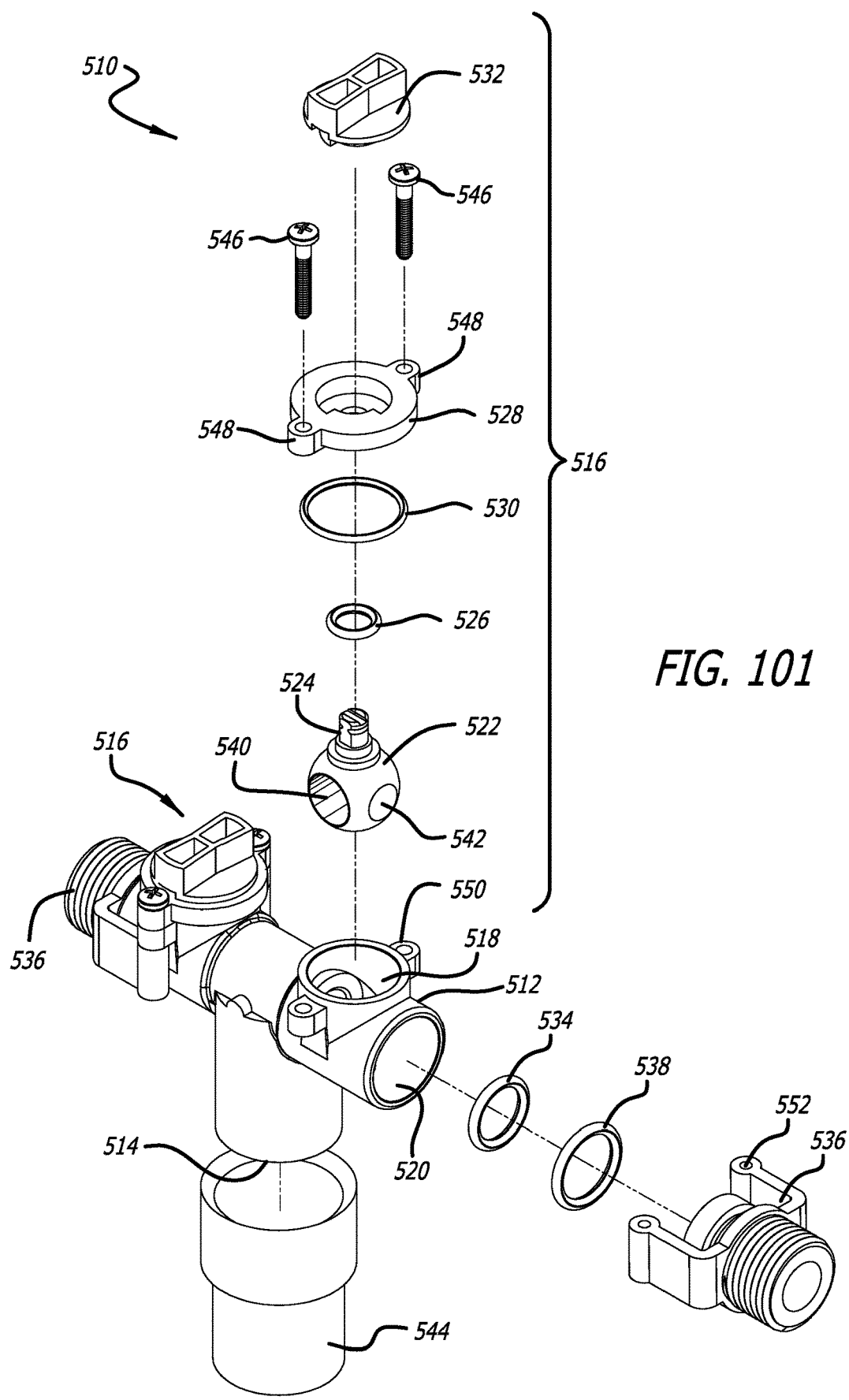
FIG. 101 is an exploded view of the two-way ball valve with threaded outlet of FIG. 33 further including a reducing coupler.

Referring to FIGS. 33-40 and 101, in accordance with a preferred embodiment of the present invention, a two way ball valve 510 is provided for controlling the flow of water to a drip hose 110.

The two way ball valve 510 includes a manifold 512 including a manifold inlet 514 configured to attach to a riser hose, and two valves 516 integrated with the manifold. Each valve 516 includes a top valve inlet 518 and a valve outlet 520. A ball 522 having a stem 524 is received inside each valve 516 through the top valve inlet, and a first inlet seal 526 is received on the stem of each ball. A cap 528 is attached to each valve 516 adjacent to the top valve inlet, and a second inlet seal 530 is received by each cap adjacent to each ball. A handle 532 is attached to each cap opposite each second inlet seal, and the handle receives each stem of each ball. A first outlet seal 534 is also received in each valve outlet.

Figure 42:
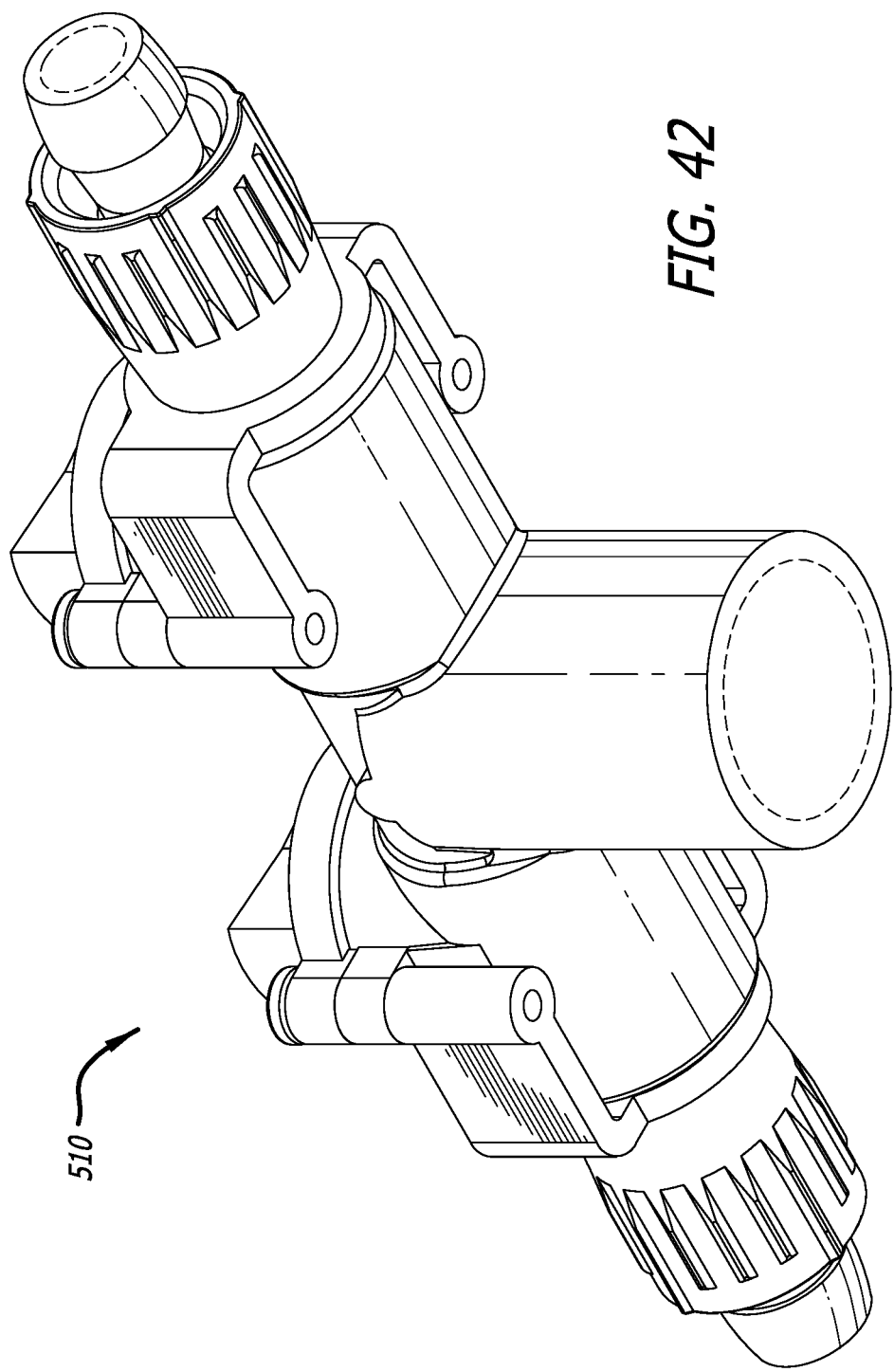
FIG. 42 is rear perspective view thereof.
Figure 43:
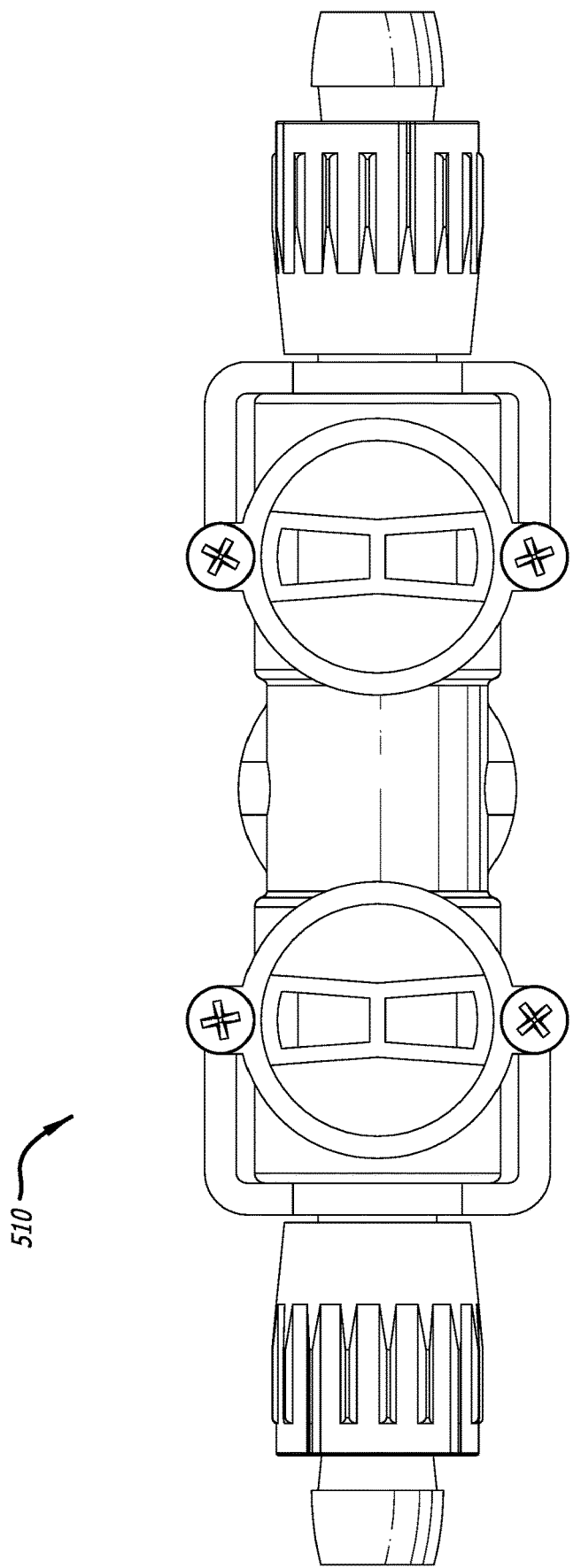
FIG. 43 is a top plan view thereof.
Figure 44:
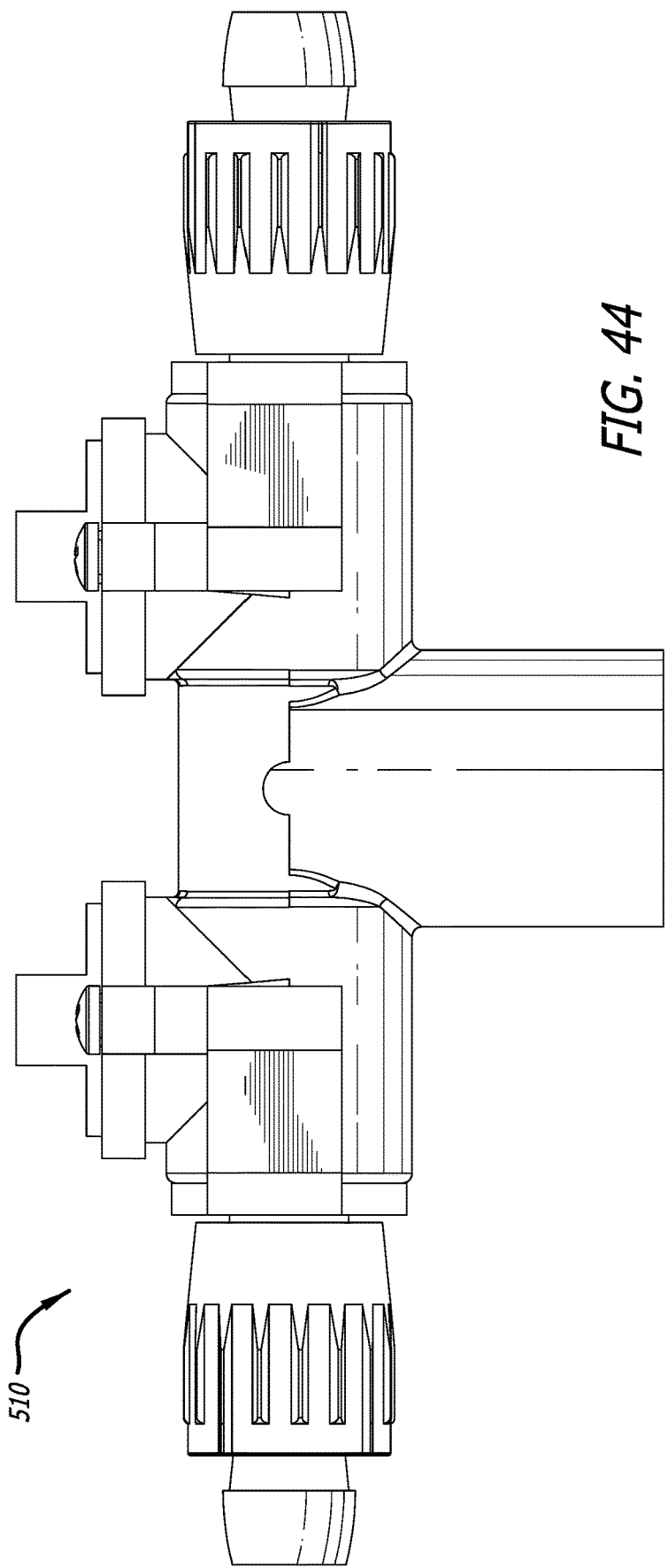
FIG. 44 is a left side elevational view thereof.
Figure 45:
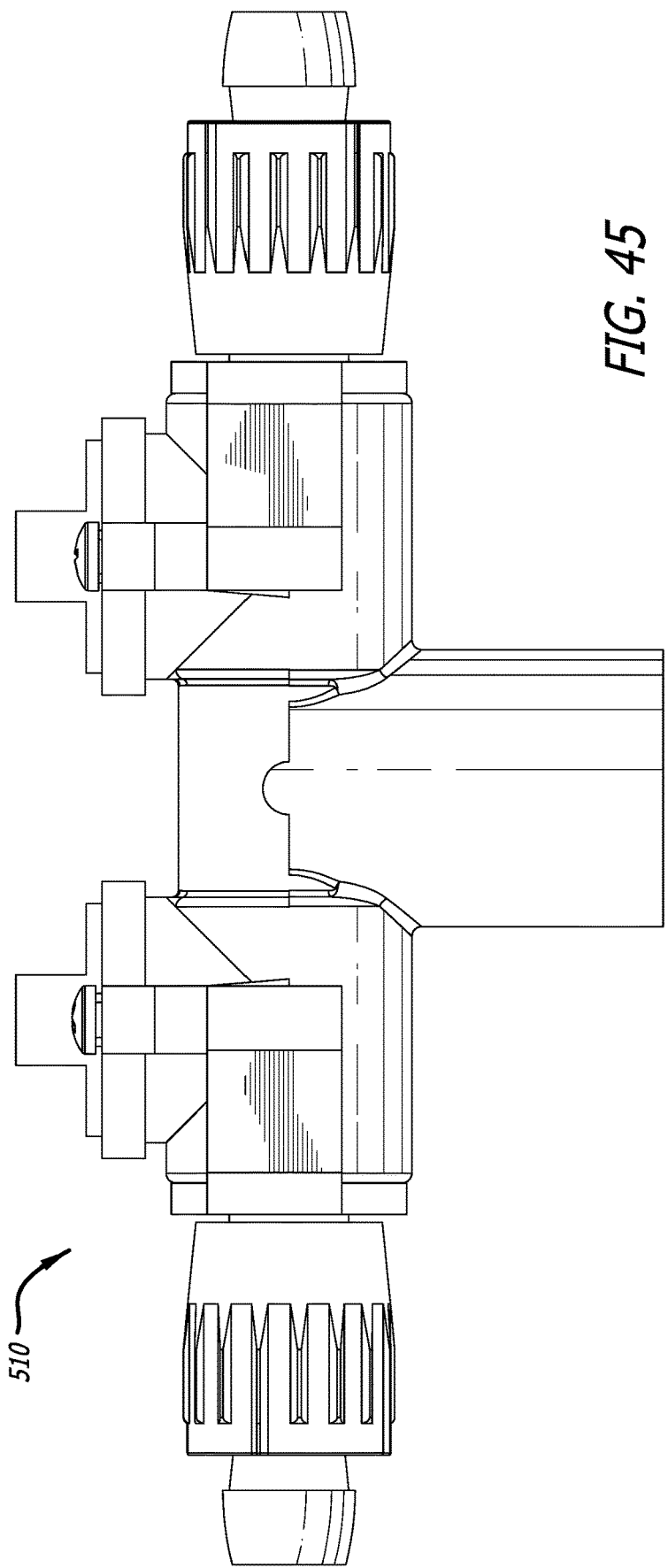
FIG. 45 is a right side elevational view thereof.
Figure 46:
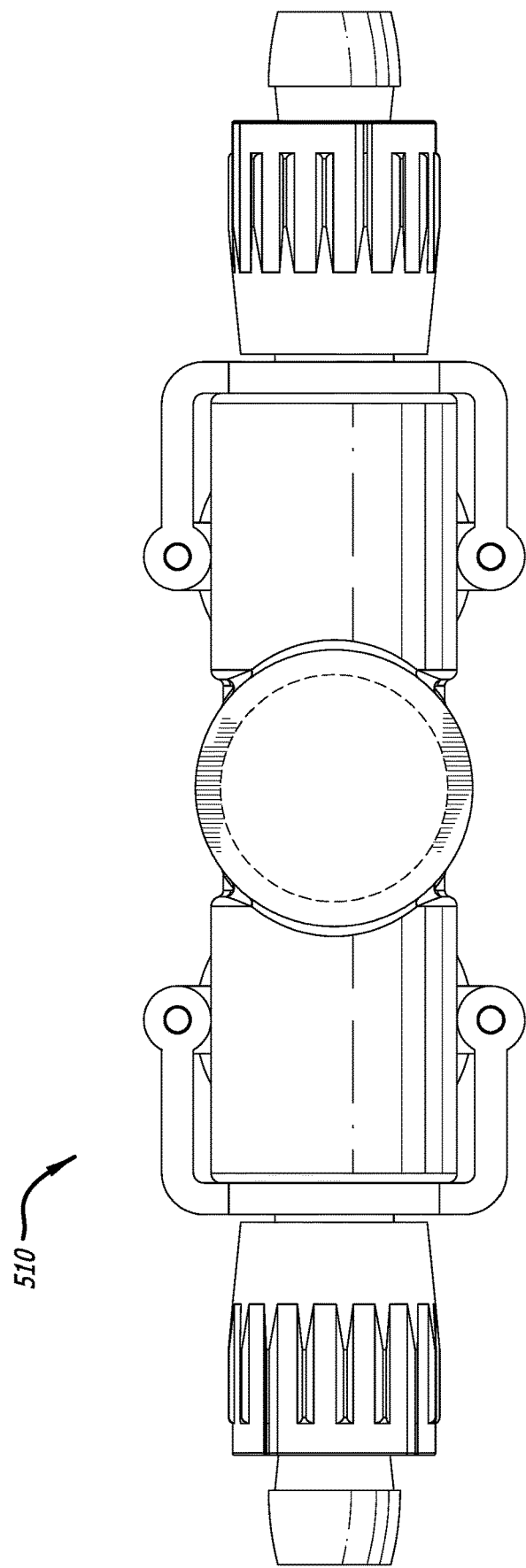
FIG. 46 is a bottom plan view thereof.
Figure 48:
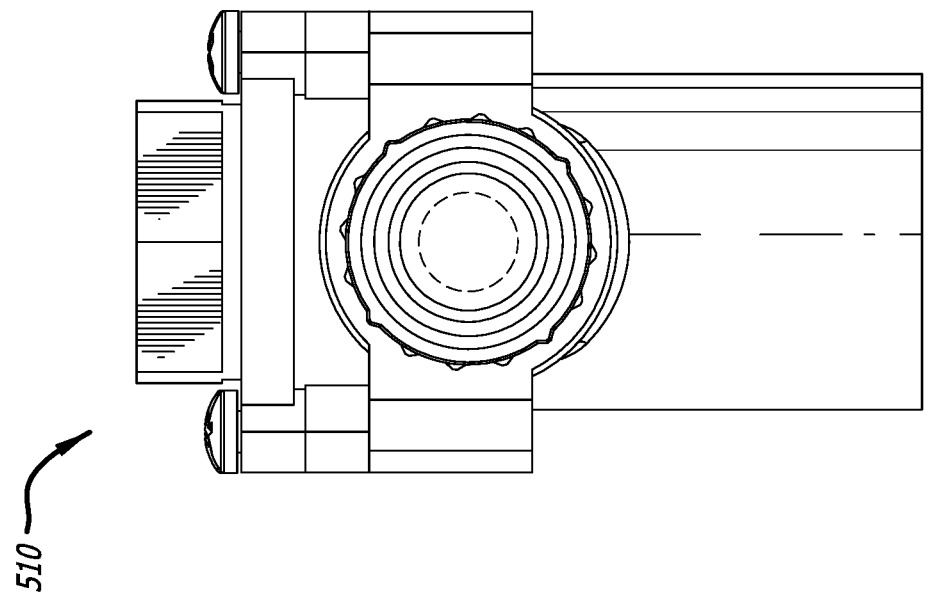
FIG. 48 is a rear side elevational view thereof.
Figure 47:
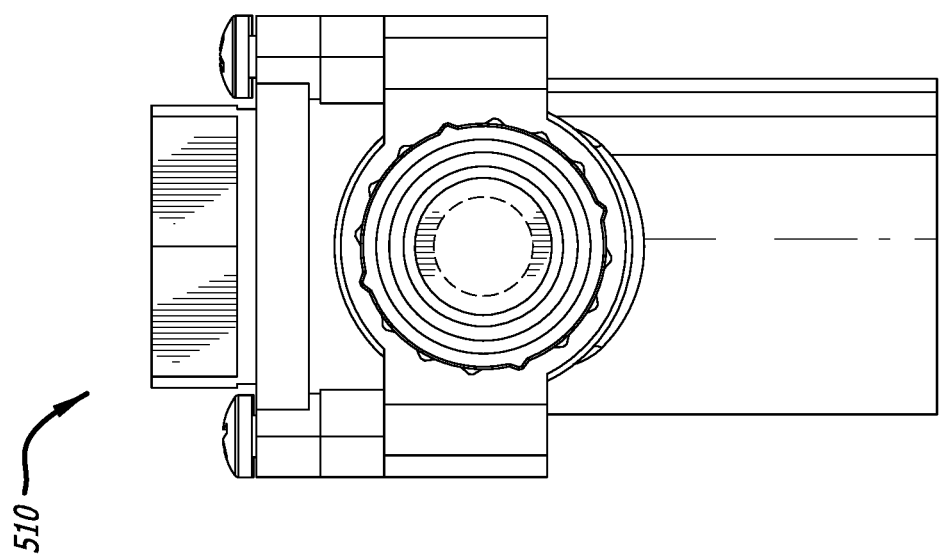
FIG. 47 is a front side elevational view thereof.
Figure 102:
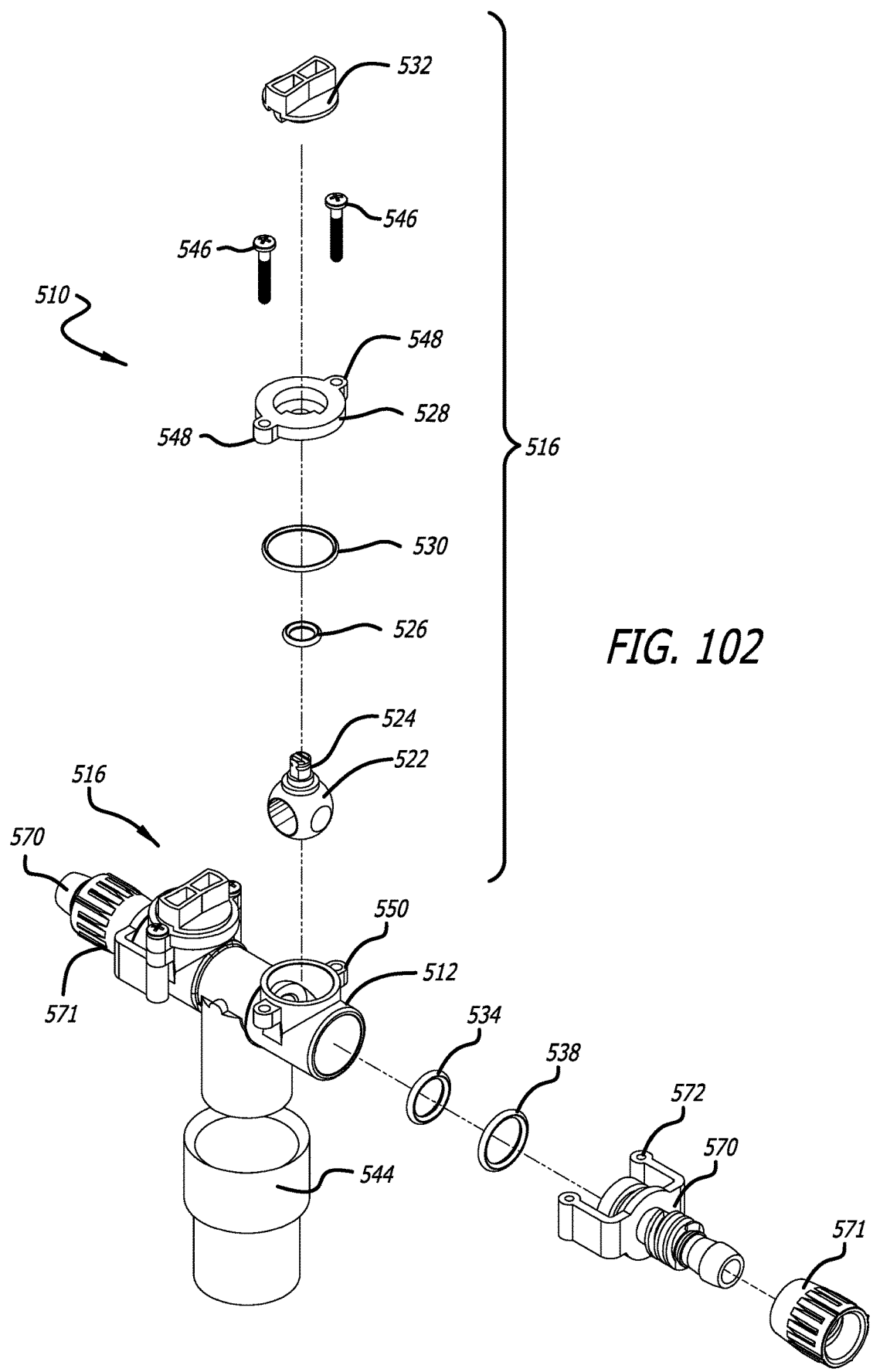
FIG. 102 is an exploded view of the two-way ball valve with tube outlet of FIG. 41 further including a reducing coupler.

An outlet fitting 536 is attached to each valve 516 adjacent to each valve outlet 520, and a second outlet seal 538 is received by each outlet fitting. In the preferred embodiment depicted herein, the outlet fitting is illustrated as a ¾" MHT threaded outlet, although other sizes and outlet types may be used according to user preference. For example, in the two way ball valve 510 illustrated in FIGS. 41-48 and 102, each threaded outlet fitting 536 has been switched out and replaced with a tube outlet fitting 570 and threaded outlet cap 571 in which each outlet fitting 570 is received.

In preferred aspects of the present invention, each ball 522 includes a through bore 540 allowing for bidirectional water flow through the valve, and includes a side 542 which abuts each first outlet seal 534. Moreover, each first inlet seal 526, second inlet seal 530, first outlet seal 534, and second outlet seal 538 can be O-rings or any type of seal known to one of ordinary skill in the art. Furthermore, the manifold inlet 514 can be attached directly to the riser hose, or indirectly attached to the riser hose through a reducing coupler 544.

In the preferred embodiment illustrated herein, the cap 528 is simultaneously fastened to the valve 516 and to the outlet fitting 536. In particular, each valve 516 includes two fasteners 546 such as screws, bolts, or the like. Each cap includes two flanges each having a cap aperture 548 configured to receive the fasteners 546. Each valve 516 further includes two flanges each having a valve aperture 550 correspondingly aligned with the cap apertures which also receive the fasteners 546. Additionally, each outlet fitting includes two flanges each having a fitting aperture 552 correspondingly aligned with the valve apertures which further receive the fasteners 546.

In this way, the ball valve 510 allows for each set of fasteners 546 to hold each cap 528 and outlet fitting 536 in place, while also allowing each outlet fitting to be easily replaced with other desired fittings. For example, each threaded outlet fitting illustrated herein may be replaced with the tube outlet fitting 570, which itself can be fastened to each ball valve 510 similarly through its own two flanges with fitting apertures 572. Additionally, the ball valve 510 thus facilitates repair of either the valves or outlet fittings in the field, since a user can simply unfasten one or more sets of screws 546 to repair a defective part therein. Although the preferred embodiment uses two screws inserted in three sets of flanges and apertures for each valve, any number of screws or other fasteners or fastening mechanisms can be used, for example threads, connecting pins, or the like.

Figure 50:
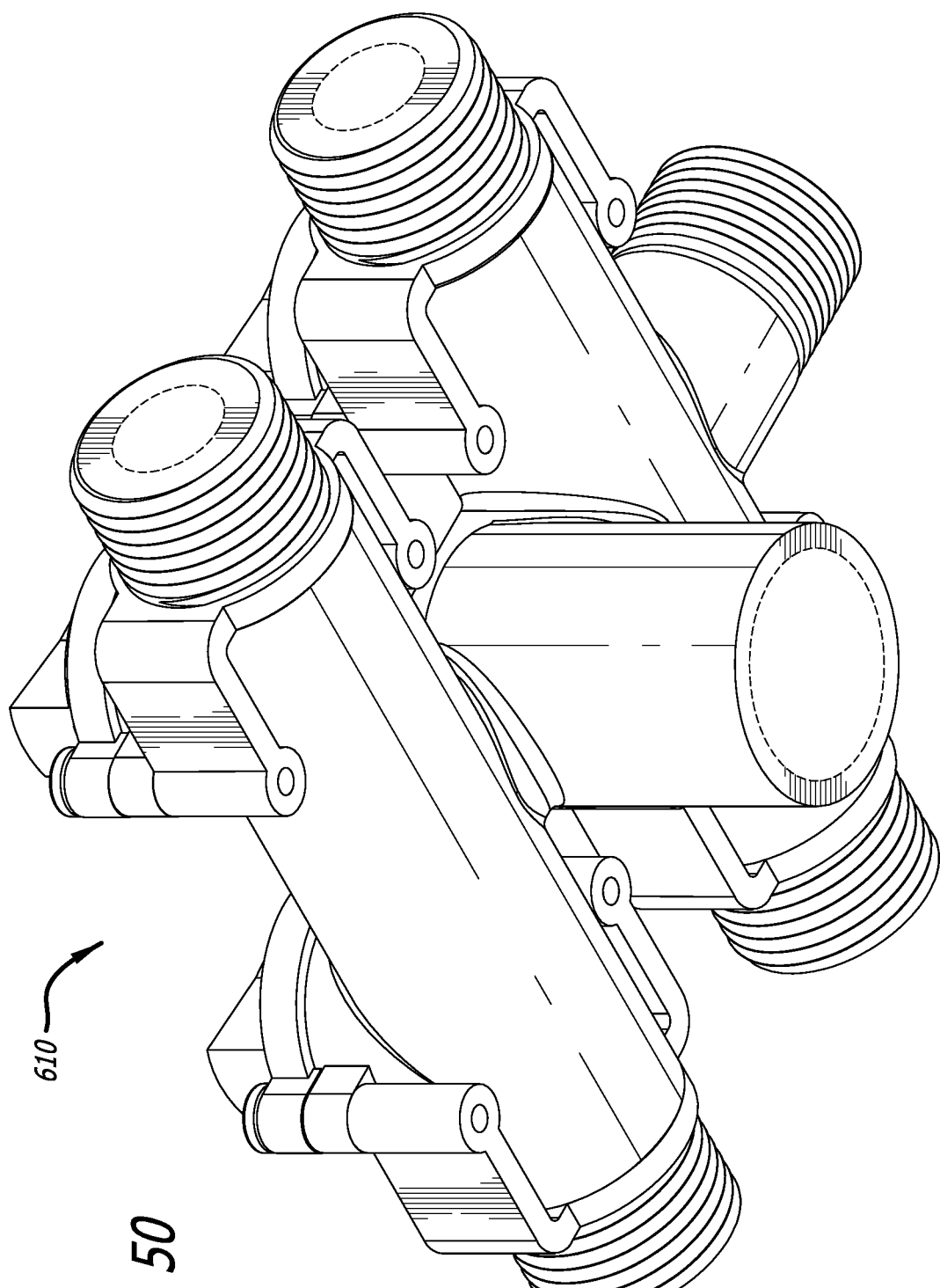
FIG. 50 is rear perspective view thereof.
Figure 51:
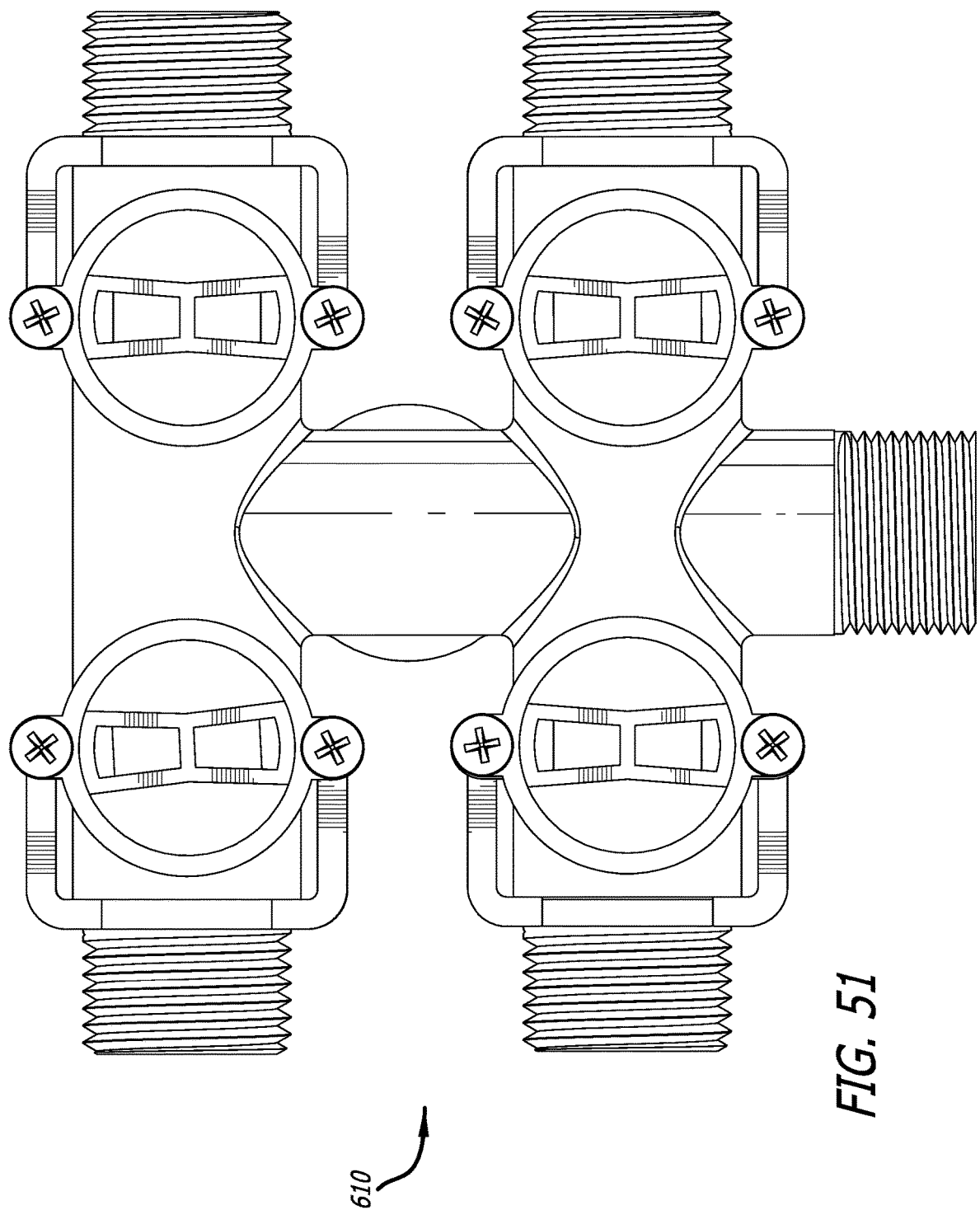
FIG. 51 is a top plan view thereof.
Figure 52:
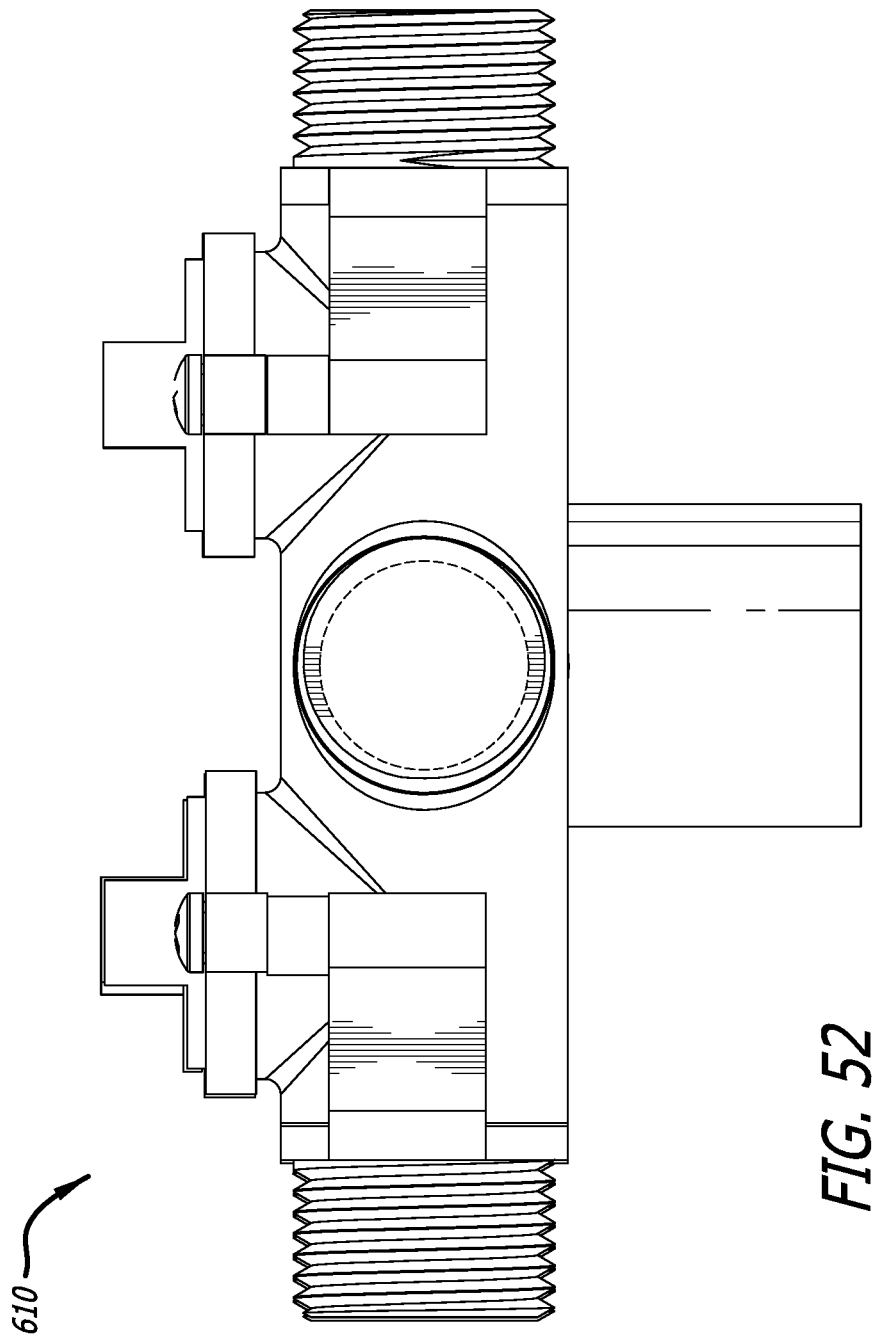
FIG. 52 is a left side elevational view thereof.
Figure 53:
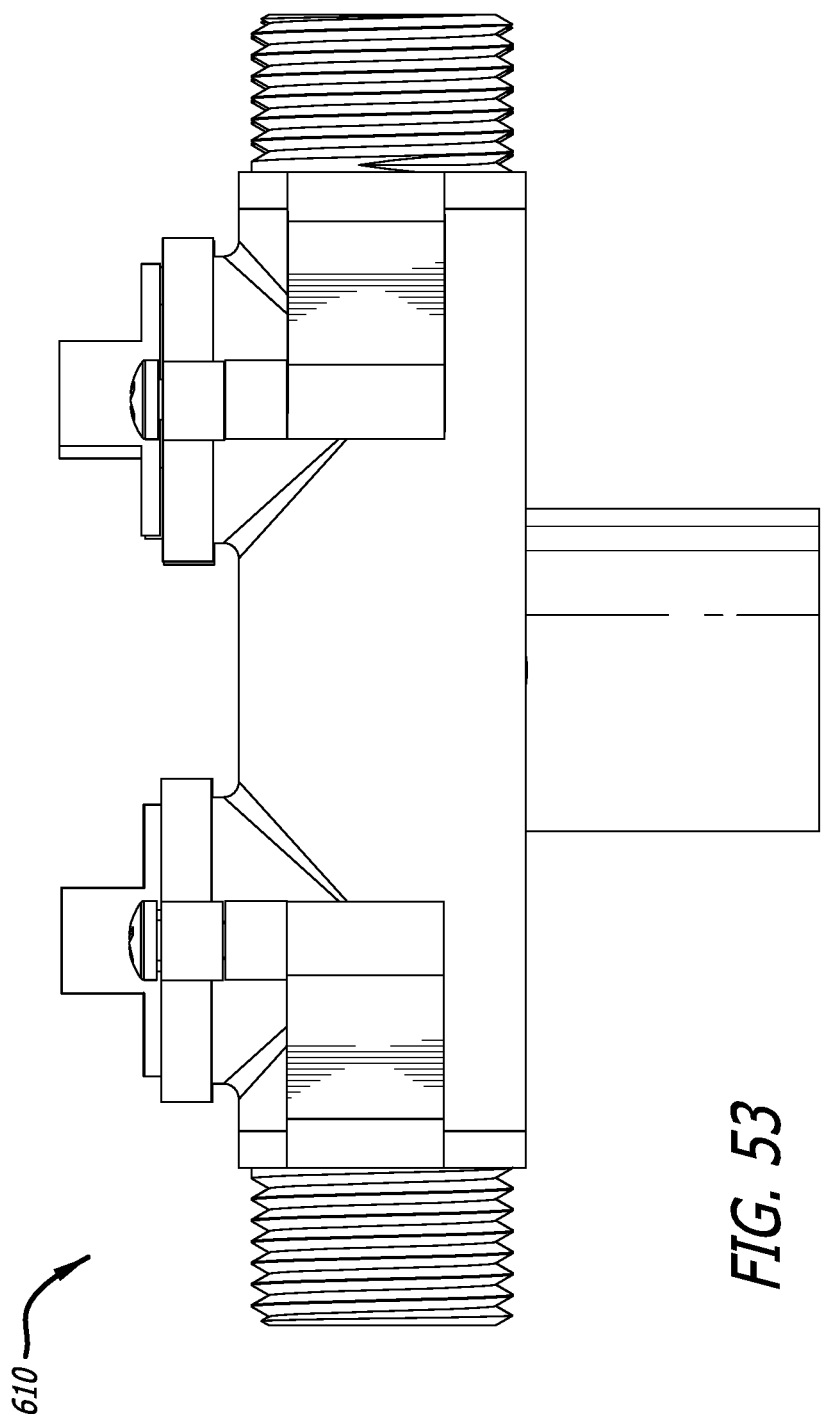
FIG. 53 is a right side elevational view thereof.
Figure 54:
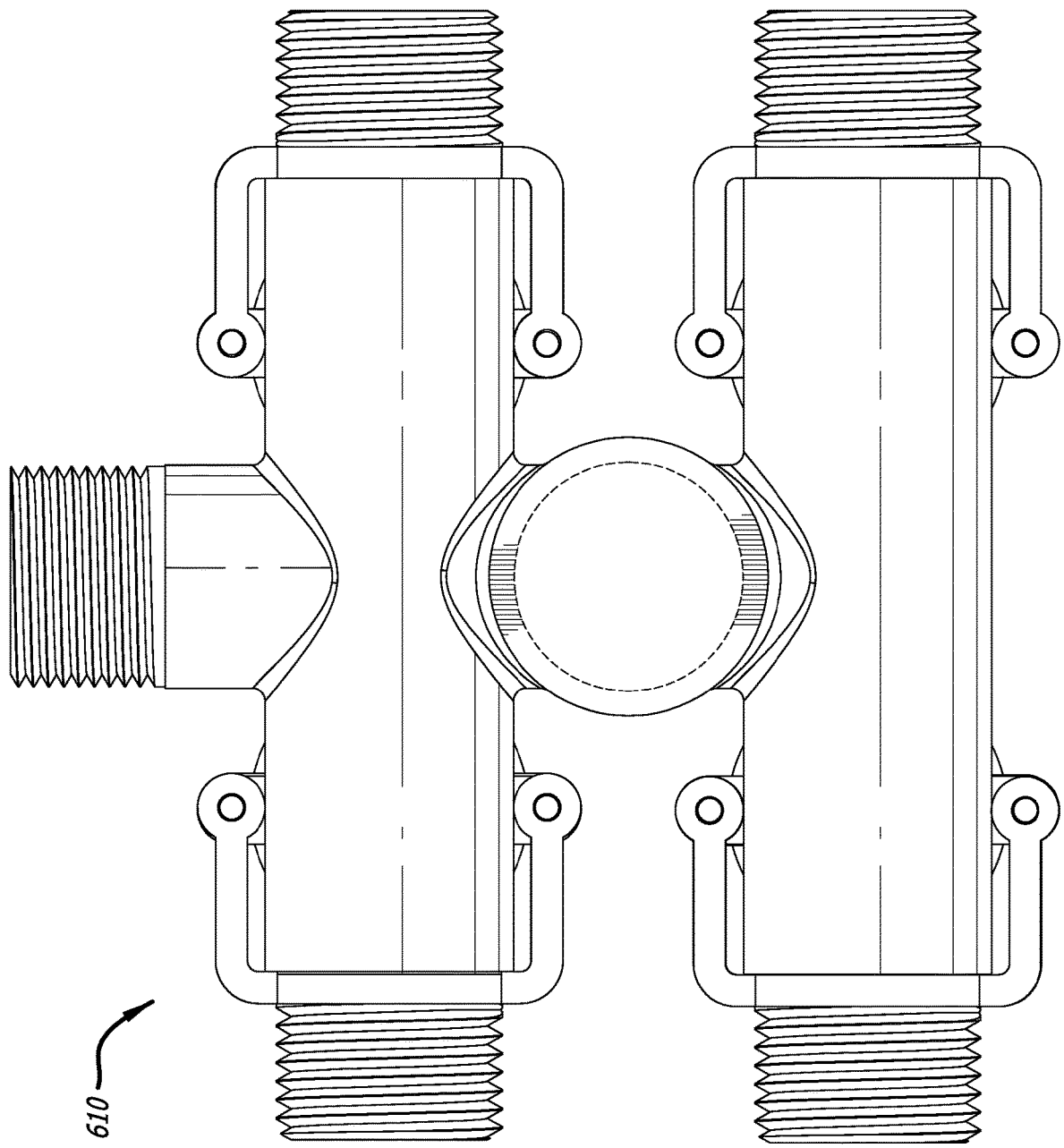
FIG. 54 is a bottom plan view thereof.
Figure 55:
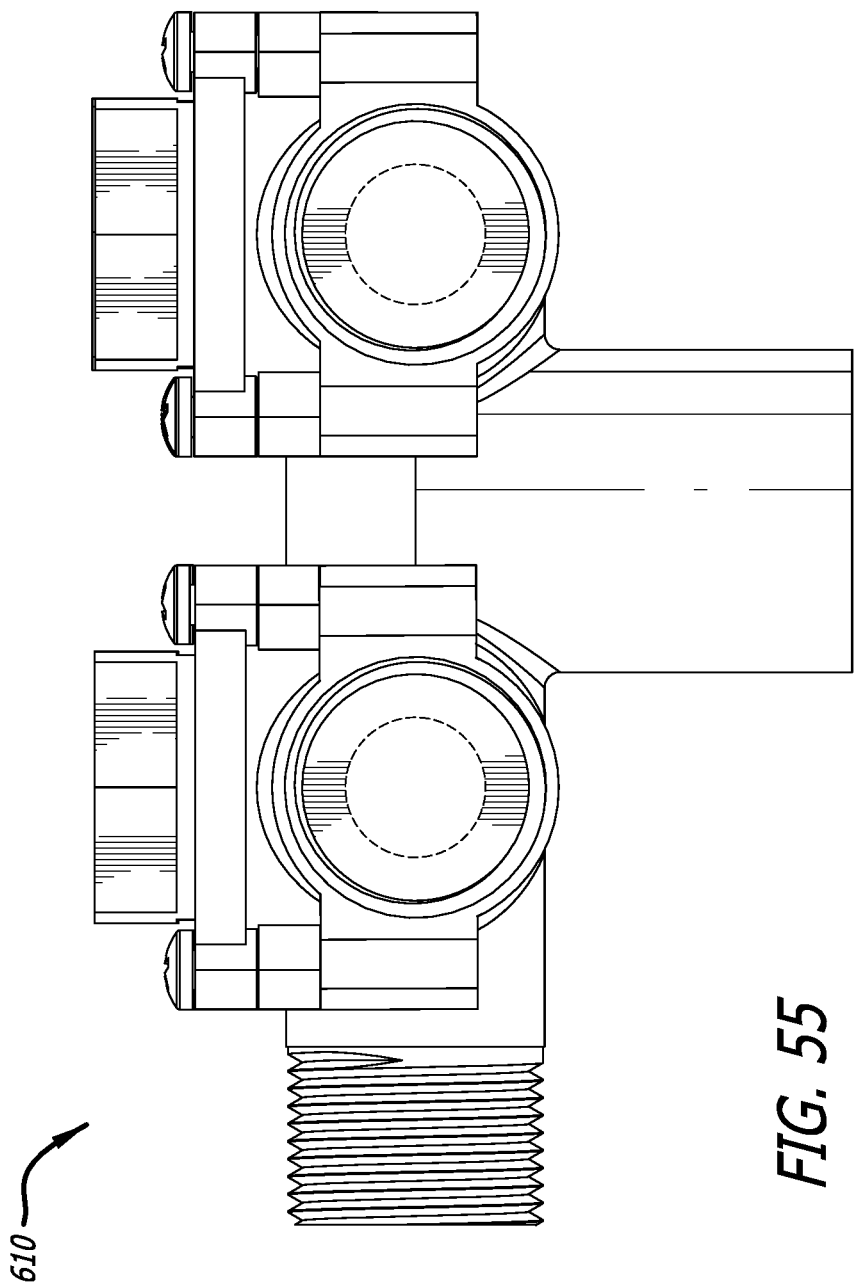
FIG. 55 is a front side elevational view thereof.
Figure 56:
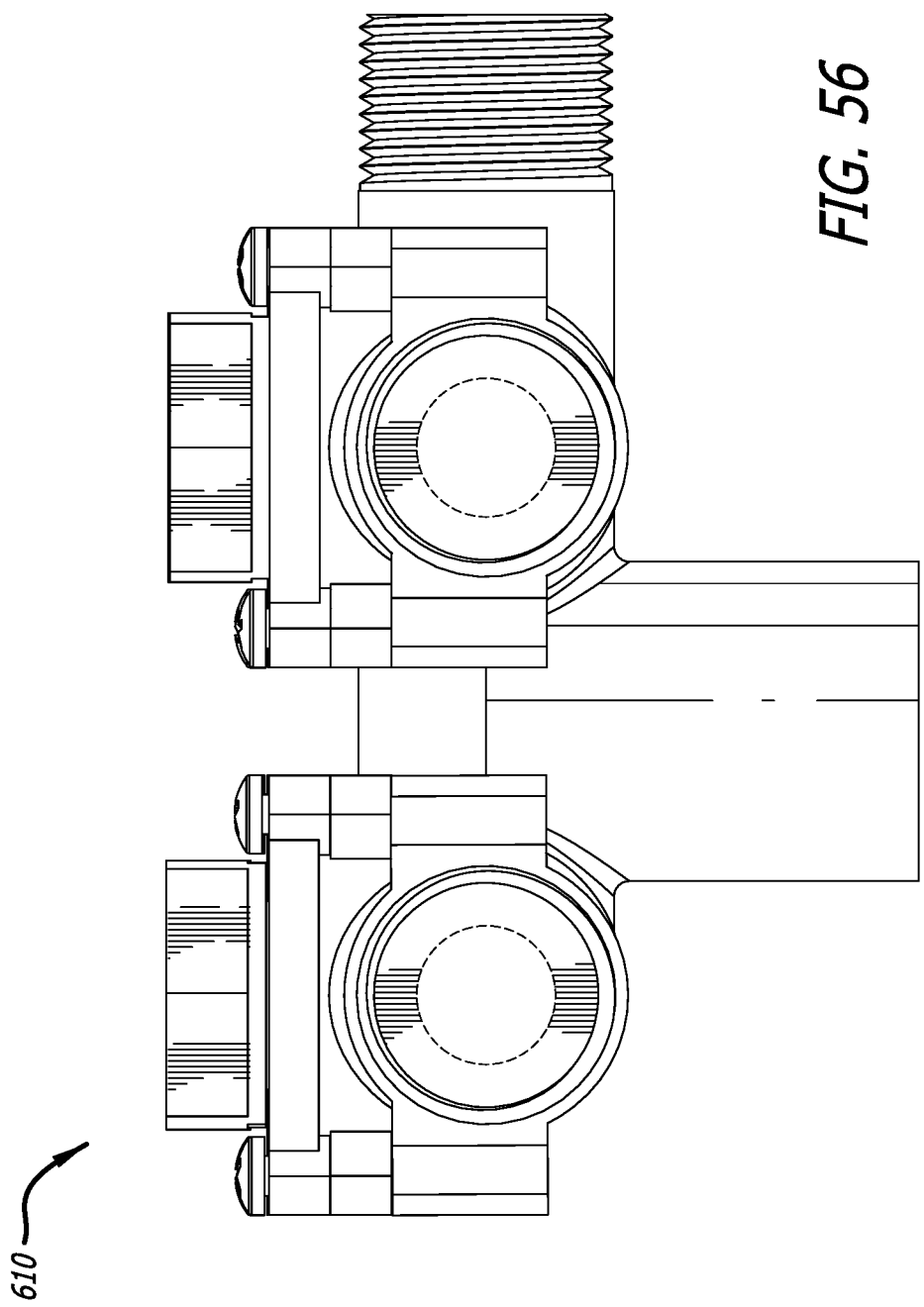
FIG. 56 is a rear side elevational view thereof.
Figure 103:
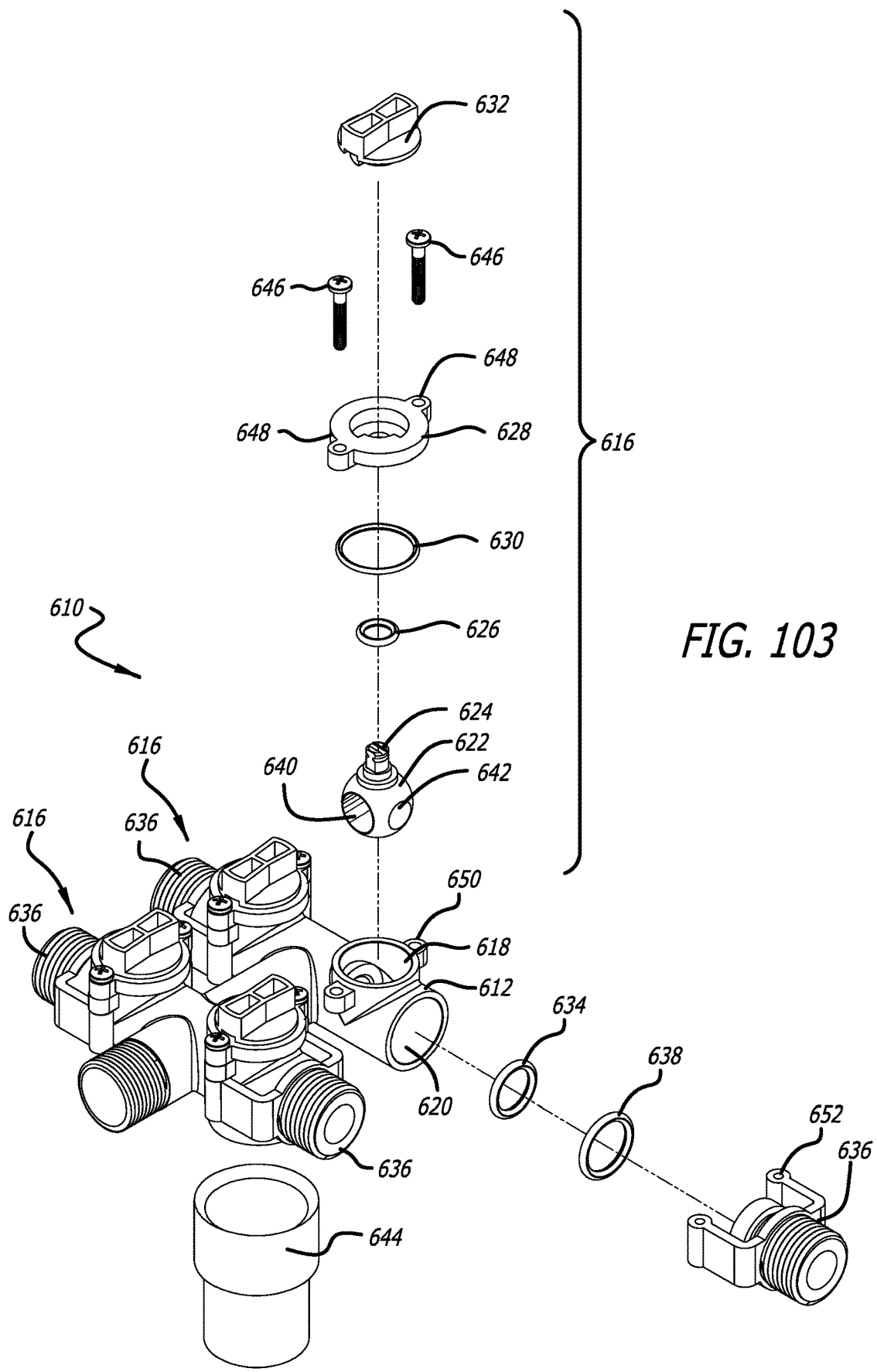
FIG. 103 is an exploded view of the four-way ball valve with threaded outlet of FIG. 49 further including a reducing coupler.

Referring to FIGS. 49-56 and 103, in accordance with a preferred embodiment of the present invention, a four way ball valve 610 is provided for controlling the flow of water to a drip hose 110.

The four way ball valve 610 includes a manifold 612 including a manifold inlet 614 configured to attach to a riser hose, and two valves 616 integrated with the manifold. Each valve 616 includes a top valve inlet 618 and a valve outlet 620. A ball 622 having a stem 624 is received inside each valve 616 through the top valve inlet, and a first inlet seal 626 is received on the stem of each ball. A cap 628 is attached to each valve 616 adjacent to the top valve inlet, and a second inlet seal 630 is received by each cap adjacent to each ball. A handle 632 is attached to each cap opposite each second inlet seal, and the handle receives each stem of each ball. A first outlet seal 634 is also received in each valve outlet.

Figure 57:
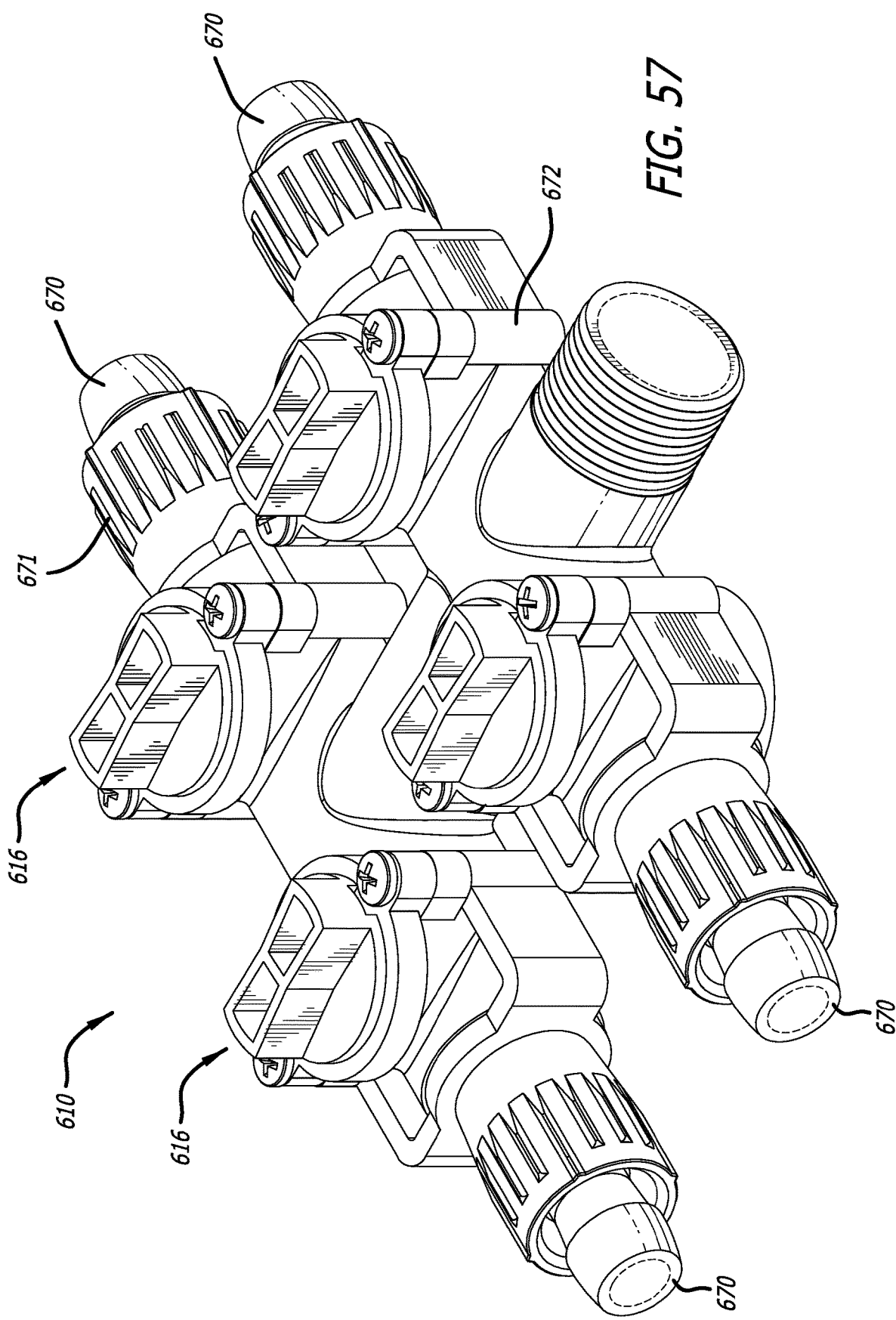
FIG. 57 is a front, perspective view of a four-way ball valve with tube outlets according to another preferred embodiment of the present invention.
Figure 58:
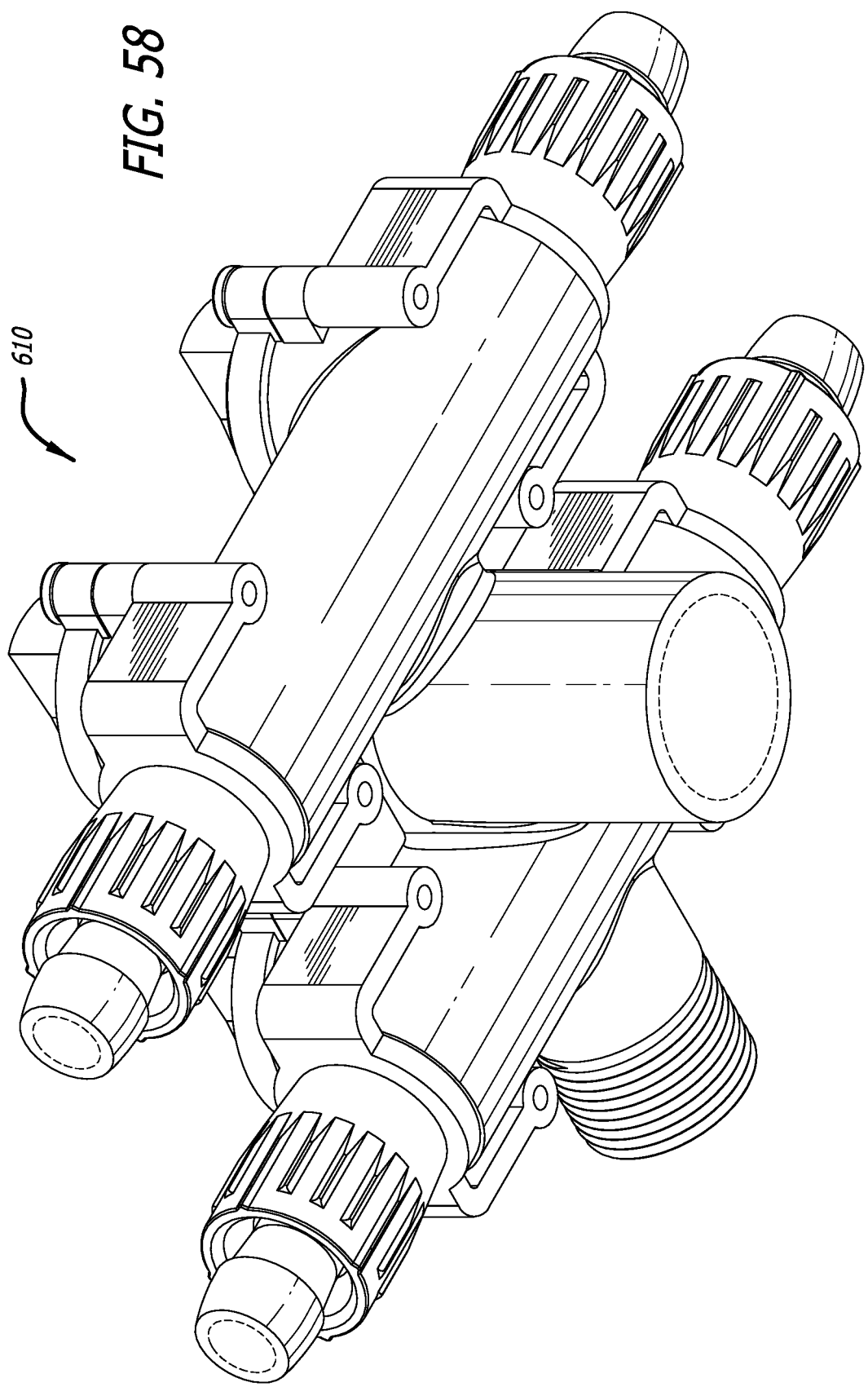
FIG. 58 is rear perspective view thereof.
Figure 59:
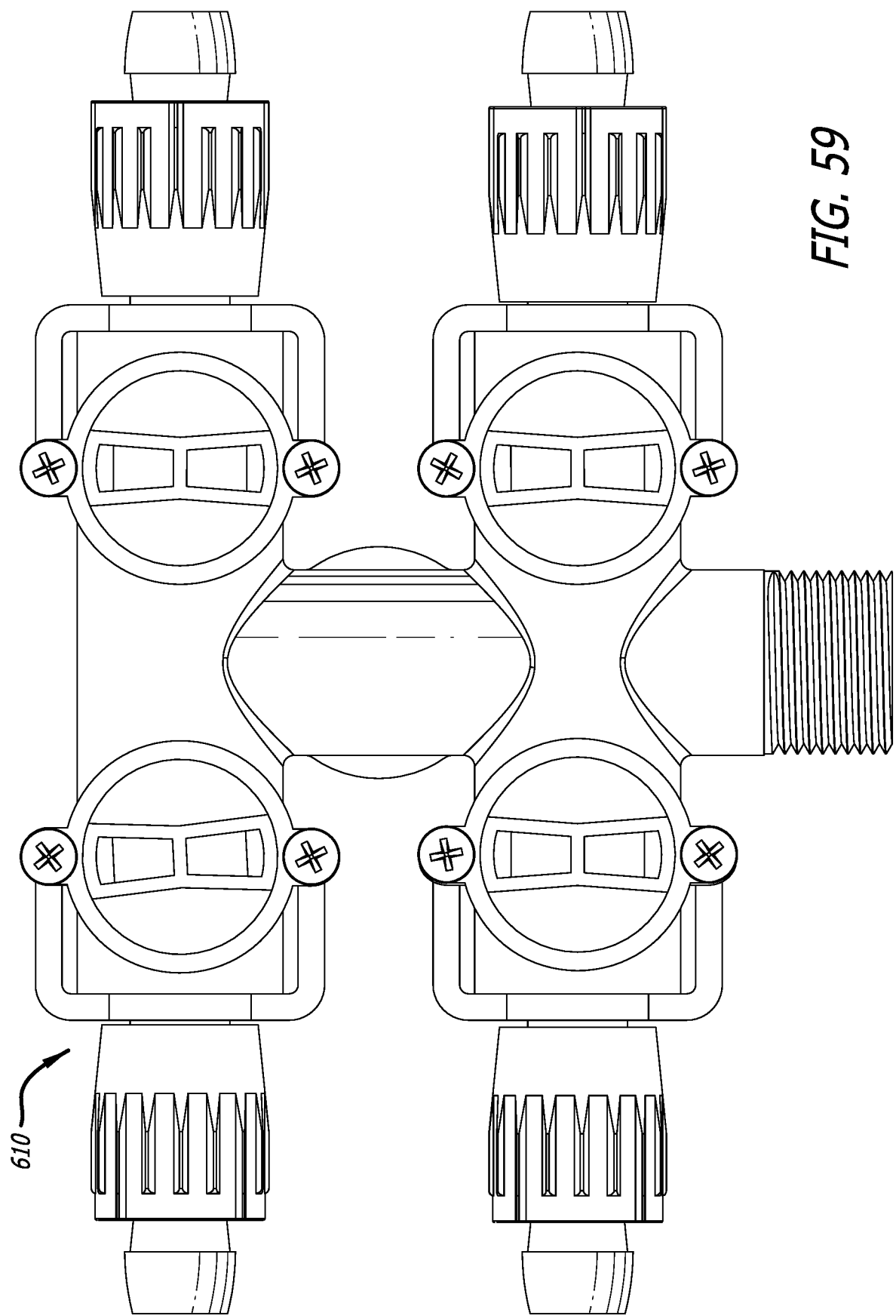
FIG. 59 is a top plan view thereof.
Figure 60:
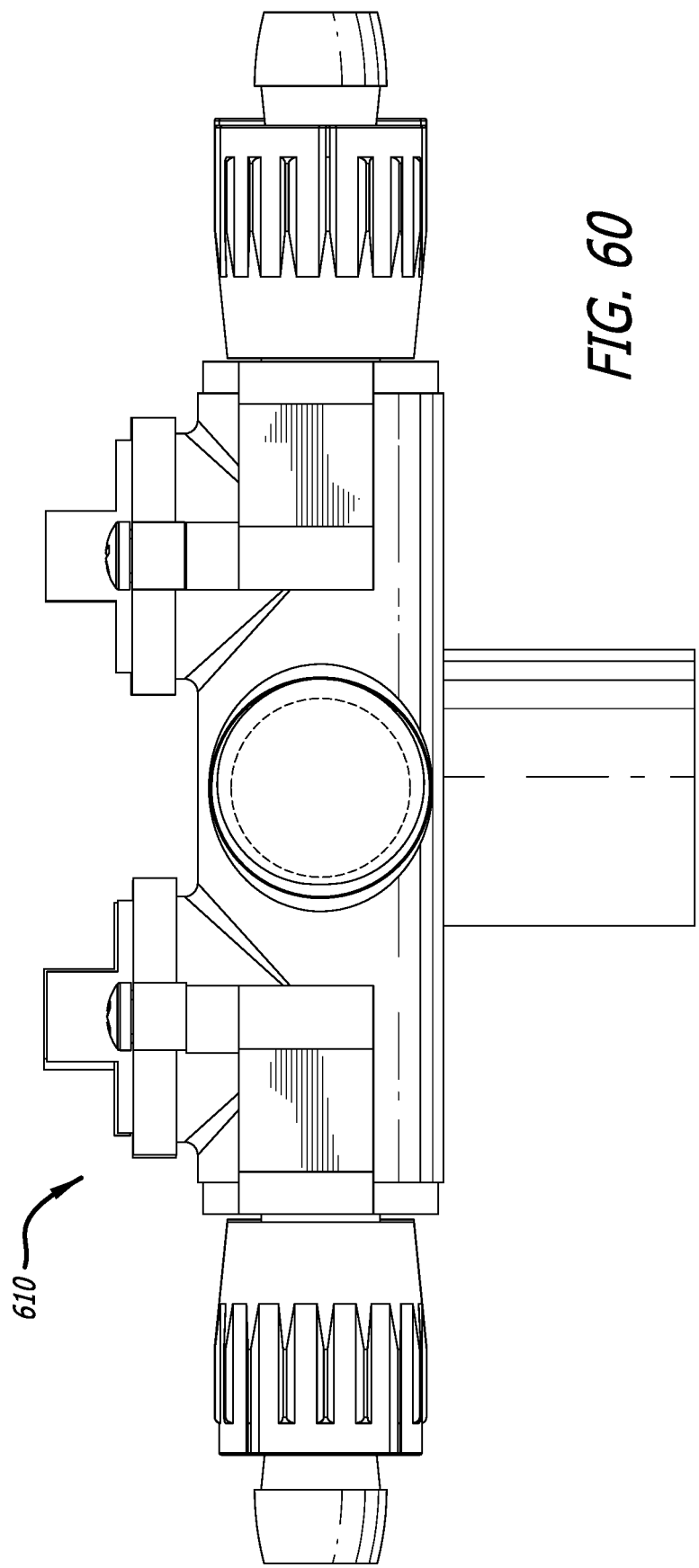
FIG. 60 is a left side elevational view thereof.
Figure 61:
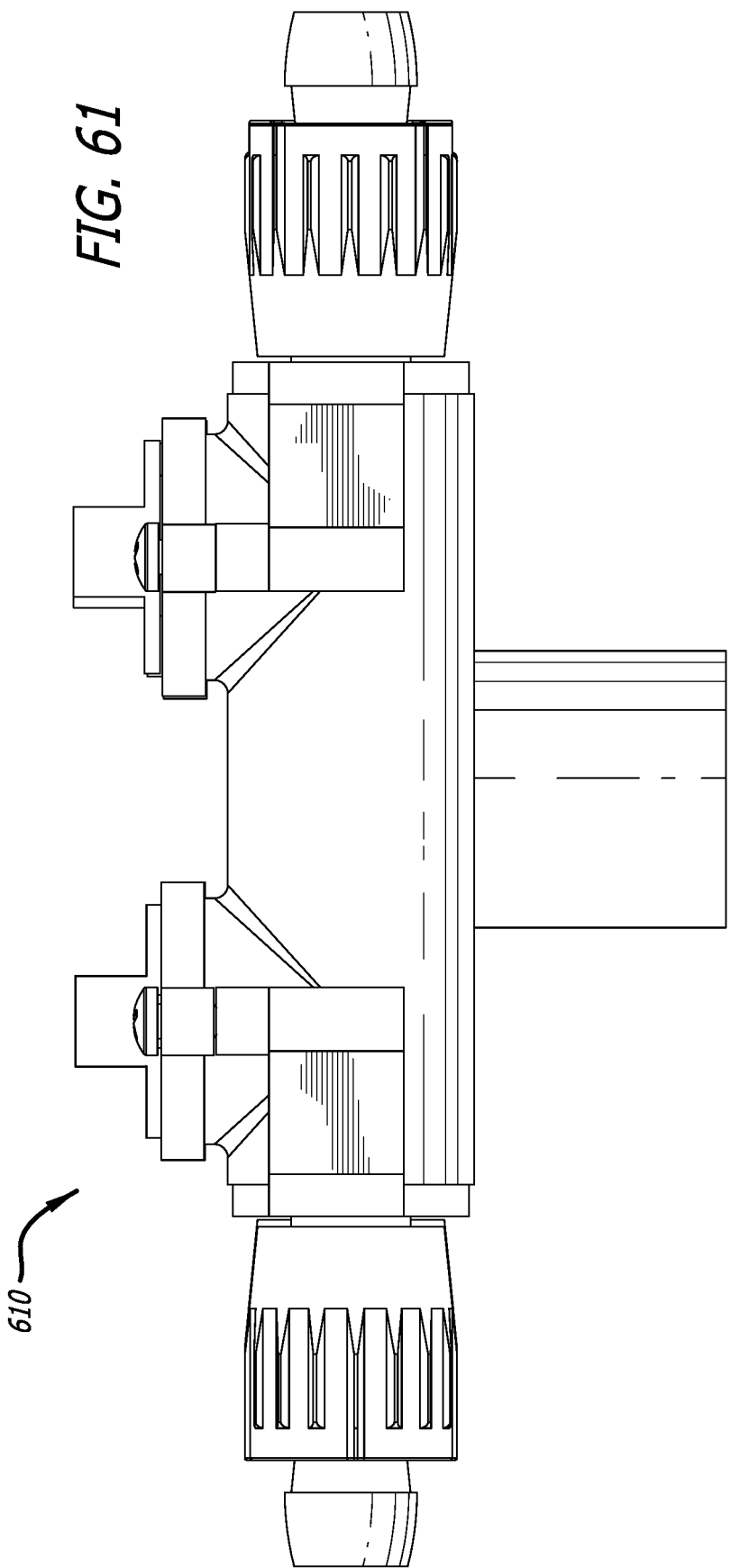
FIG. 61 is a right side elevational view thereof.
Figure 62:
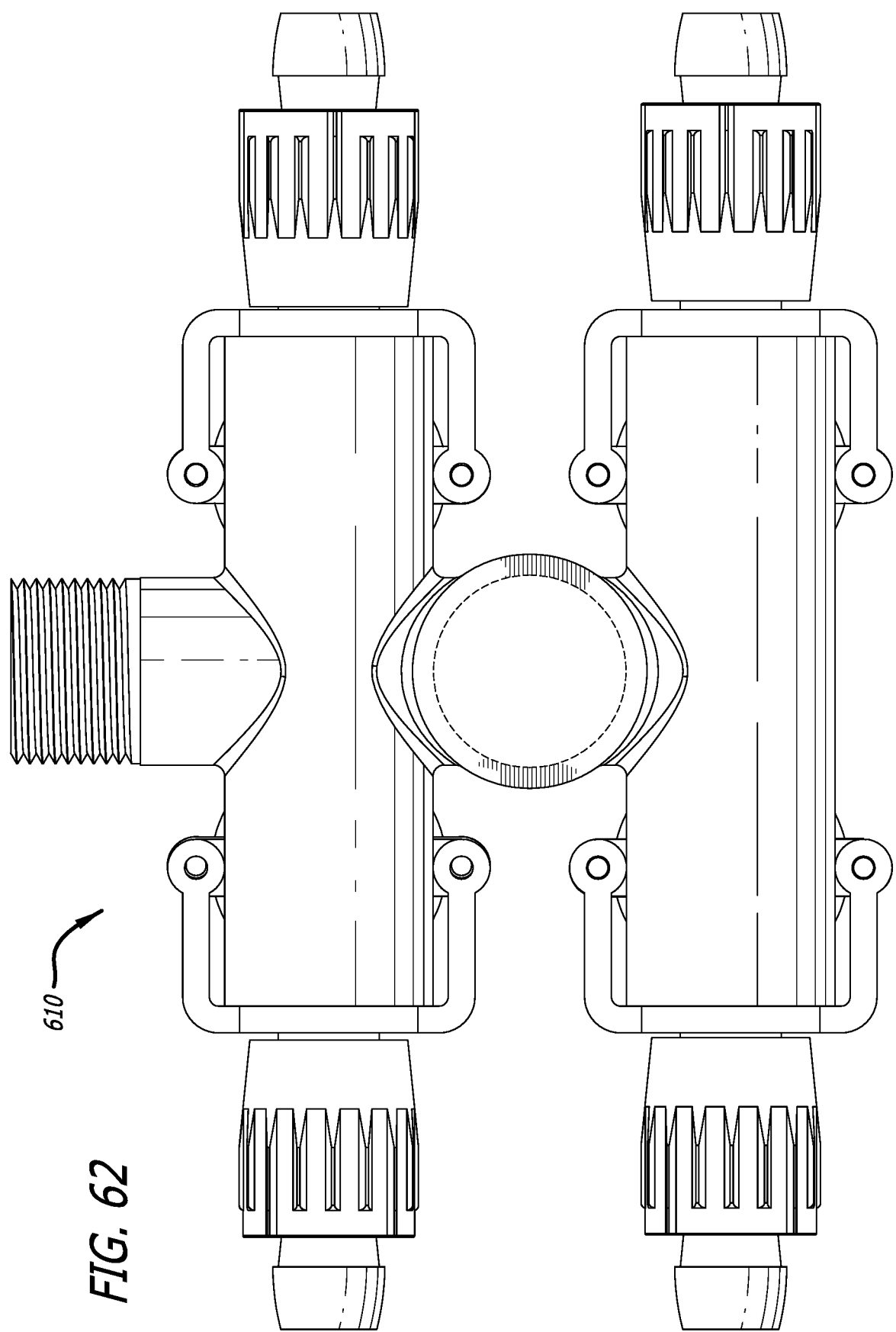
FIG. 62 is a bottom plan view thereof.
Figure 63:
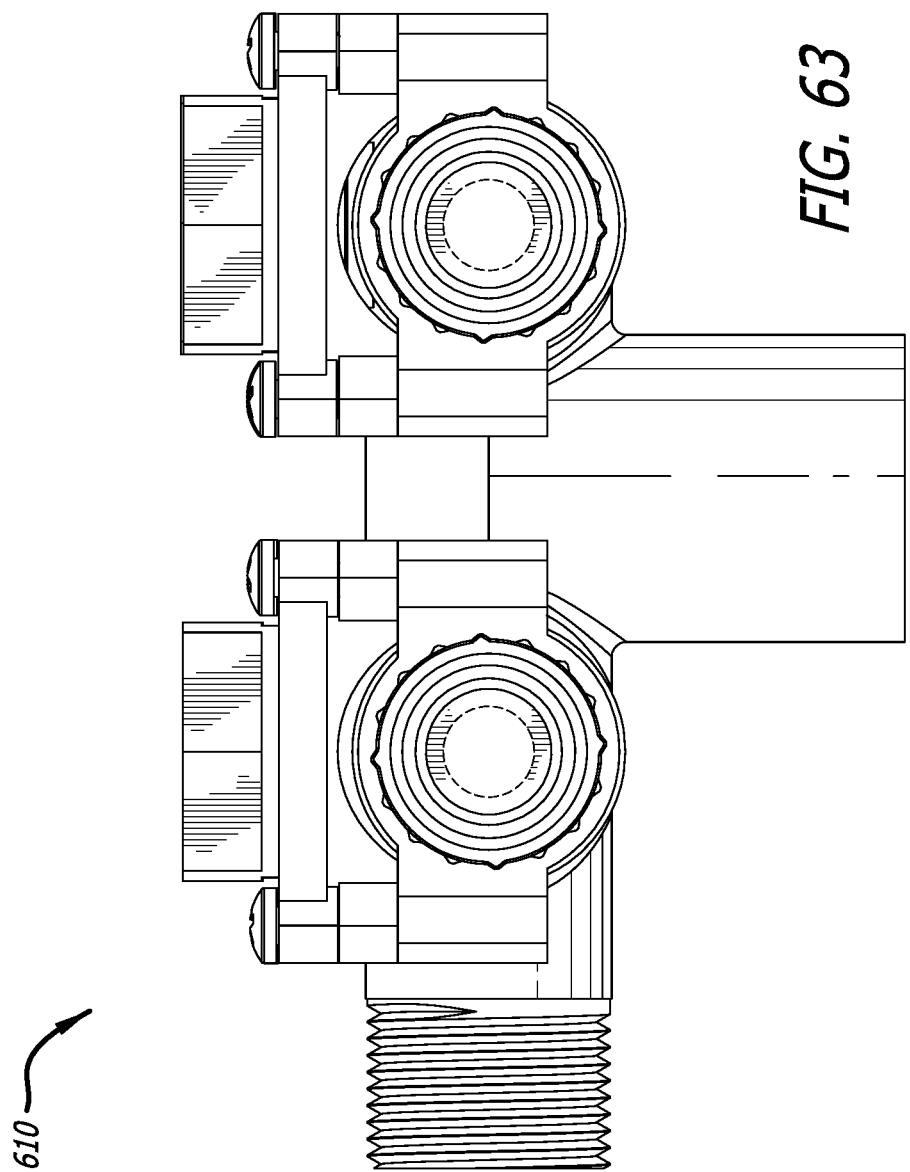
FIG. 63 is a front side elevational view thereof.
Figure 64:
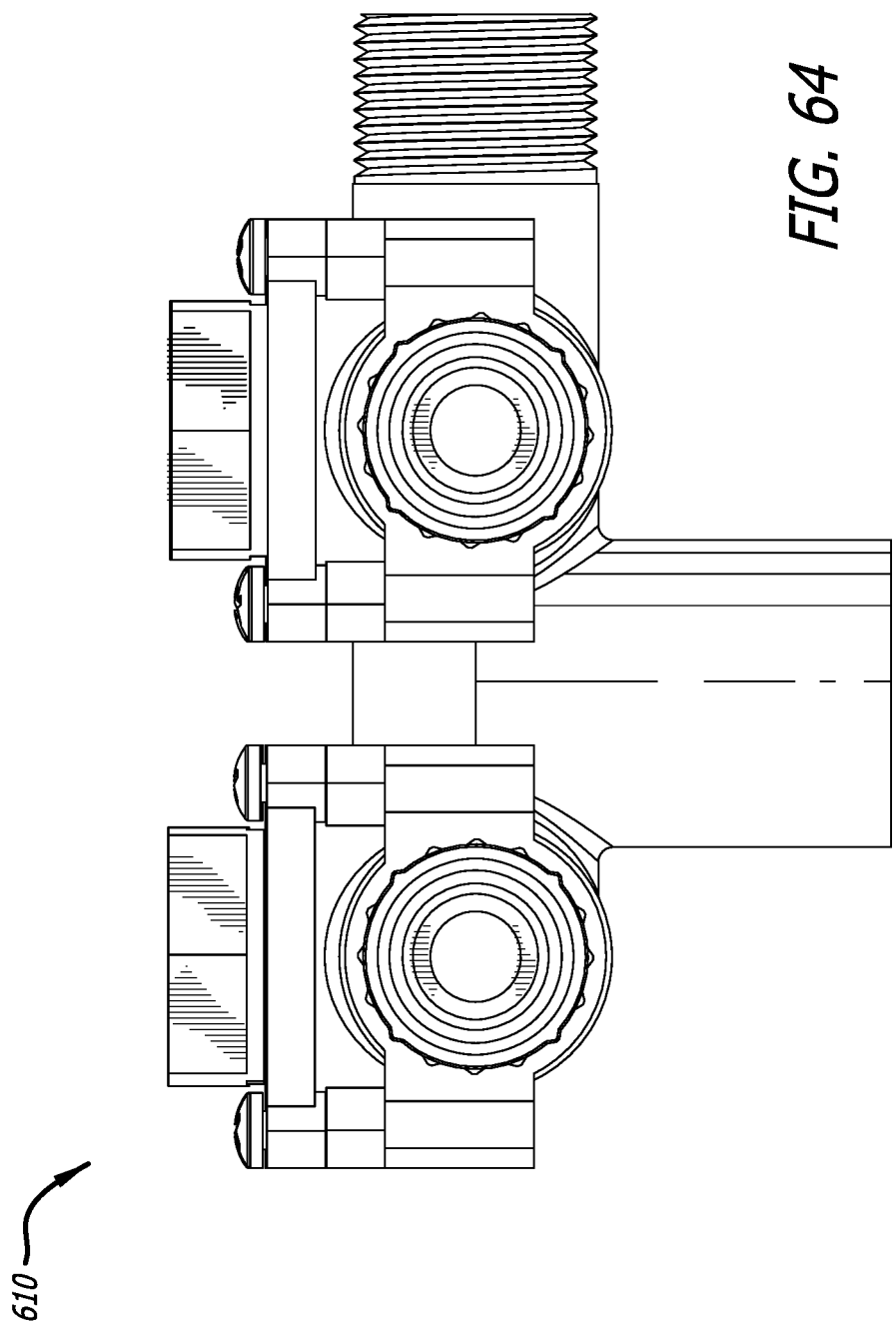
FIG. 64 is a rear side elevational view thereof.
Figure 104:
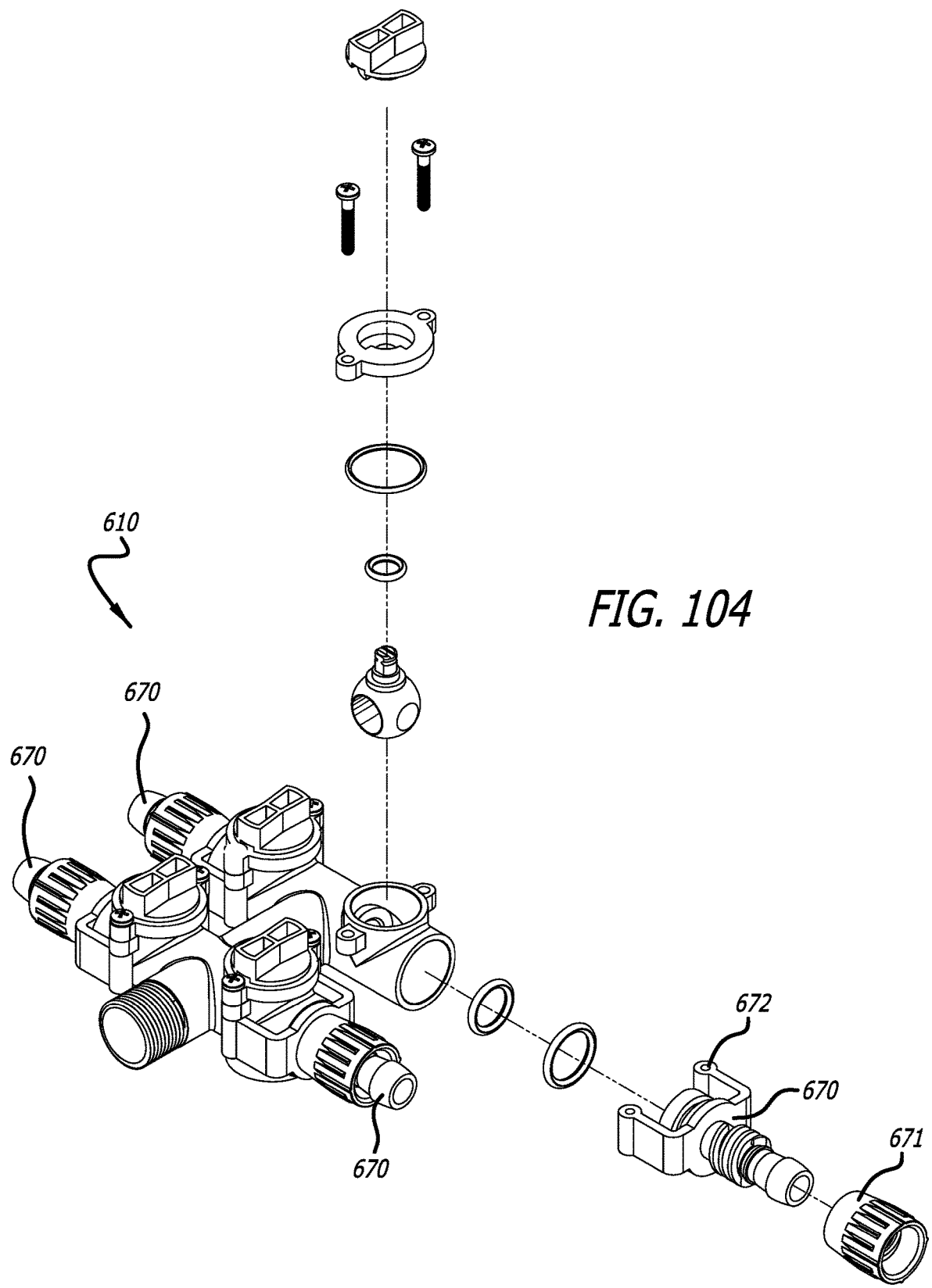
FIG. 104 is an exploded view of the four-way ball valve with tube outlet of FIG. 57 further including a reducing coupler.
Figure 109A:
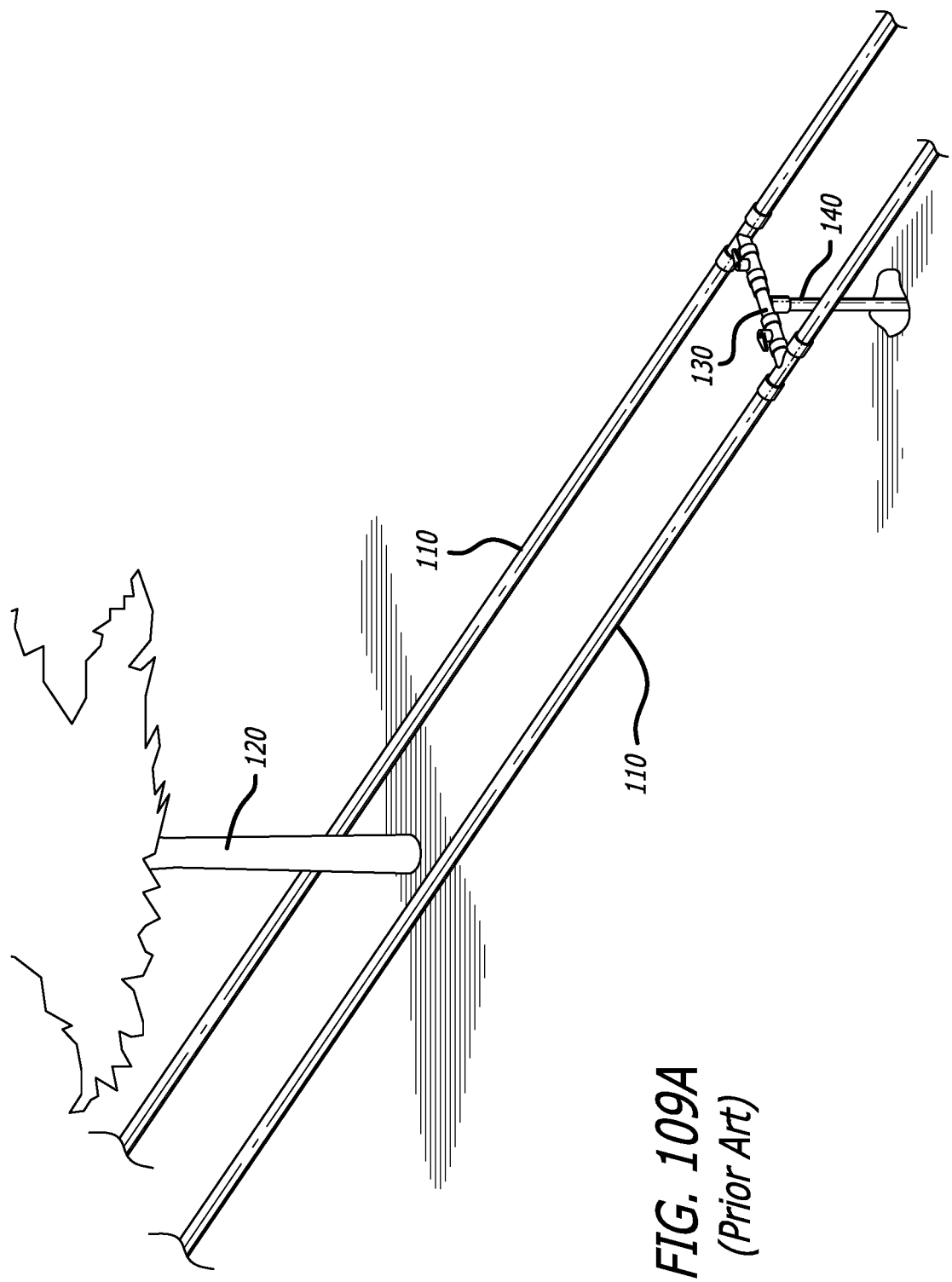
FIG. 109A illustrates a traditional dual line drip hose applied to a row of trees as known in the prior art.
Figure 19B:
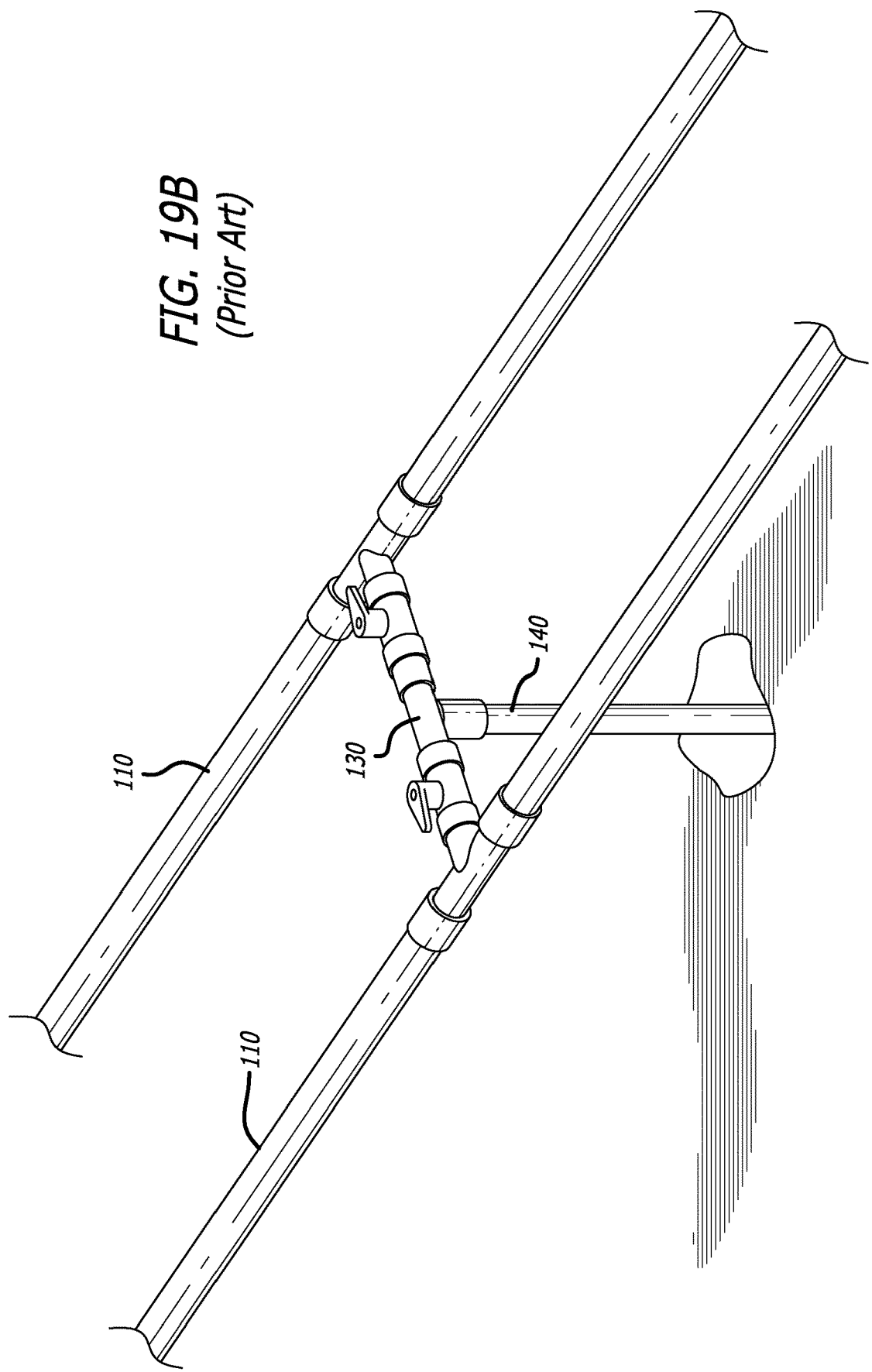
Figure 109C:
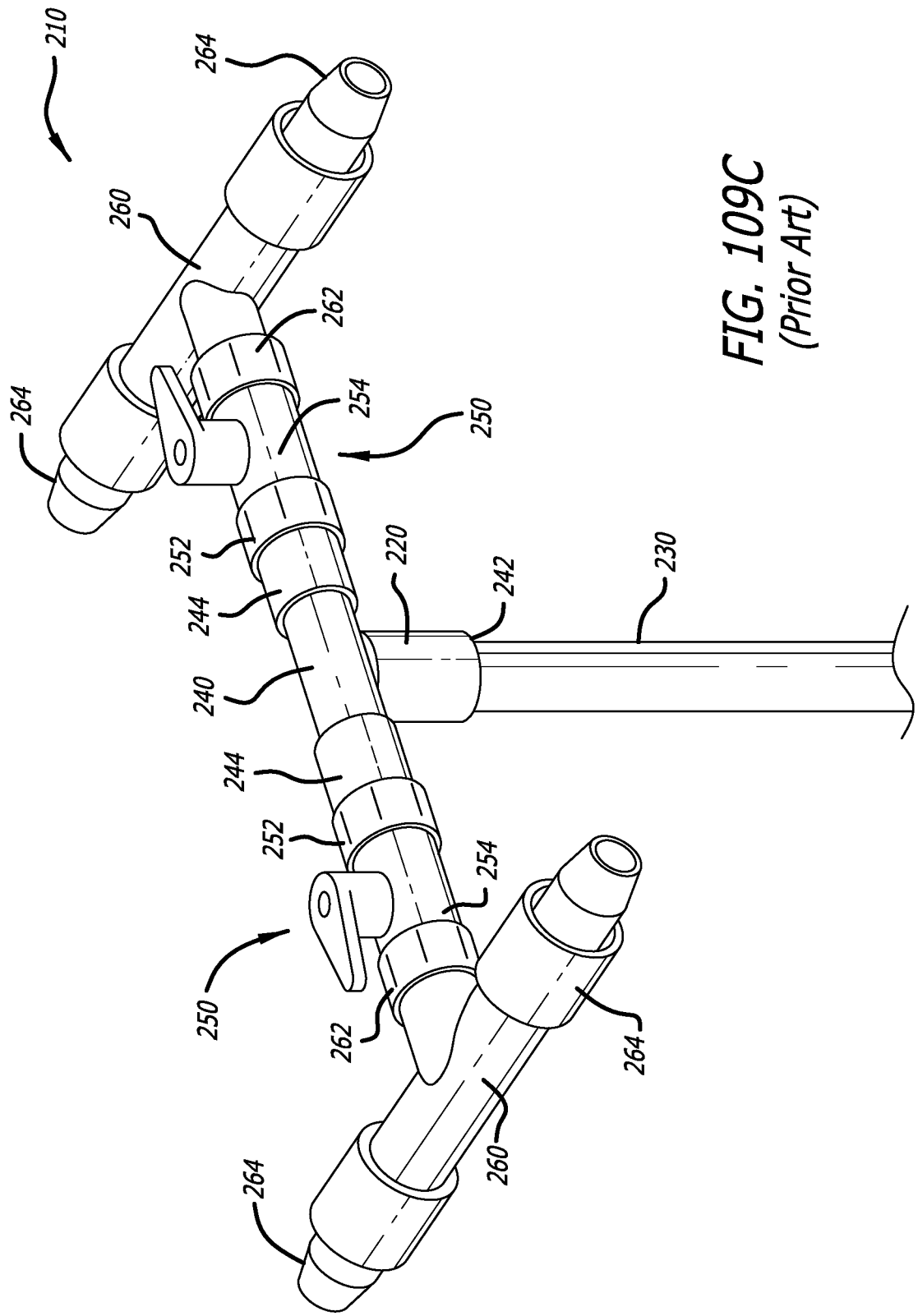
FIG. 109C is a further enlarged view of the prior art, traditional dual line drip hose depicted in FIG. 109A.

An outlet fitting 636 is attached to each valve 616 adjacent to each valve outlet 620, and a second outlet seal 638 is received by each outlet fitting. In the preferred embodiment depicted herein, the outlet fitting is illustrated as a ¾" MHT threaded outlet, although other sizes and outlet types may be used according to user preference. For example, in the four way ball valve 610 illustrated in FIGS. 57-64, 104 and 109D, each threaded outlet fitting 636 has been switched out and replaced with a tube outlet fitting 670 and threaded outlet cap 671 in which each outlet fitting 670 is received.

In preferred aspects of the present invention, each ball 622 includes a through bore 640 allowing for bidirectional water flow through the valve, and includes a side 642 which abuts each first outlet seal 634. Moreover, each first inlet seal 626, second inlet seal 630, first outlet seal 634, and second outlet seal 638 can be O-rings or any type of seal known to one of ordinary skill in the art. Furthermore, the manifold inlet 614 can be attached directly to the riser hose, or indirectly attached to the riser hose through a reducing coupler 644.

In the preferred embodiment illustrated herein, the cap 628 is simultaneously fastened to the valve 616 and to the outlet fitting 636. In particular, each valve 616 includes two fasteners 646 such as screws, bolts, or the like. Each cap includes two flanges each having a cap aperture 648 configured to receive the fasteners 646. Each valve 616 further includes two flanges each having a valve aperture 650 correspondingly aligned with the cap apertures which also receive the fasteners 646. Additionally, each outlet fitting includes two flanges each having a fitting aperture 652 correspondingly aligned with the valve apertures which further receive the fasteners 646.

In this way, the ball valve 610 allows for each set of fasteners 646 to hold each cap 628 and outlet fitting 636 in place, while also allowing each outlet fitting to be easily replaced with other desired fittings. For example, each threaded outlet fitting illustrated herein may be replaced with the tube outlet fitting 670, which itself can be fastened to each ball valve 610 similarly through its own two flanges with fitting apertures 672. Additionally, the ball valve 610 thus facilitates repair of either the valves or outlet fittings in the field, since a user can simply unfasten one or more sets of screws 646 to repair a defective part therein. Although the preferred embodiment uses two screws inserted in three sets of flanges and apertures for each valve, any number of screws or other fasteners or fastening mechanisms can be used, for example threads, connecting pins, or the like.

Figure 65:
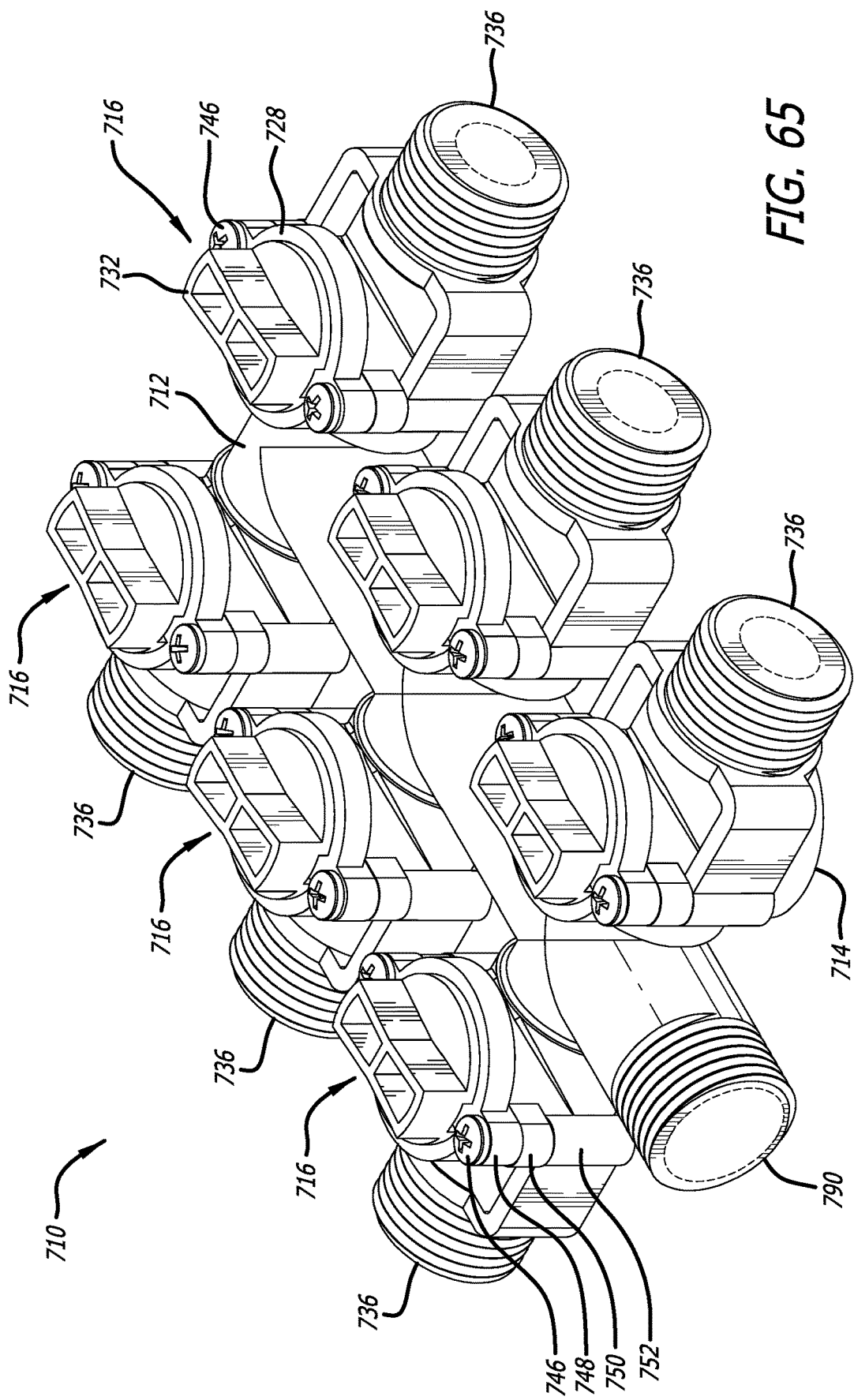
FIG. 65 is a front, perspective view of a six-way ball valve with threaded outlets according to another preferred embodiment of the present invention.
Figure 66:
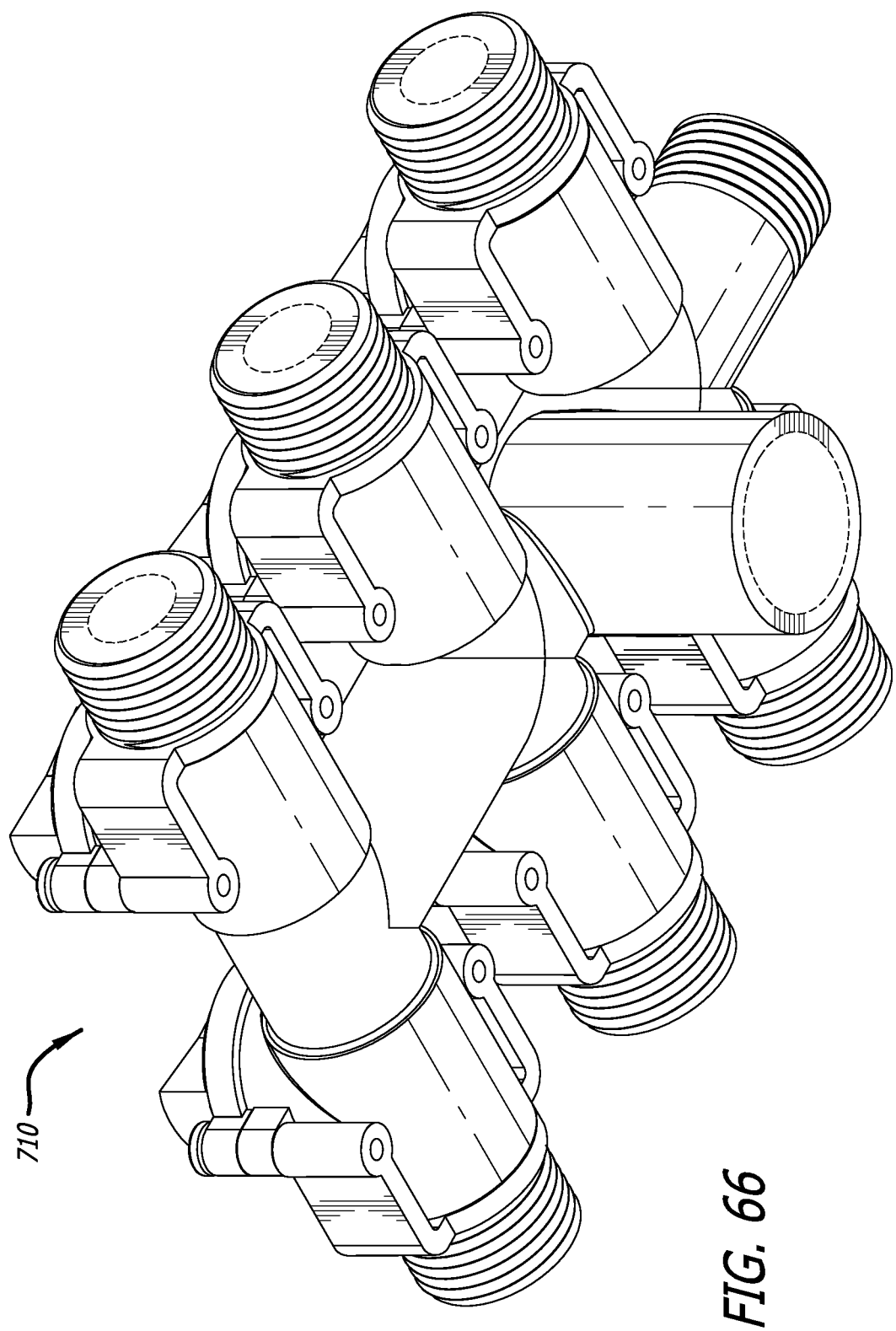
FIG. 66 is rear perspective view thereof.
Figure 67:
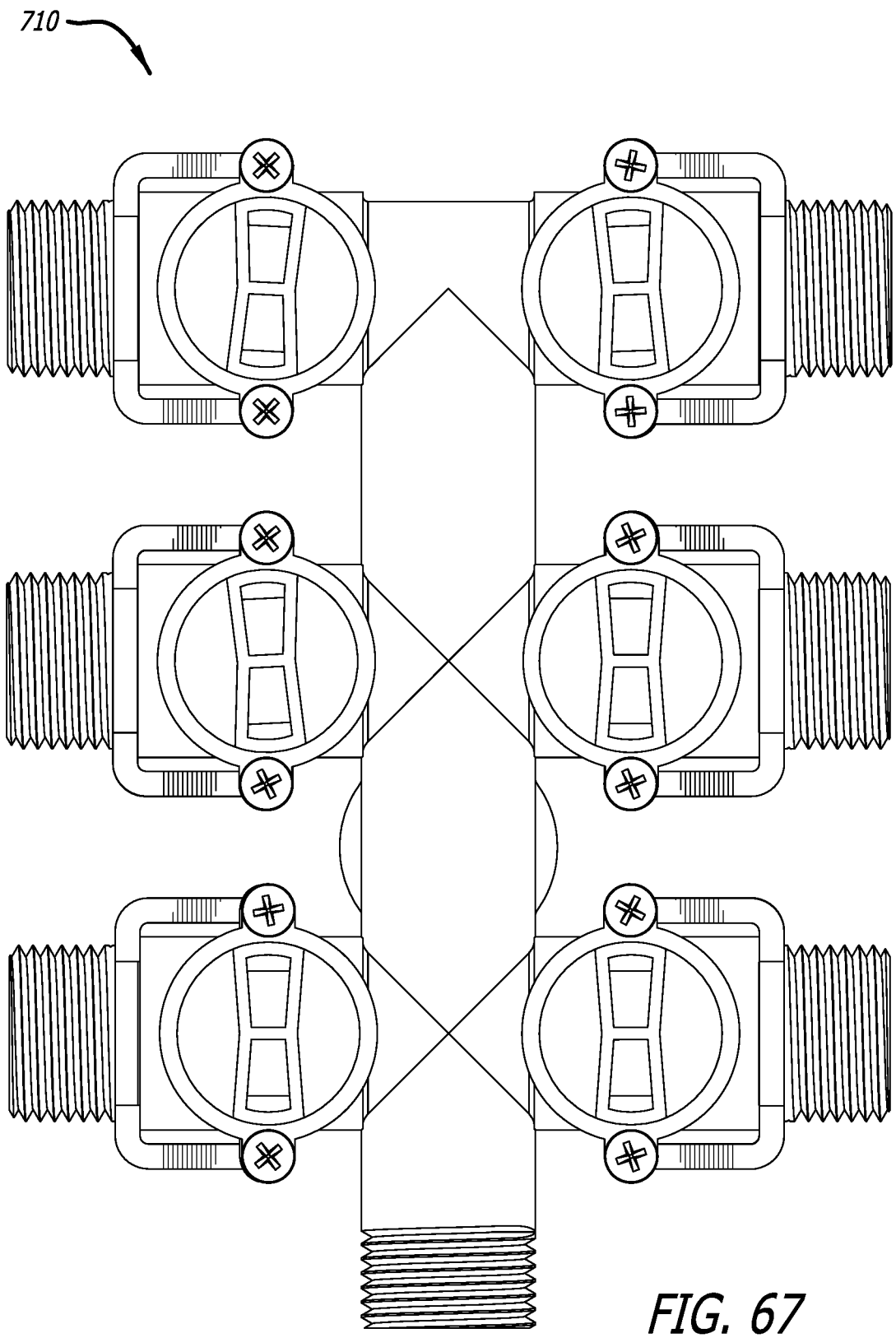
FIG. 67 is a top plan view thereof.
Figure 68:
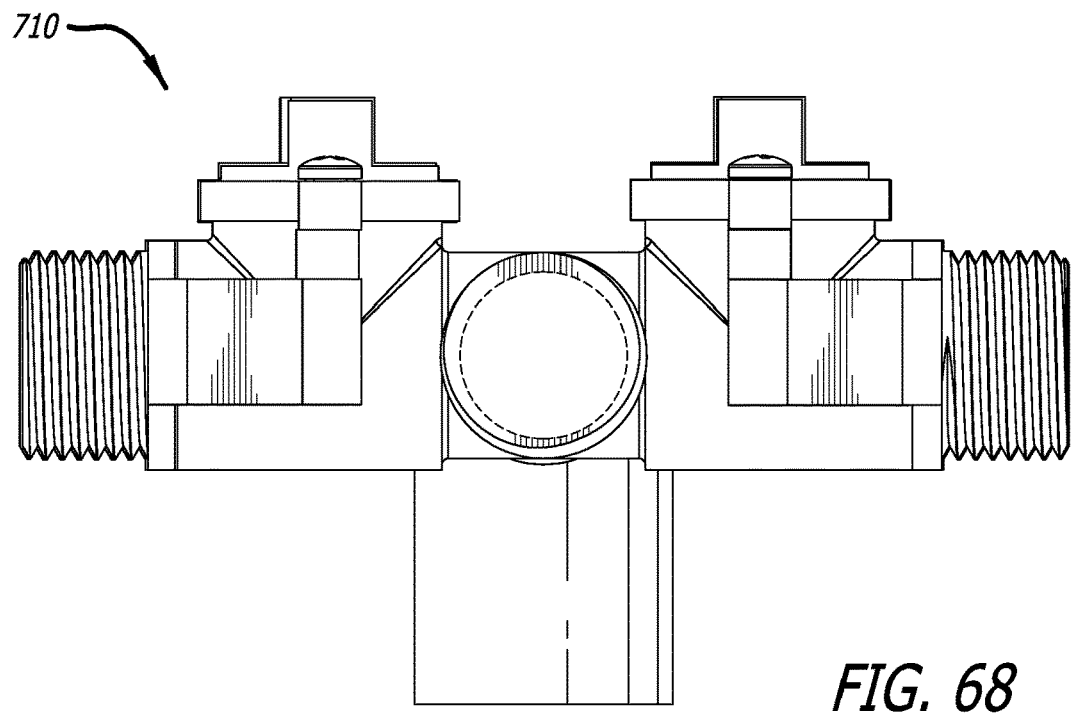
FIG. 68 is a left side elevational view thereof.
Figure 69:
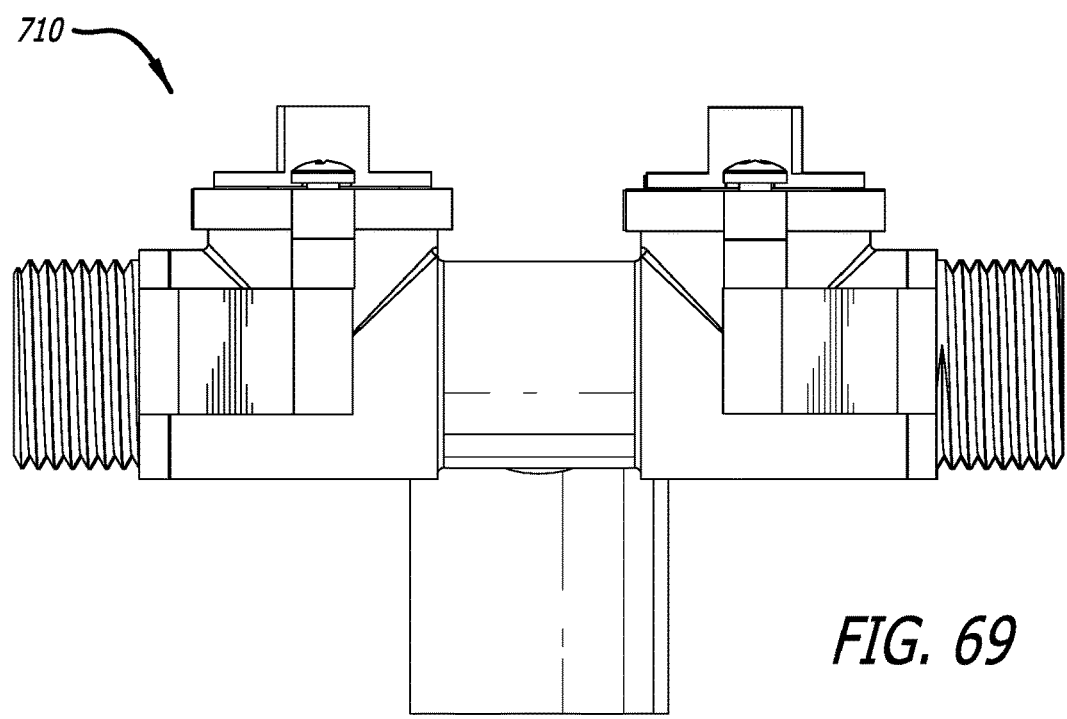
FIG. 69 is a right side elevational view thereof.
Figure 70:
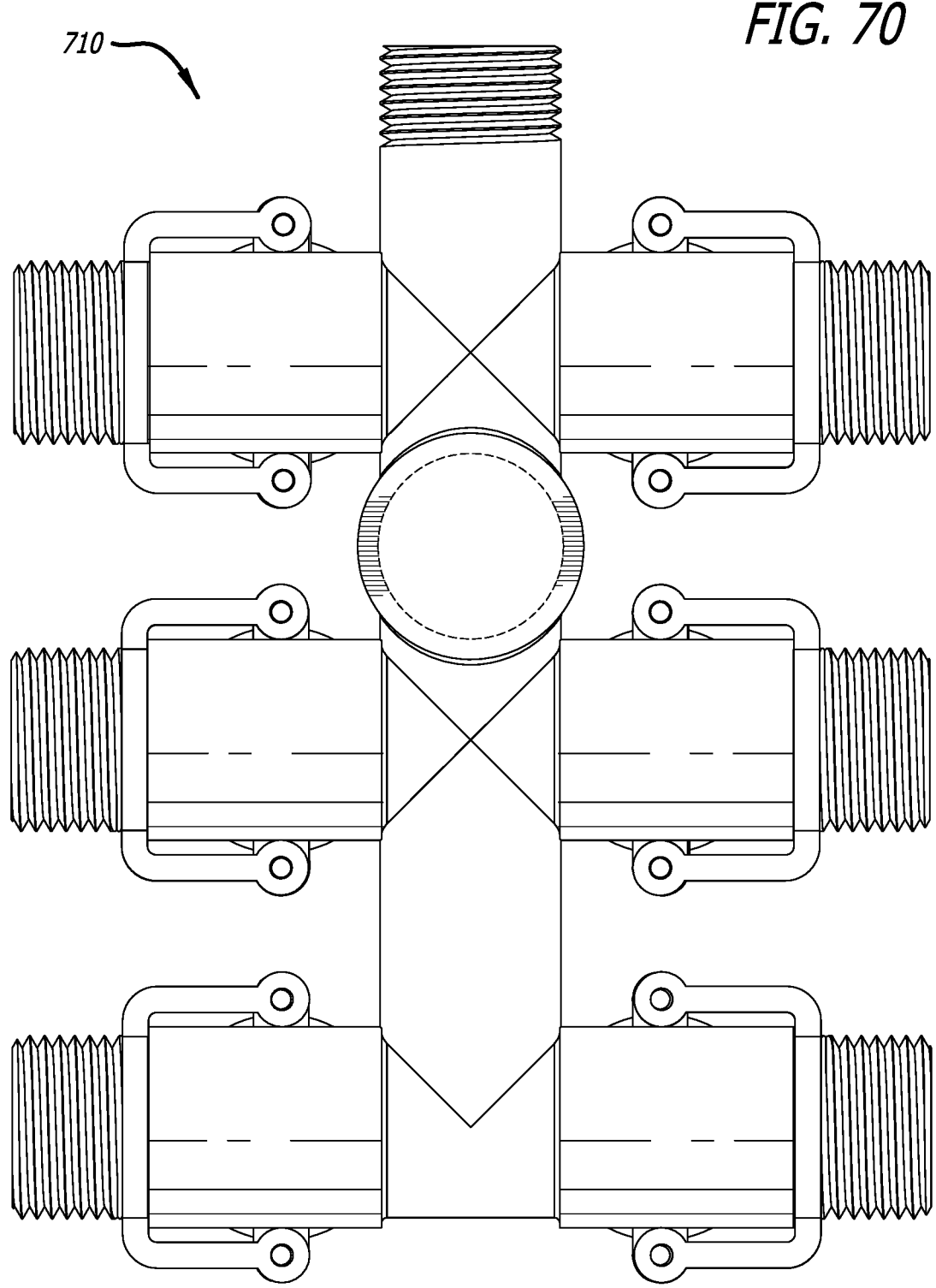
FIG. 70 is a bottom plan view thereof.
Figure 71:
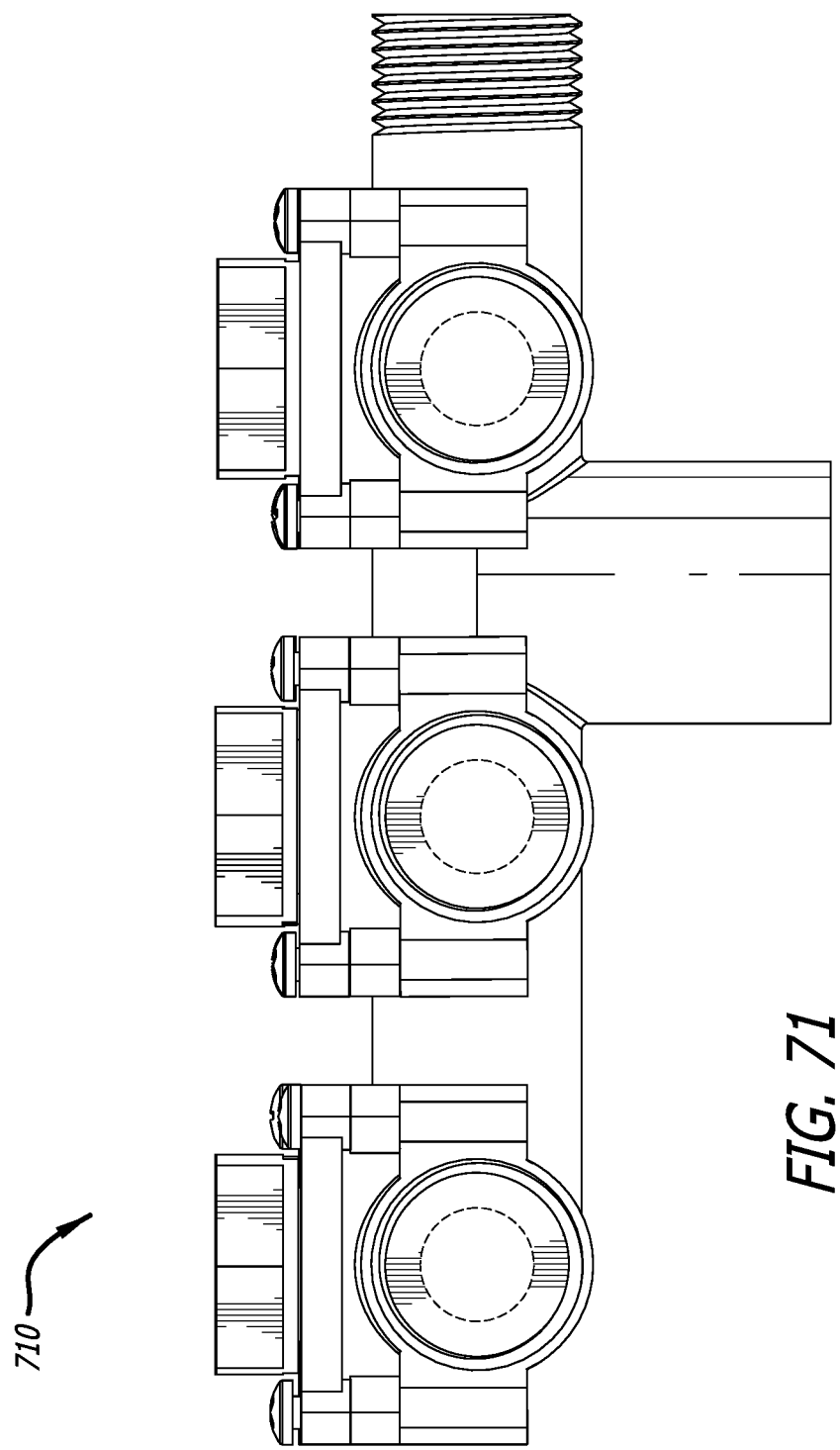
FIG. 71 is a front side elevational view thereof.
Figure 72:
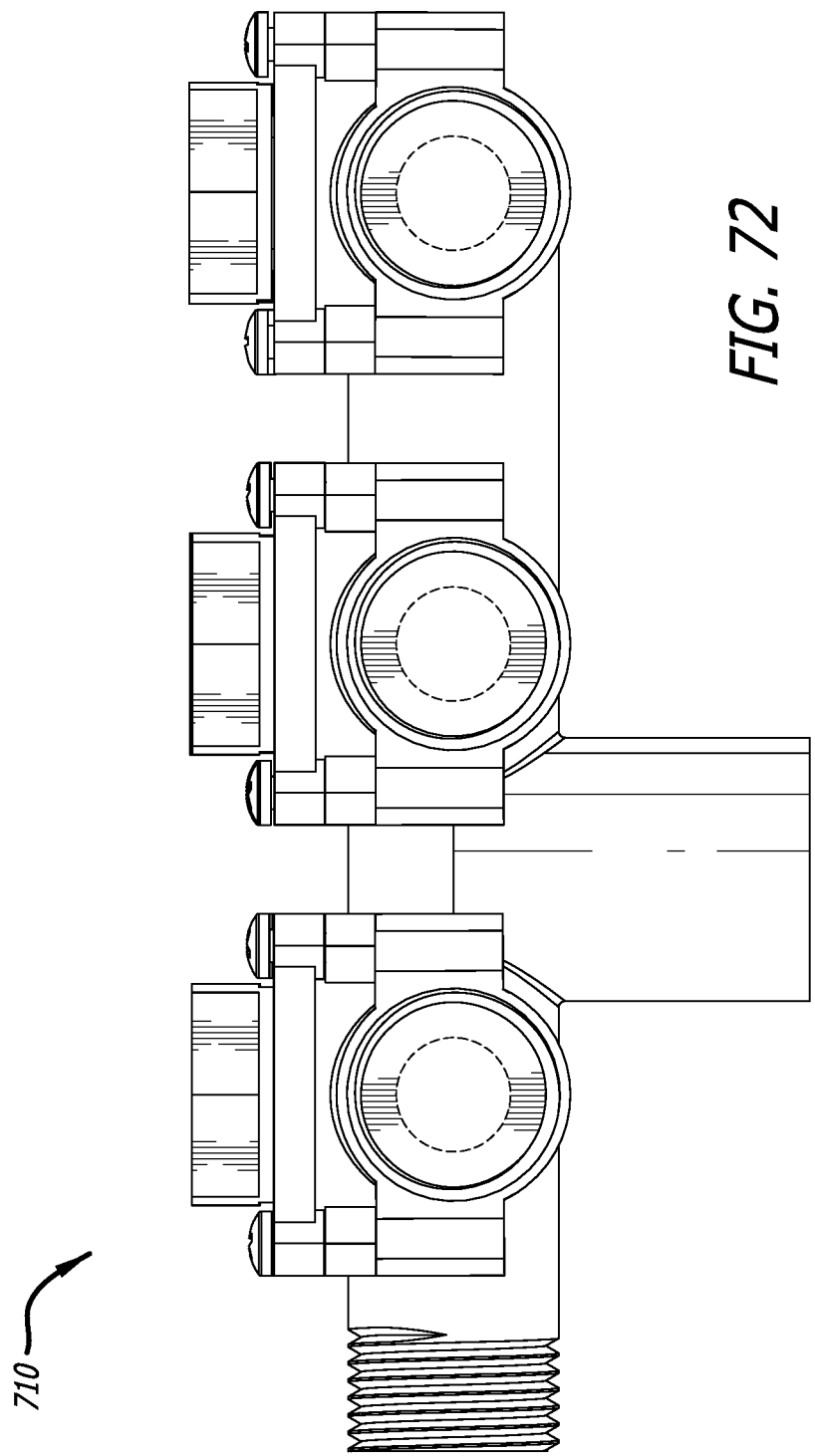
FIG. 72 is a rear side elevational view thereof.
Figure 105:
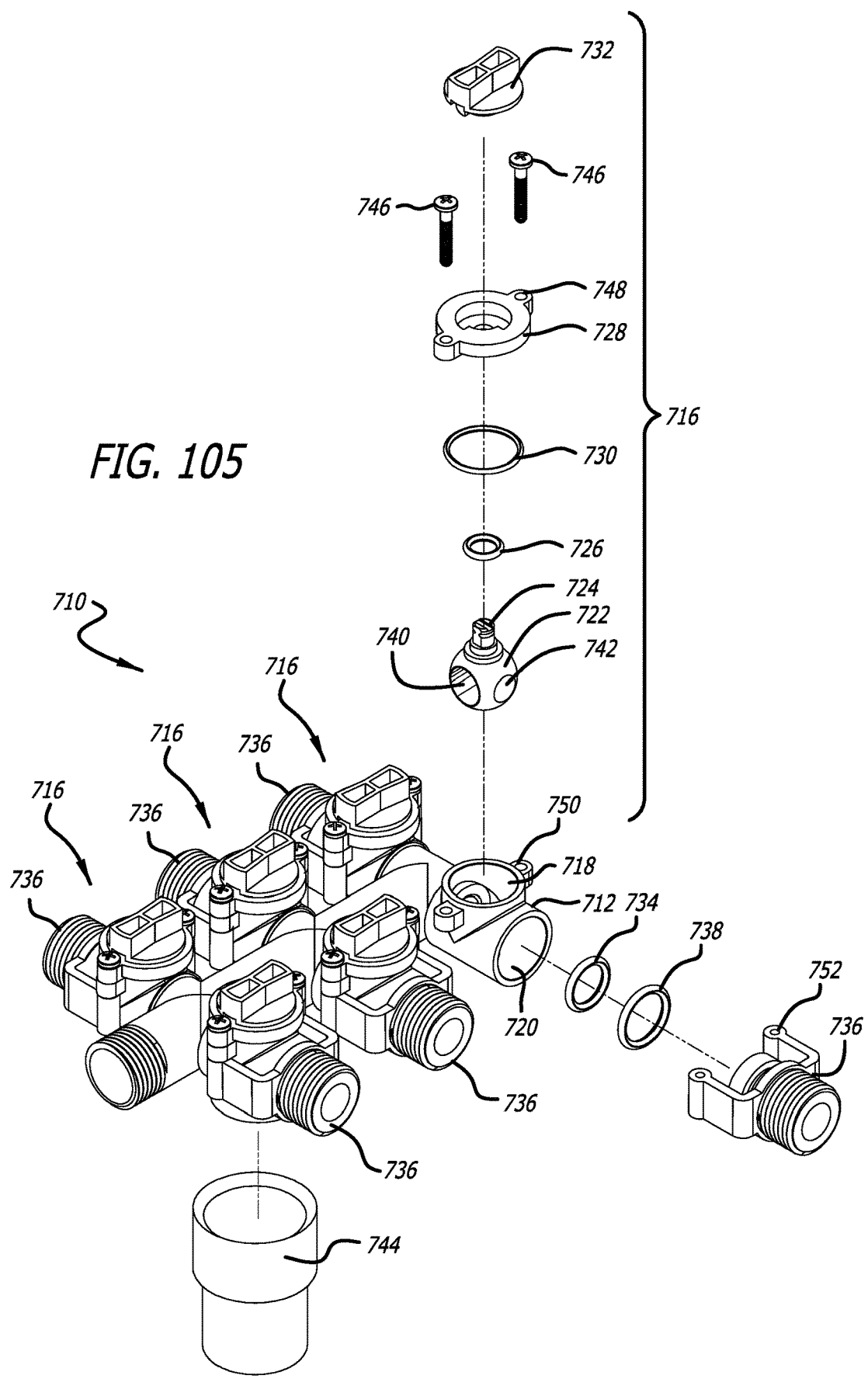
FIG. 105 is an exploded view of the six-way ball valve with threaded outlet of FIG. 65 further including a reducing coupler.

Referring to FIGS. 65-72 and 105, in accordance with a preferred embodiment of the present invention, a six way ball valve 710 is provided for controlling the flow of water to a drip hose 110.

The six way ball valve 710 includes a manifold 712 including a manifold inlet 714 configured to attach to a riser hose, and two valves 716 integrated with the manifold. Each valve 716 includes a top valve inlet 718 and a valve outlet 720. A ball 722 having a stem 724 is received inside each valve 716 through the top valve inlet, and a first inlet seal 726 is received on the stem of each ball. A cap 728 is attached to each valve 716 adjacent to the top valve inlet, and a second inlet seal 730 is received by each cap adjacent to each ball. A handle 732 is attached to each cap opposite each second inlet seal, and the handle receives each stem of each ball. A first outlet seal 734 is also received in each valve outlet.

Figure 73:
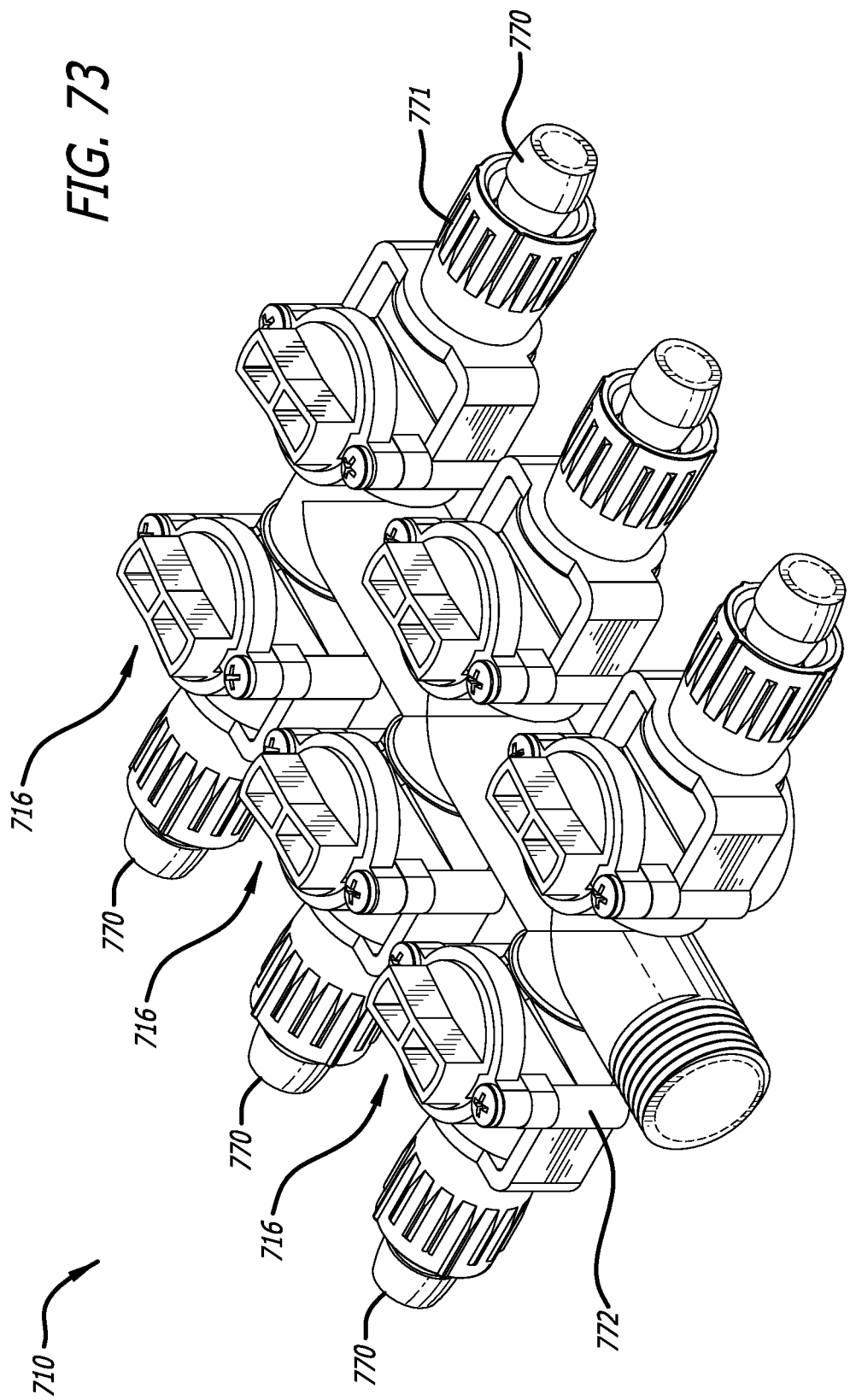
FIG. 73 is a front, perspective view of a six-way ball valve with tube outlets according to another preferred embodiment of the present invention.
Figure 74:
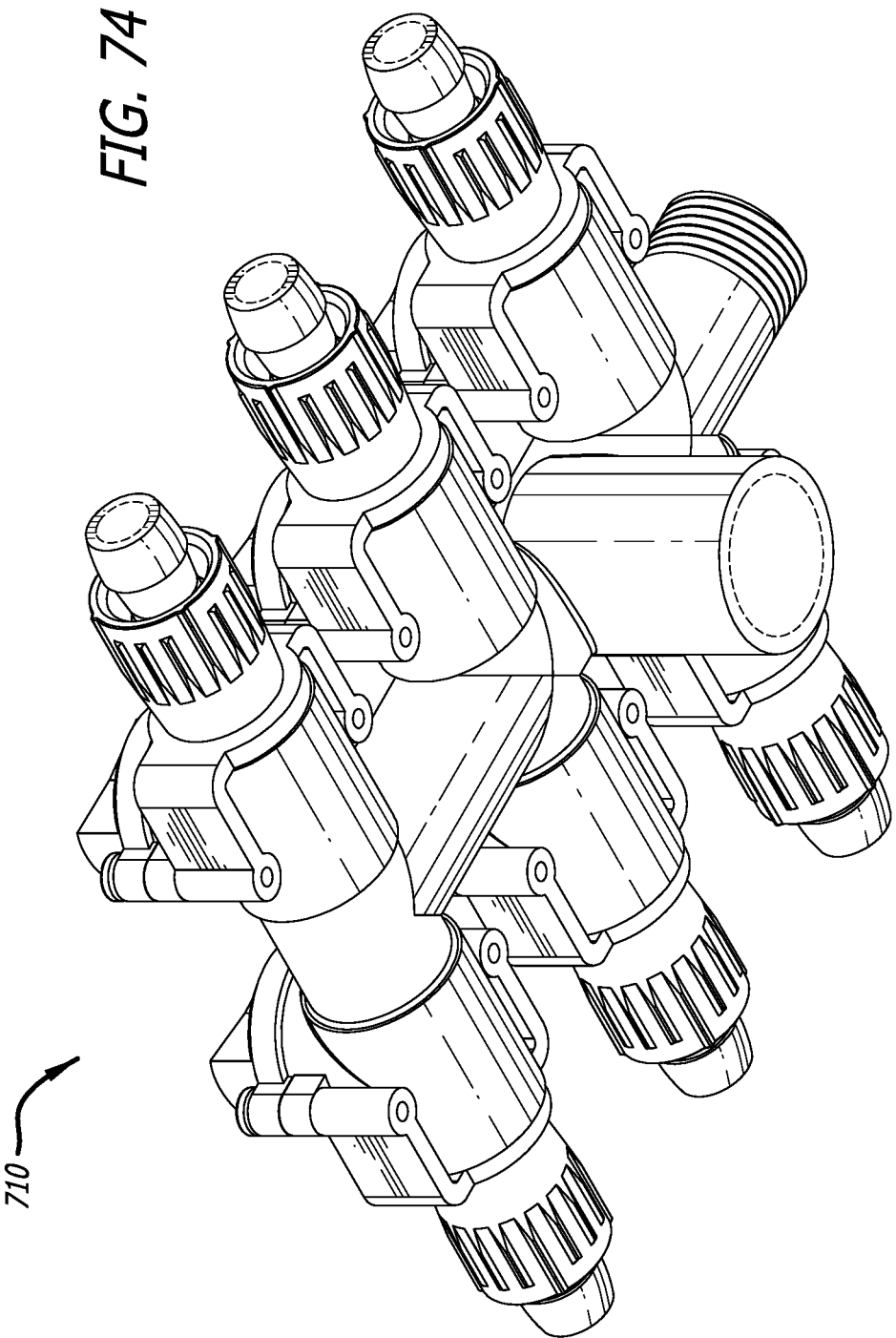
FIG. 74 is rear perspective view thereof.
Figure 75:
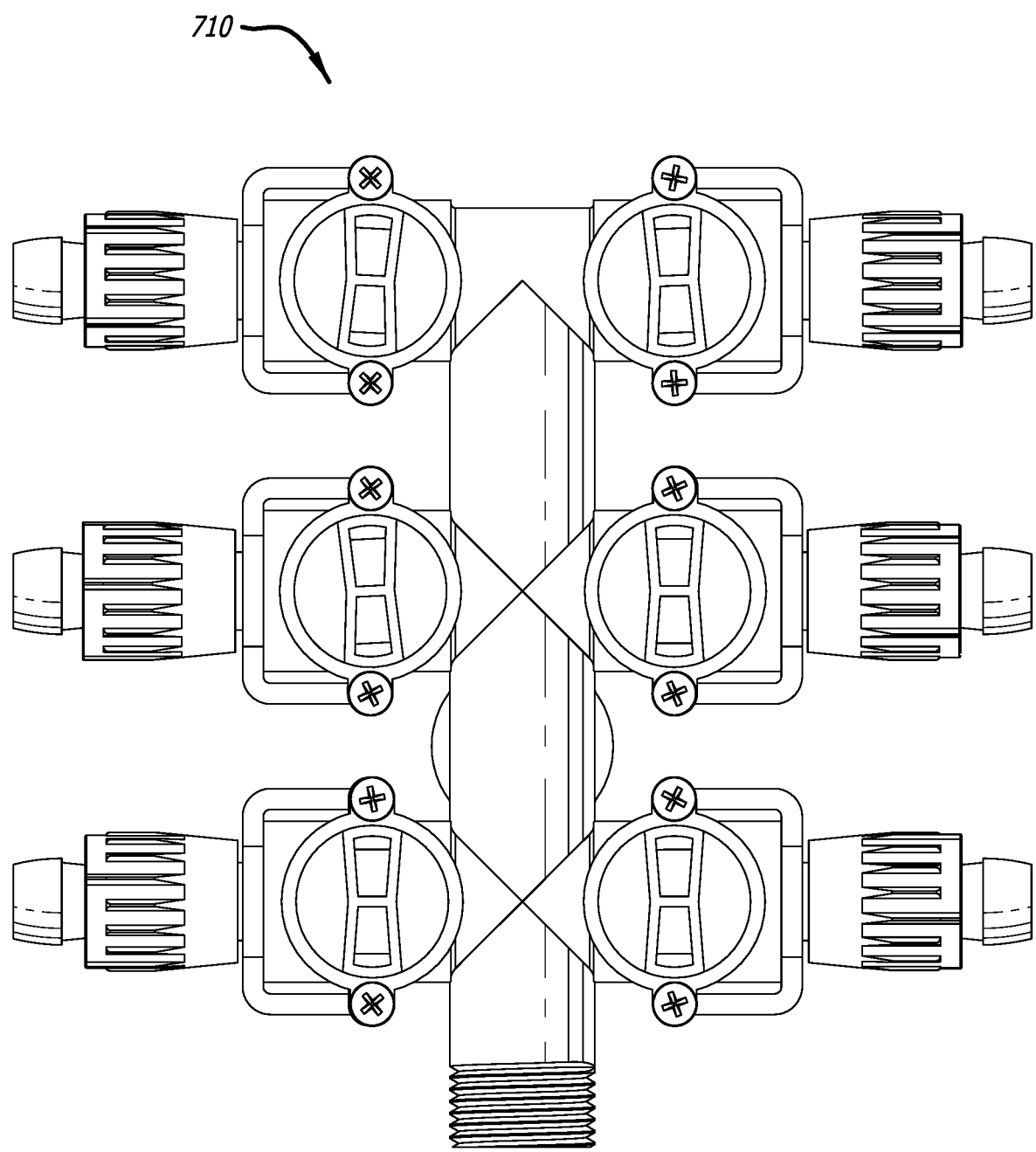
FIG. 75 is a top plan view thereof.
Figure 76:
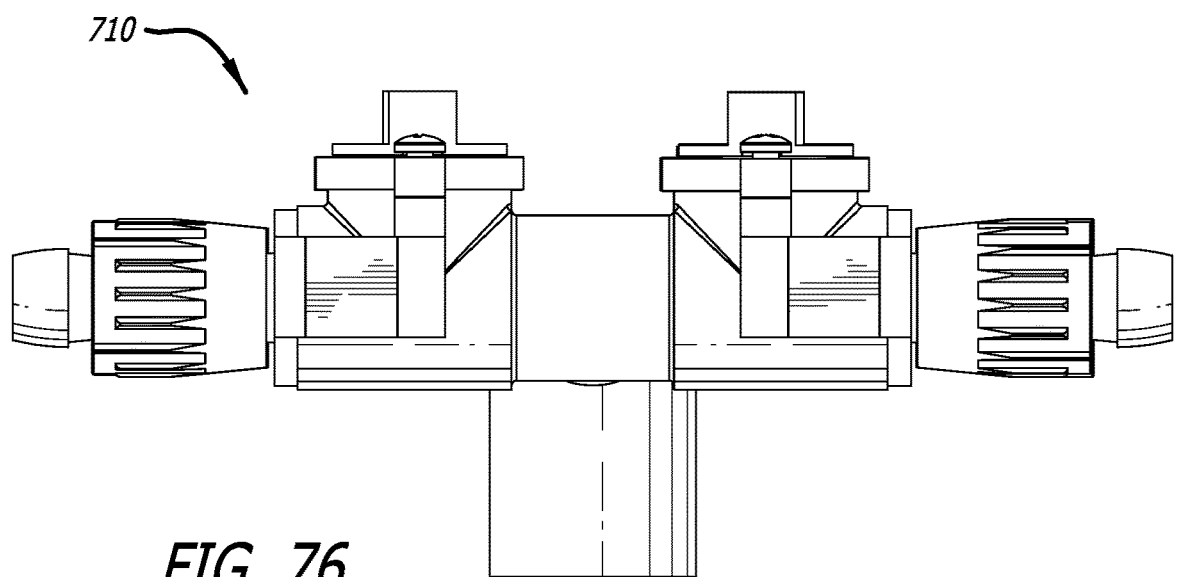
FIG. 76 is a left side elevational view thereof.
Figure 77:
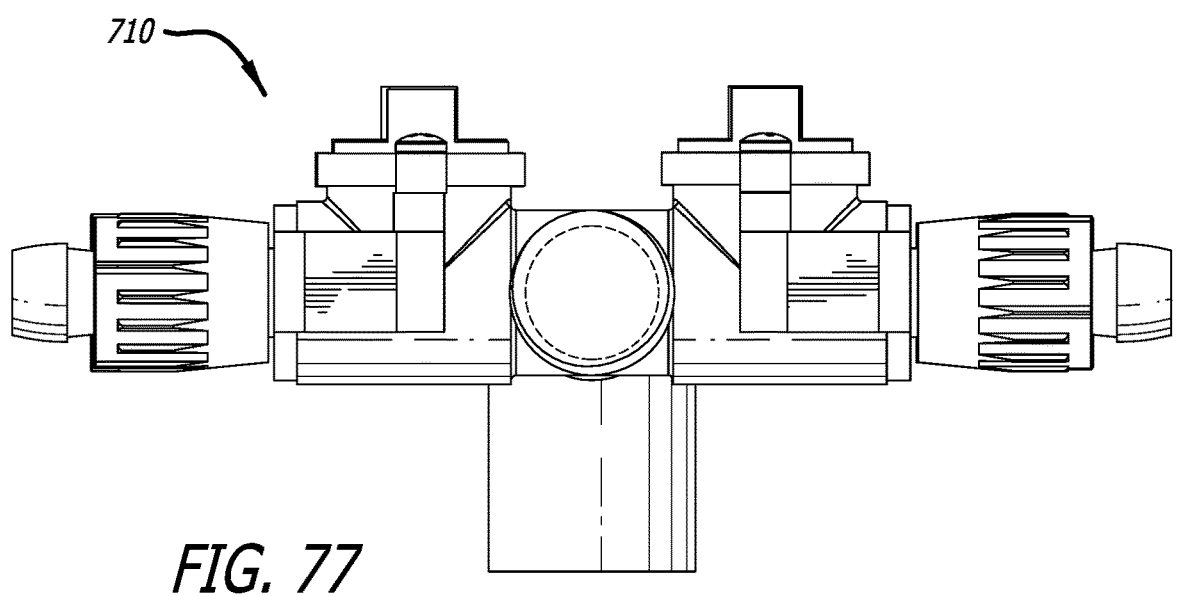
FIG. 77 is a right side elevational view thereof.
Figure 78:
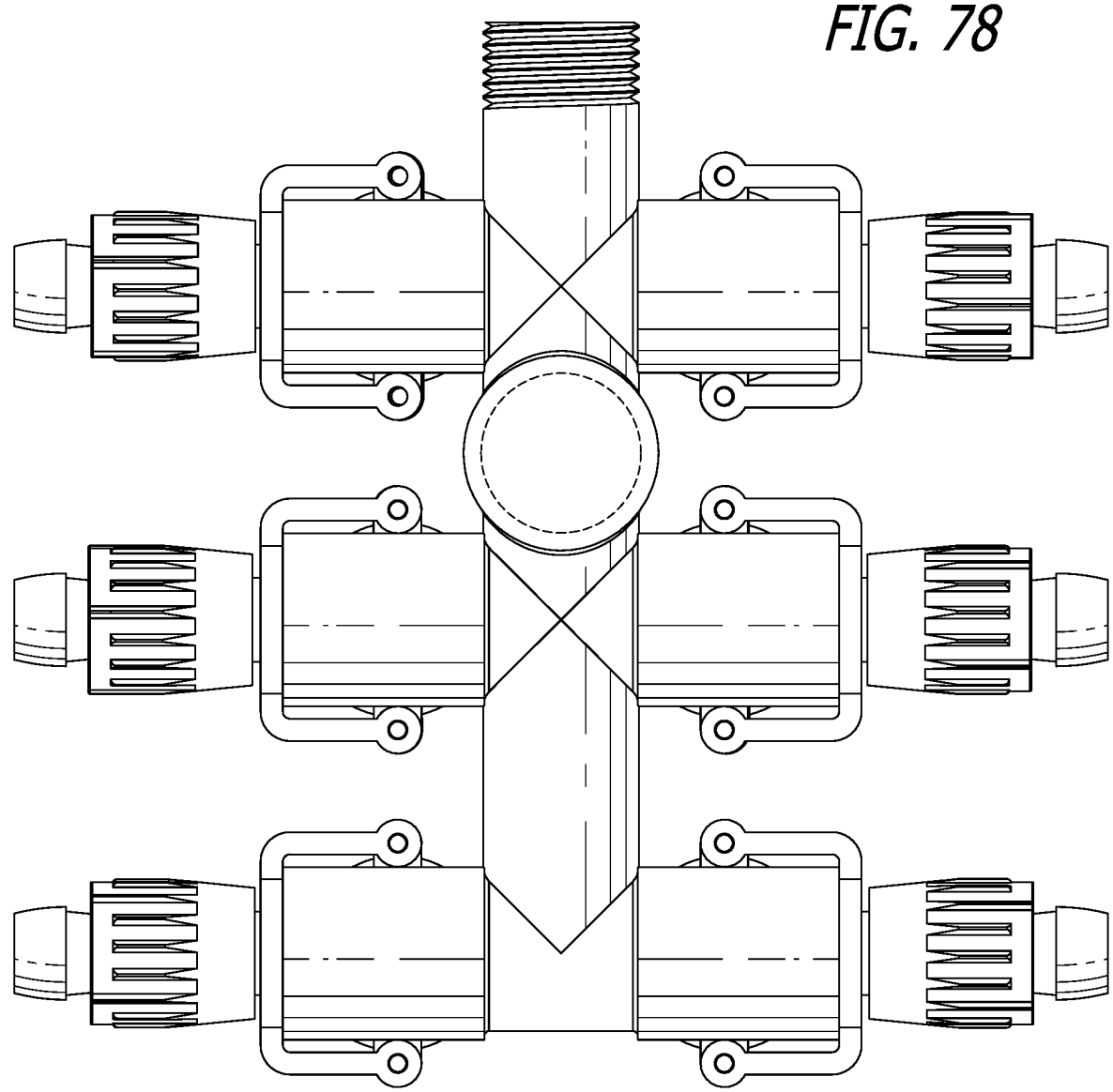
FIG. 78 is a bottom plan view thereof.
Figure 106:
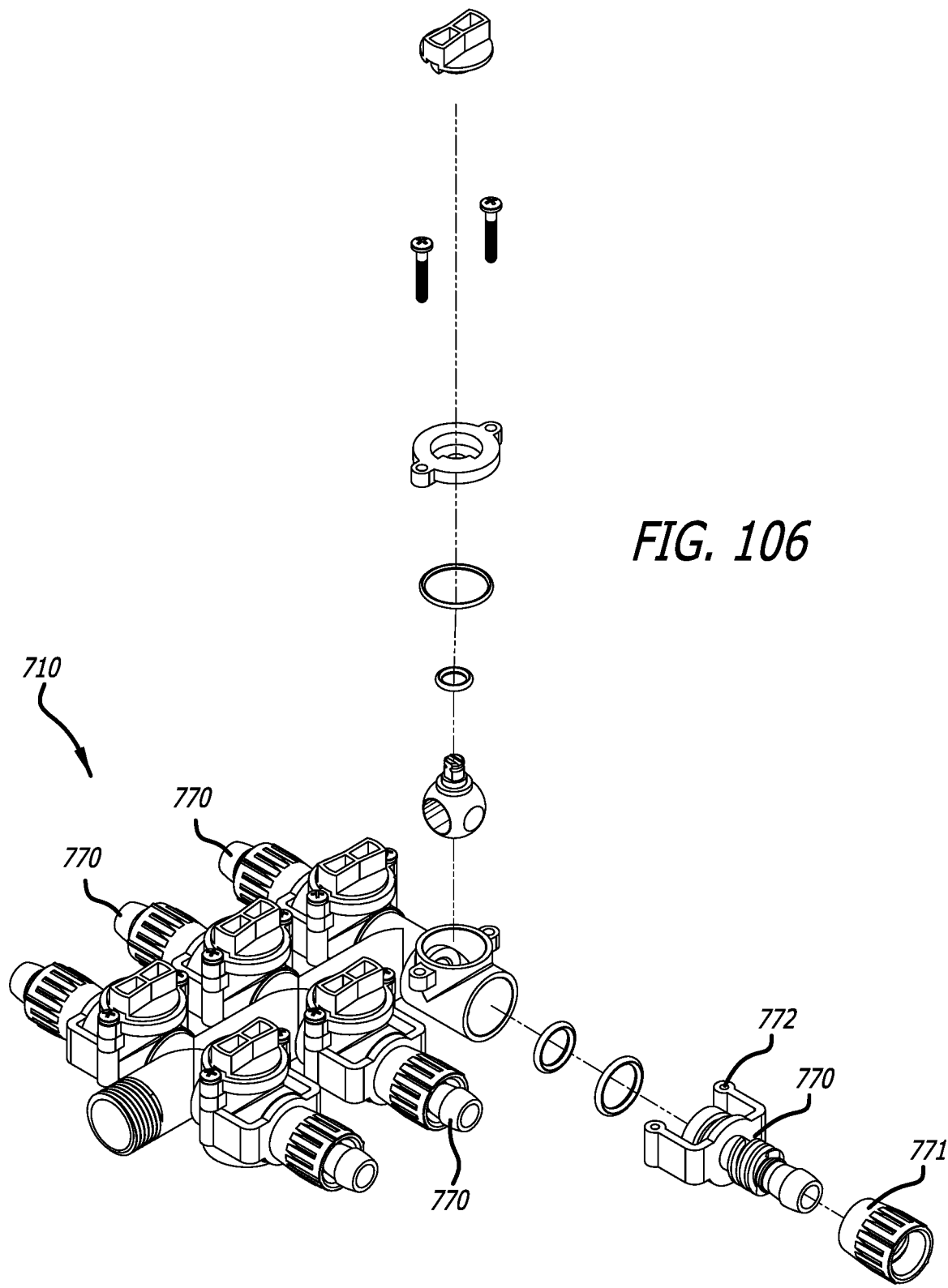
FIG. 106 is an exploded view of the six-way ball valve with tube outlet of FIG. 73 further including a reducing coupler.

An outlet fitting 736 is attached to each valve 716 adjacent to each valve outlet 720, and a second outlet seal 738 is received by each outlet fitting. In the preferred embodiment depicted herein, the outlet fitting is illustrated as a ¾" MHT threaded outlet, although other sizes and outlet types may be used according to user preference. For example, in the six way ball valve 710 illustrated in FIGS. 73-80 and 106, each threaded outlet fitting 736 has been switched out and replaced with a tube outlet fitting 770 and threaded outlet cap 771 in which each outlet fitting 770 is received.

In preferred aspects of the present invention, each ball 722 includes a through bore 740 allowing for bidirectional water flow through the valve, and includes a side 742 which abuts each first outlet seal 734. Moreover, each first inlet seal 726, second inlet seal 730, first outlet seal 734, and second outlet seal 738 can be O-rings or any type of seal known to one of ordinary skill in the art. Furthermore, the manifold inlet 714 can be attached directly to the riser hose, or indirectly attached to the riser hose through a reducing coupler 744.

In the preferred embodiment illustrated herein, the cap 728 is simultaneously fastened to the valve 716 and to the outlet fitting 736. In particular, each valve 716 includes two fasteners 746 such as screws, bolts, or the like. Each cap includes two flanges each having a cap aperture 748 configured to receive the fasteners 746. Each valve 716 further includes two flanges each having a valve aperture 750 correspondingly aligned with the cap apertures which also receive the fasteners 746. Additionally, each outlet fitting includes two flanges each having a fitting aperture 752 correspondingly aligned with the valve apertures which further receive the fasteners 746.

In this way, the ball valve 710 allows for each set of fasteners 746 to hold each cap 728 and outlet fitting 736 in place, while also allowing each outlet fitting to be easily replaced with other desired fittings. For example, each threaded outlet fitting illustrated herein may be replaced with the tube outlet fitting 770, which itself can be fastened to each ball valve 710 similarly through its own two flanges with fitting apertures 772. Additionally, the ball valve 710 thus facilitates repair of either the valves or outlet fittings in the field, since a user can simply unfasten one or more sets of screws 746 to repair a defective part therein. Although the preferred embodiment uses two screws inserted in three sets of flanges and apertures for each valve, any number of screws or other fasteners or fastening mechanisms can be used, for example threads, connecting pins, or the like.

Figure 81:
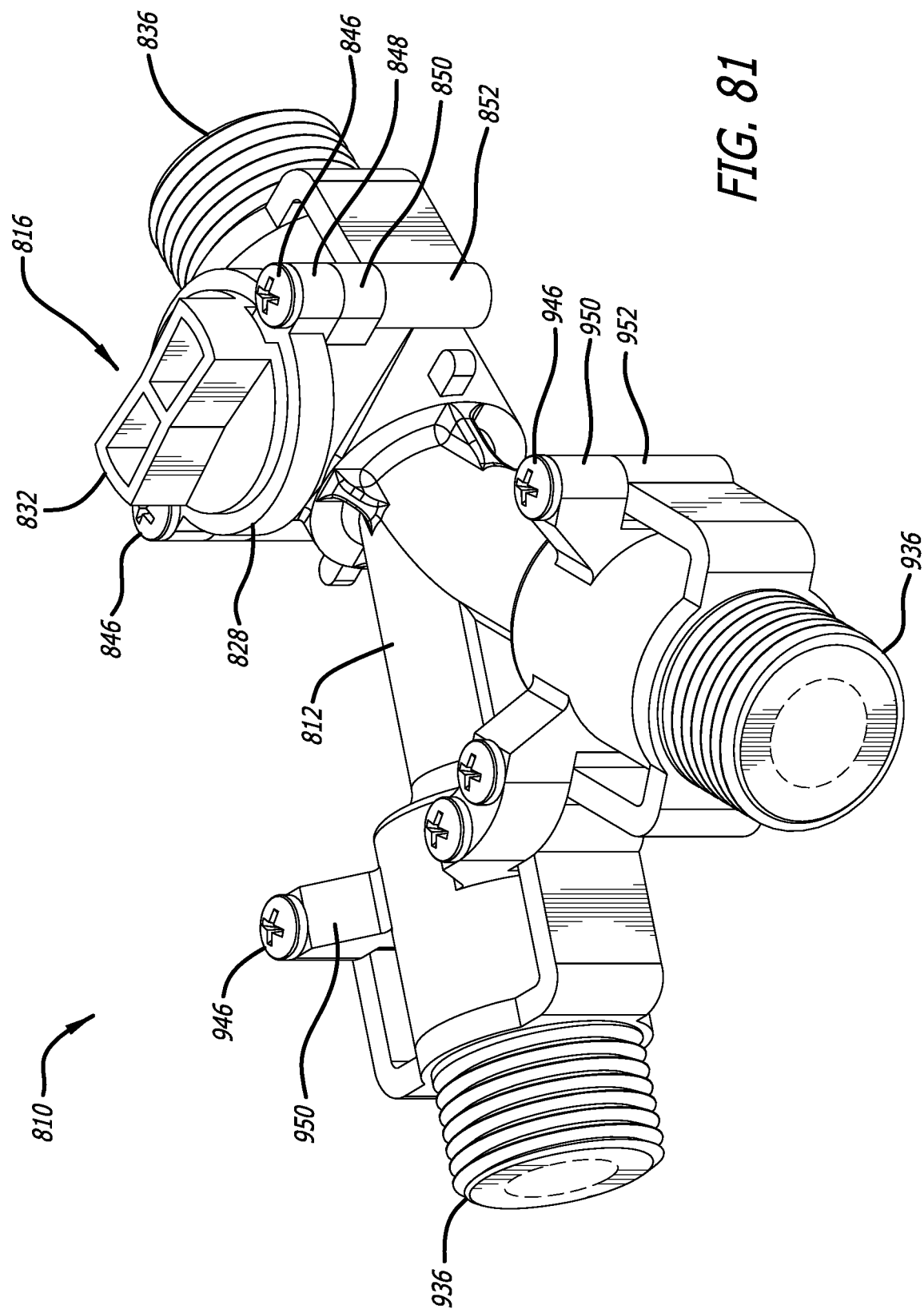
FIG. 81 is a front, perspective view of a Y-valve manifold with threaded outlets according to another preferred embodiment of the present invention.
Figure 82:
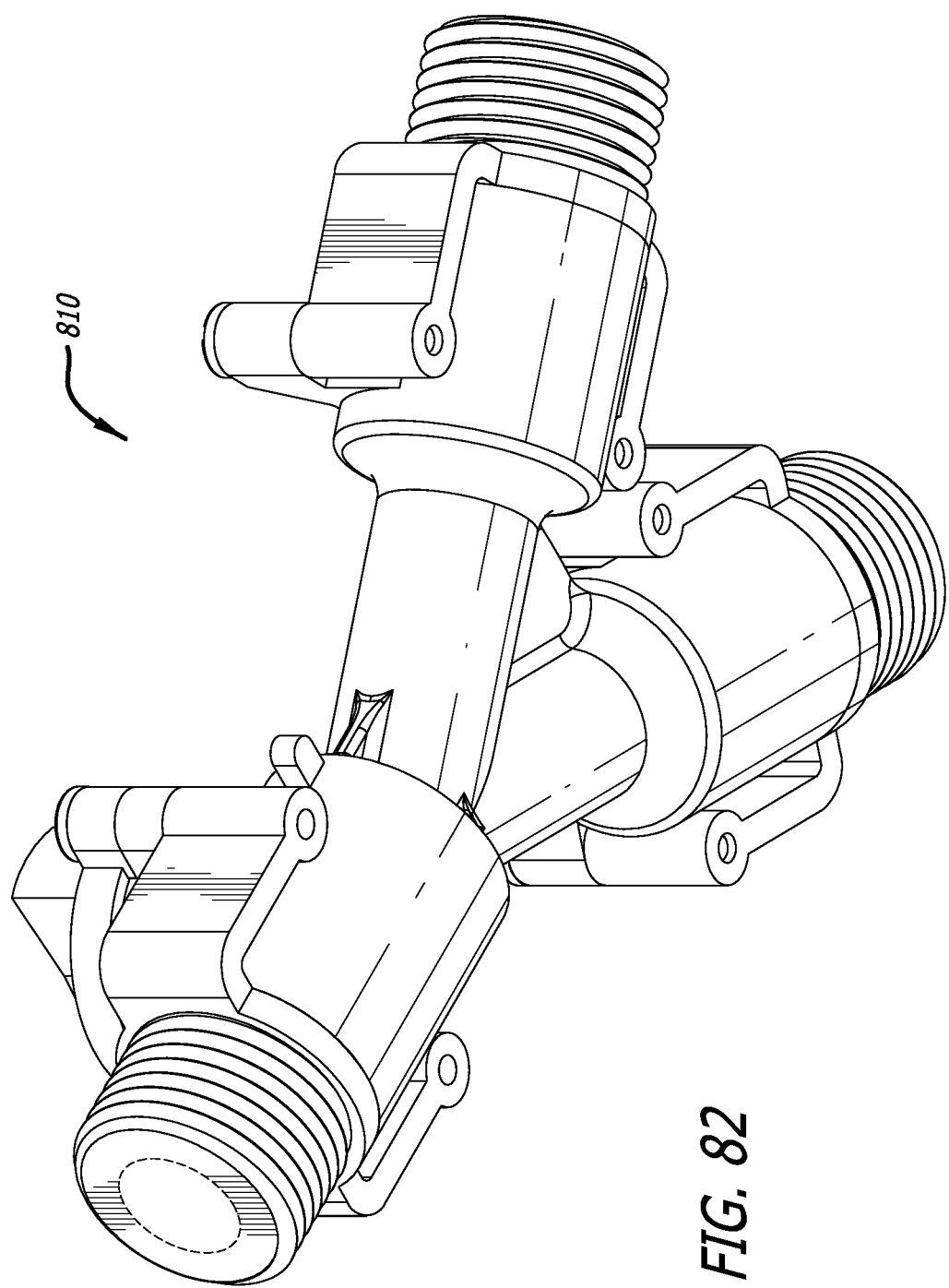
FIG. 82 is rear perspective view thereof.
Figure 83:
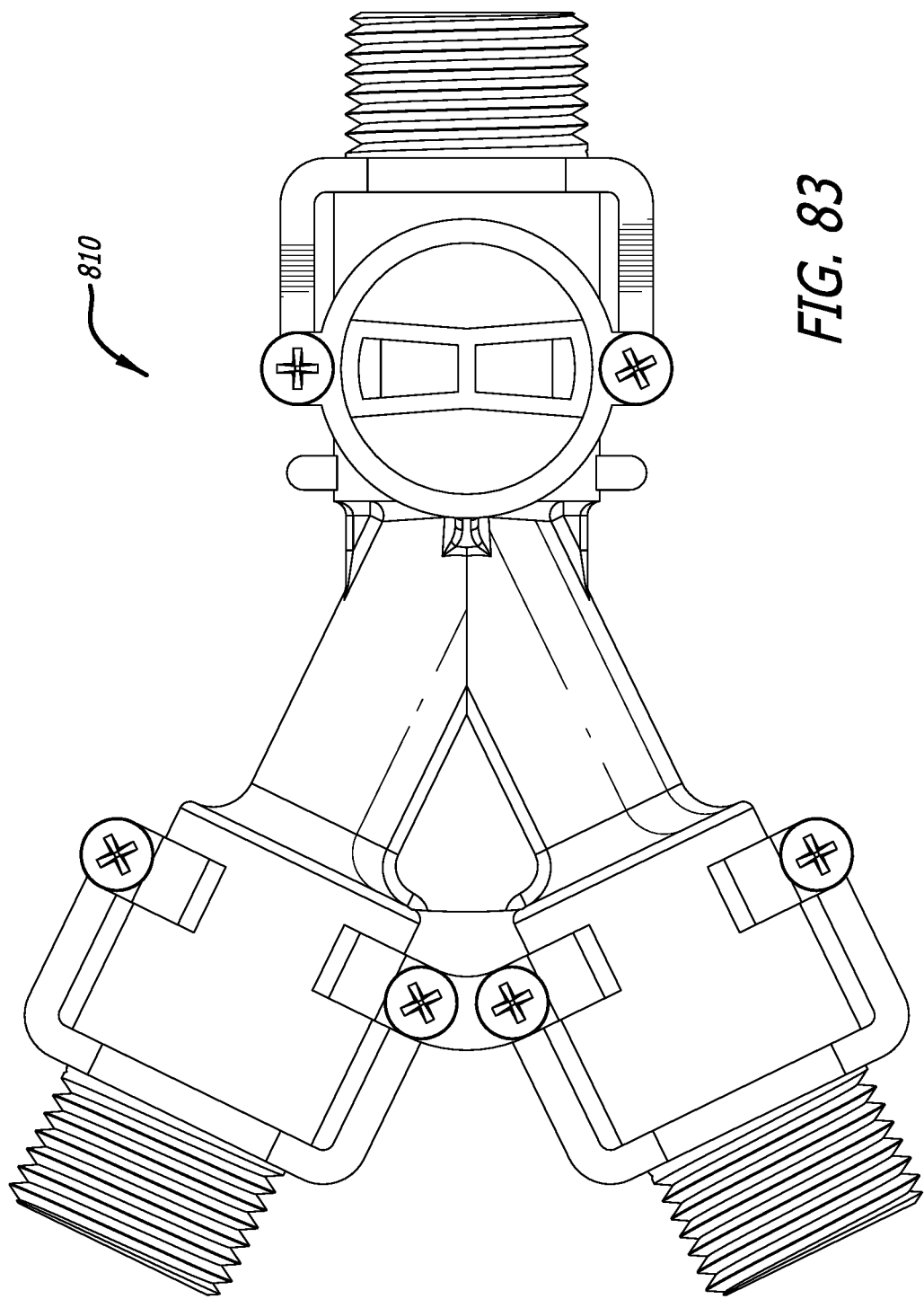
FIG. 83 is a top plan view thereof.
Figure 84:
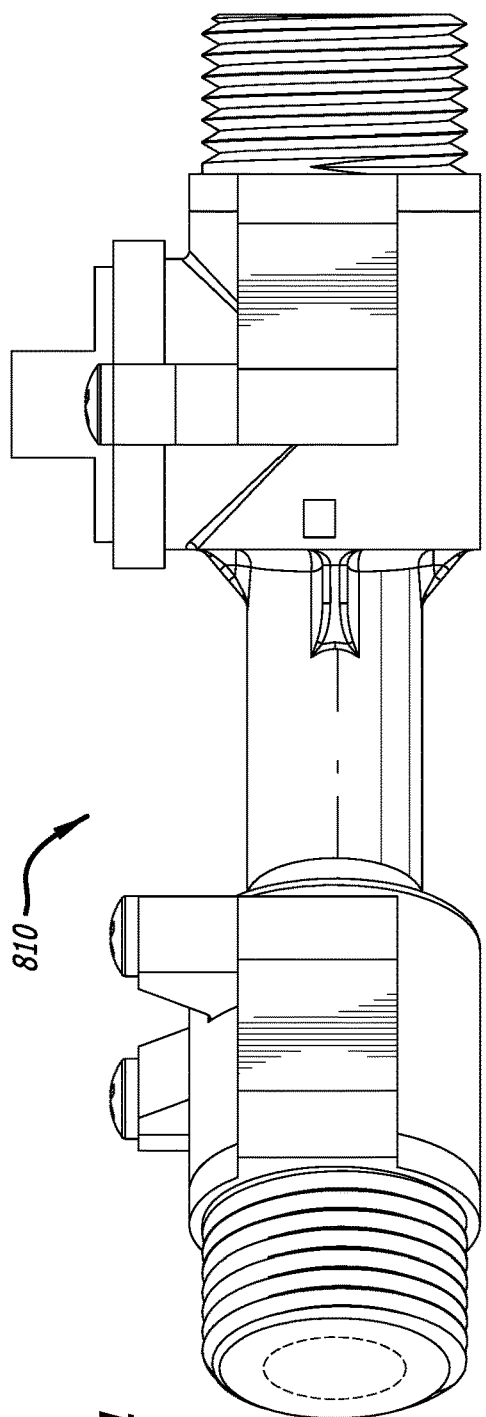
FIG. 84 is a left side elevational view thereof.
Figure 85:
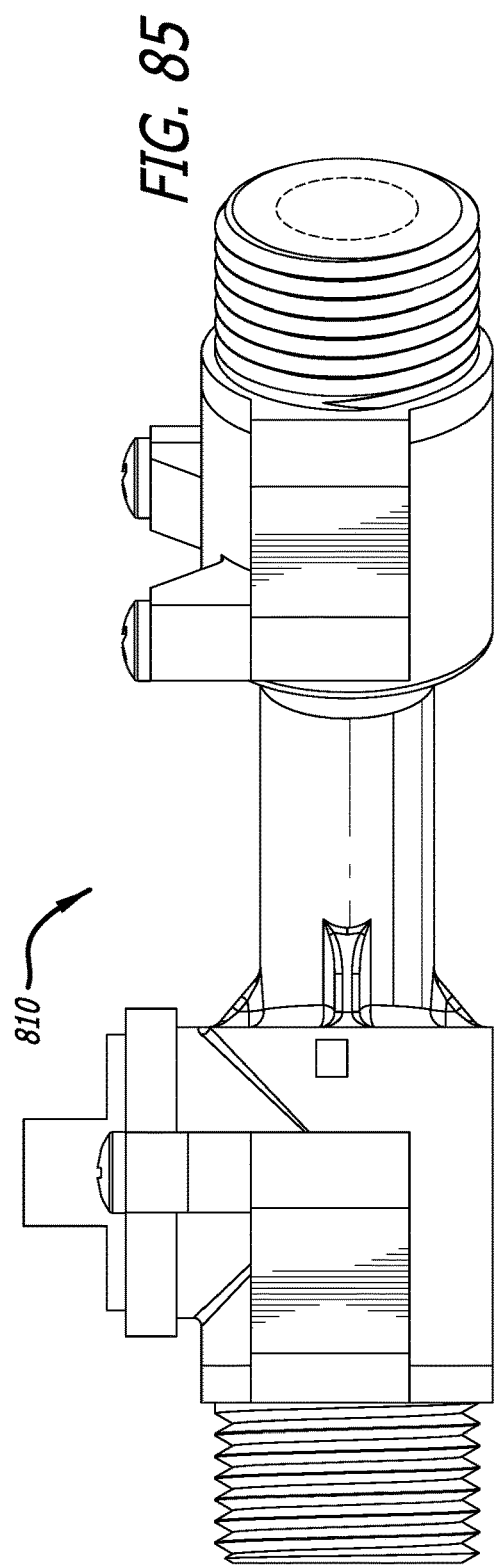
FIG. 85 is a right side elevational view thereof.
Figure 86:
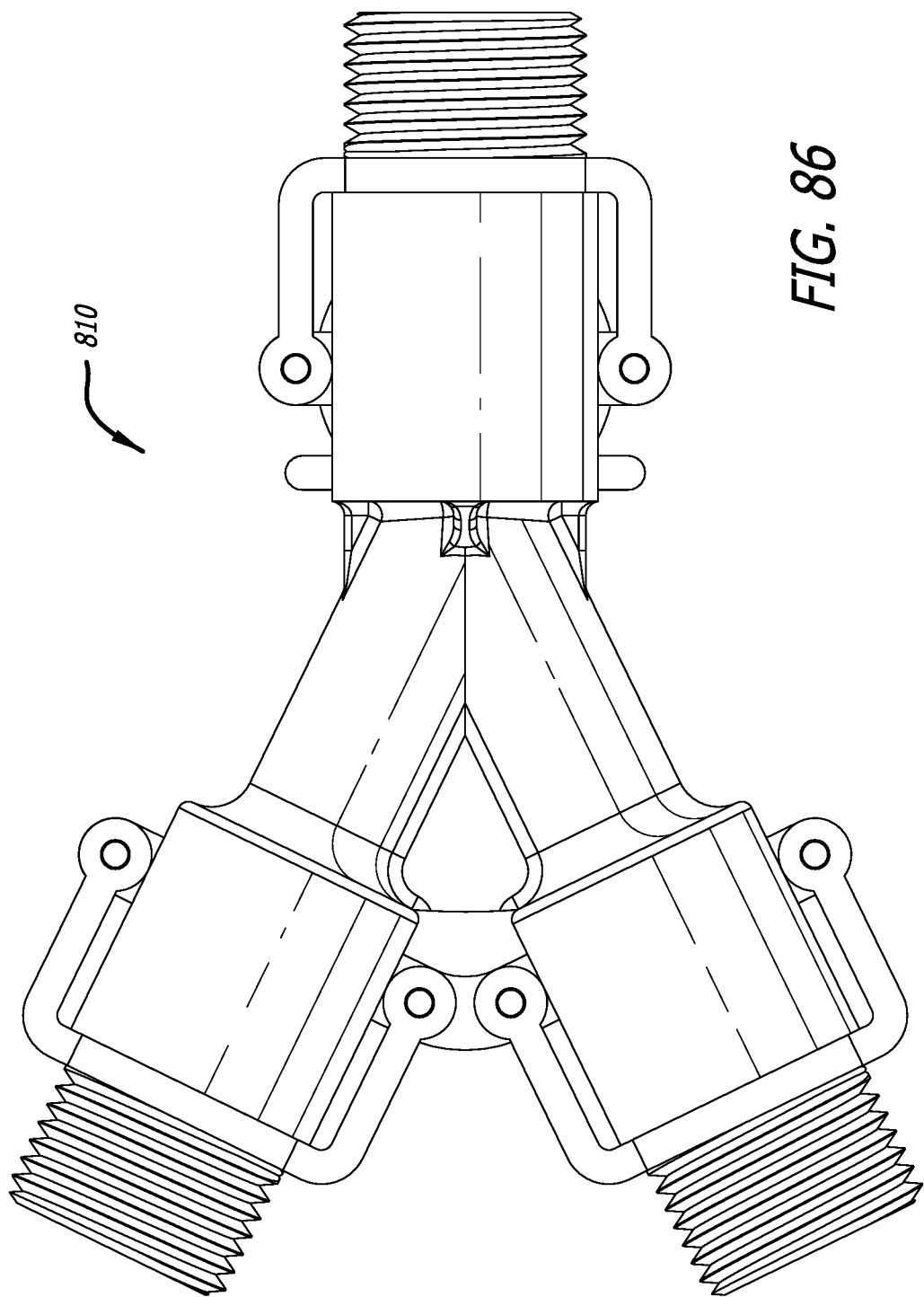
FIG. 86 is a bottom plan view thereof.
Figure 87:
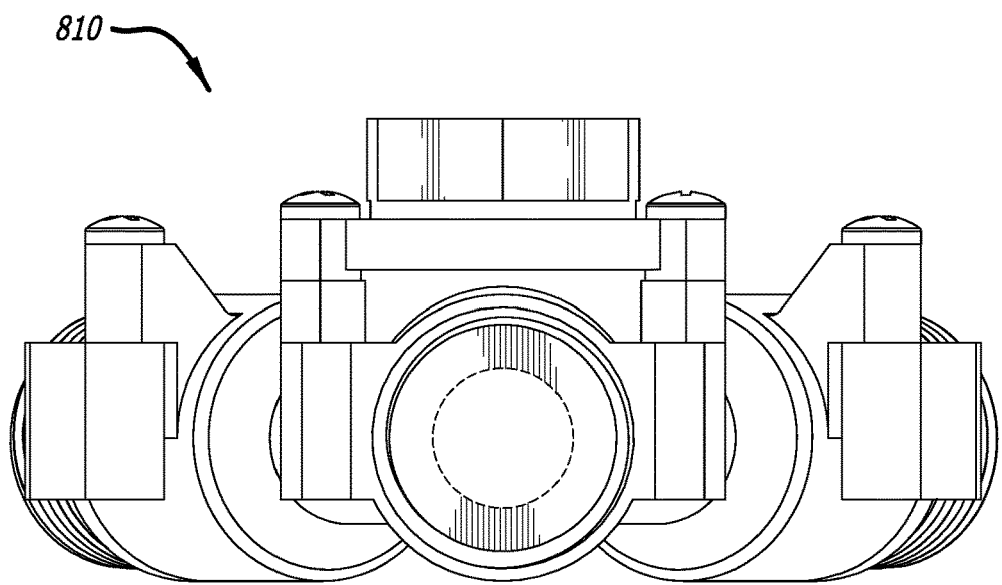
FIG. 87 is a front side elevational view thereof.
Figure 88:
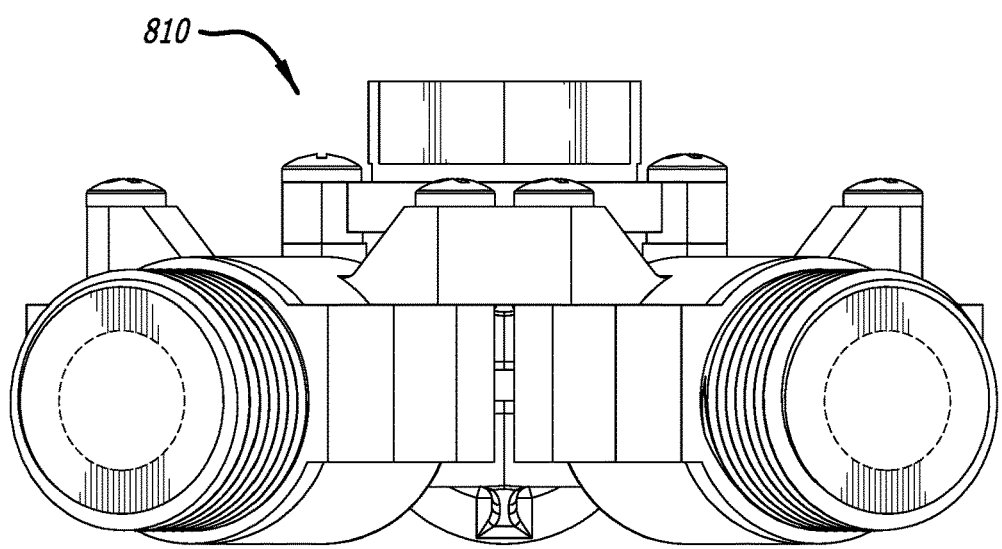
FIG. 88 is a rear side elevational view thereof.
Figure 107:
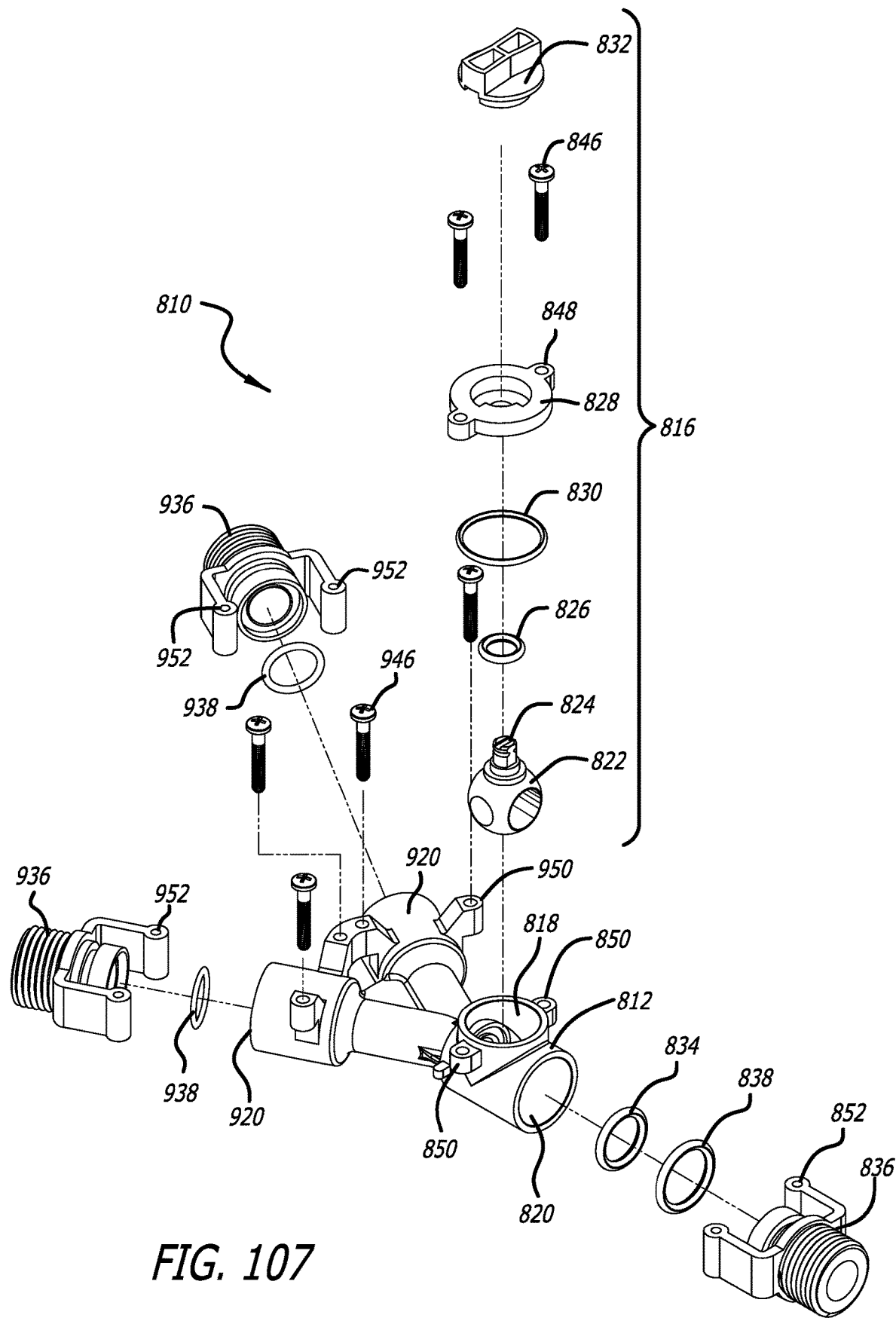
FIG. 107 is an exploded view of the Y-valve manifold with threaded outlet of FIG. 81.

Referring to FIGS. 81-88 and 107, in accordance with a preferred embodiment of the present invention, a Y-manifold 810 is provided for controlling the flow of water to a drip hose 110.

The Y-manifold 810 includes a manifold 812 and valve 816 integrated with the manifold. Each valve 816 includes a top valve inlet 818 and a valve outlet 820. A ball 822 having a stem 824 is received inside each valve 816 through the top valve inlet, and a first inlet seal 826 is received on the stem of each ball. A cap 828 is attached to each valve 816 adjacent to the top valve inlet, and a second inlet seal 830 is received by each cap adjacent to each ball. A handle 832 is attached to each cap opposite each second inlet seal, and the handle receives each stem of each ball. A first outlet seal 834 is also received in each valve outlet.

An outlet fitting 836 is attached to each valve 816 adjacent to each valve outlet 820, and a second outlet seal 838 is received by each outlet fitting. In the preferred embodiment depicted herein, the outlet fitting is illustrated as a ¾" MHT threaded outlet, although other sizes and outlet types may be used according to user preference.

Figure 89:
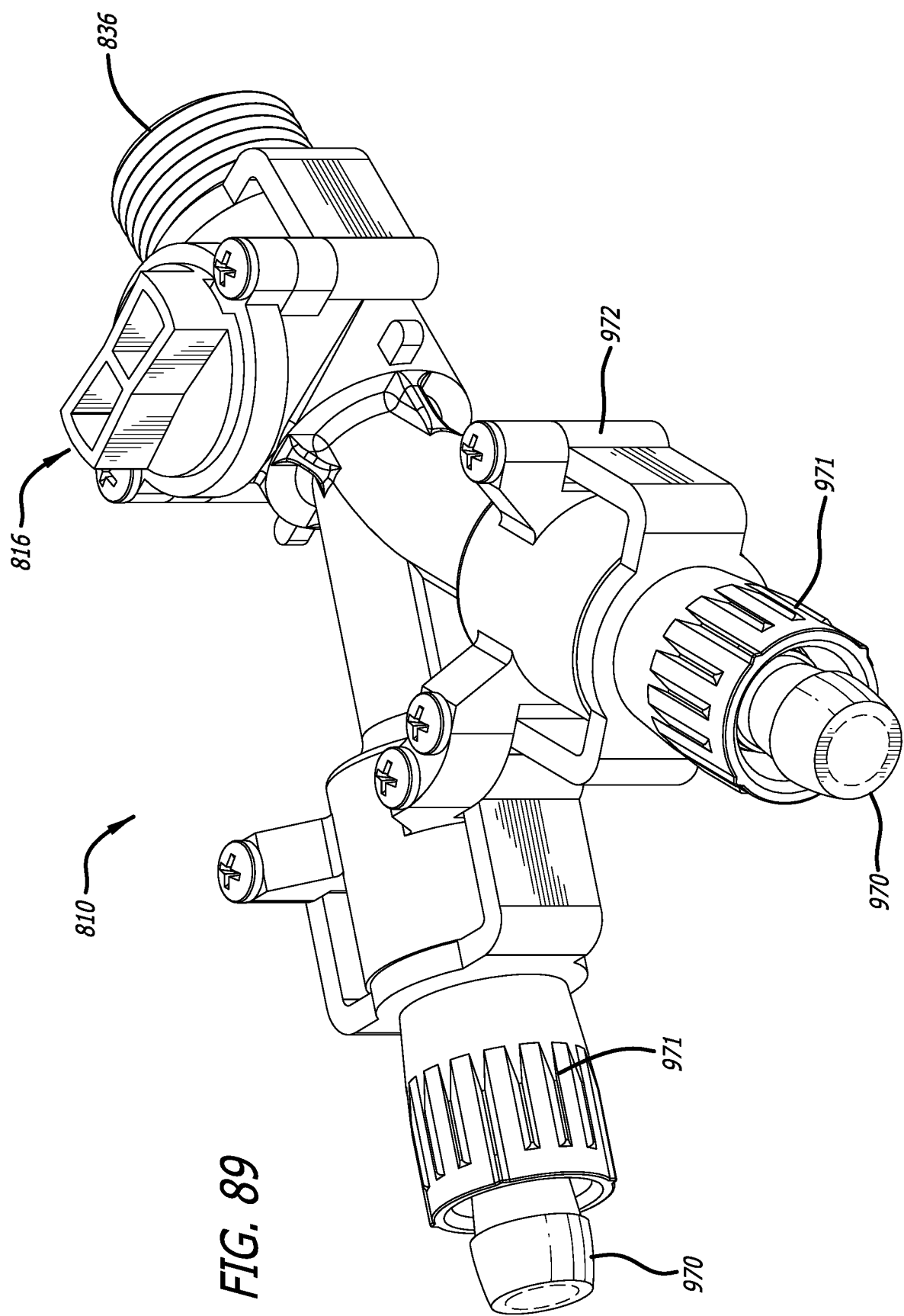
FIG. 89 is a front, perspective view of a Y-valve manifold with tube outlets according to another preferred embodiment of the present invention.
Figure 90:
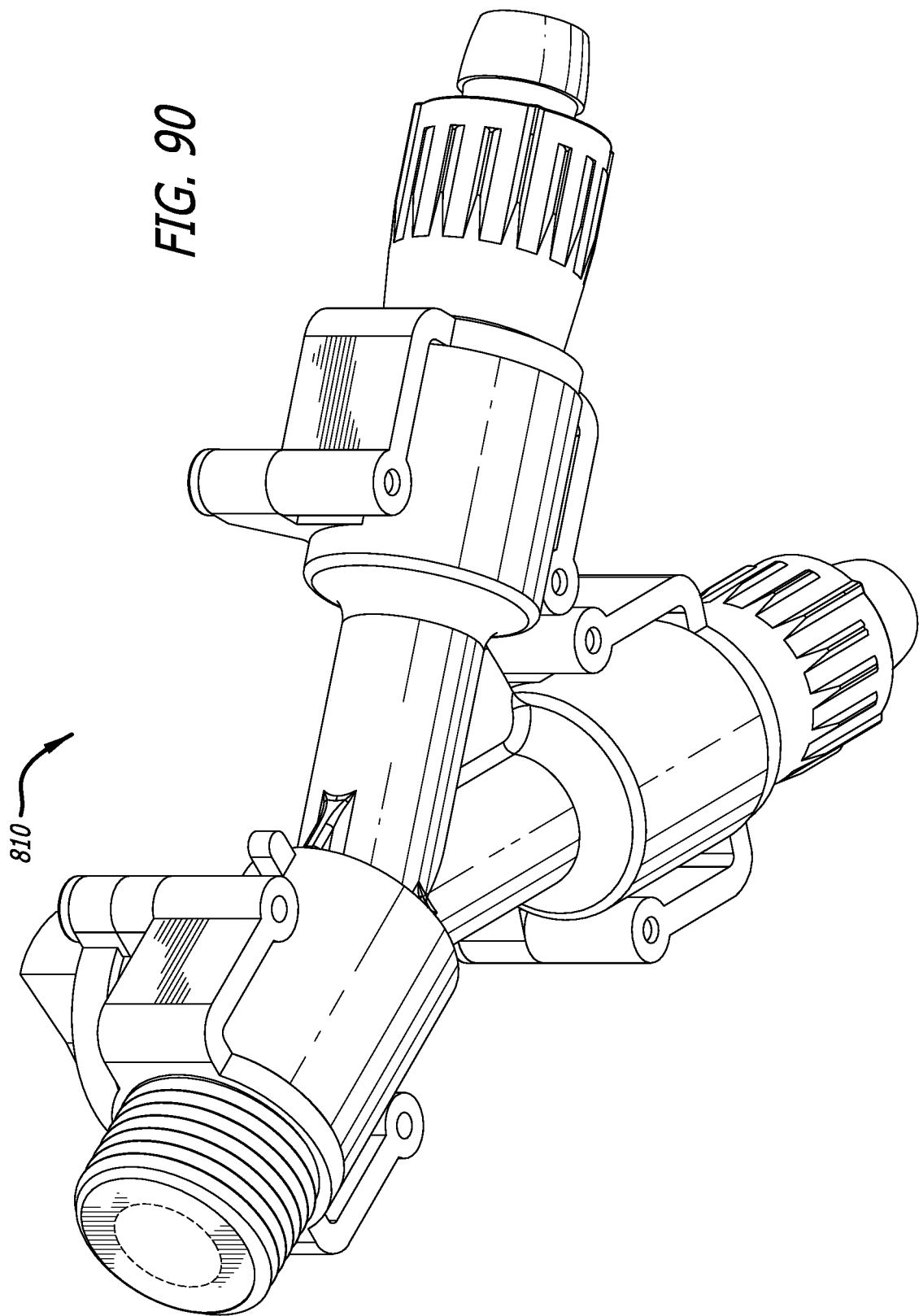
FIG. 90 is rear perspective view thereof.
Figure 91:
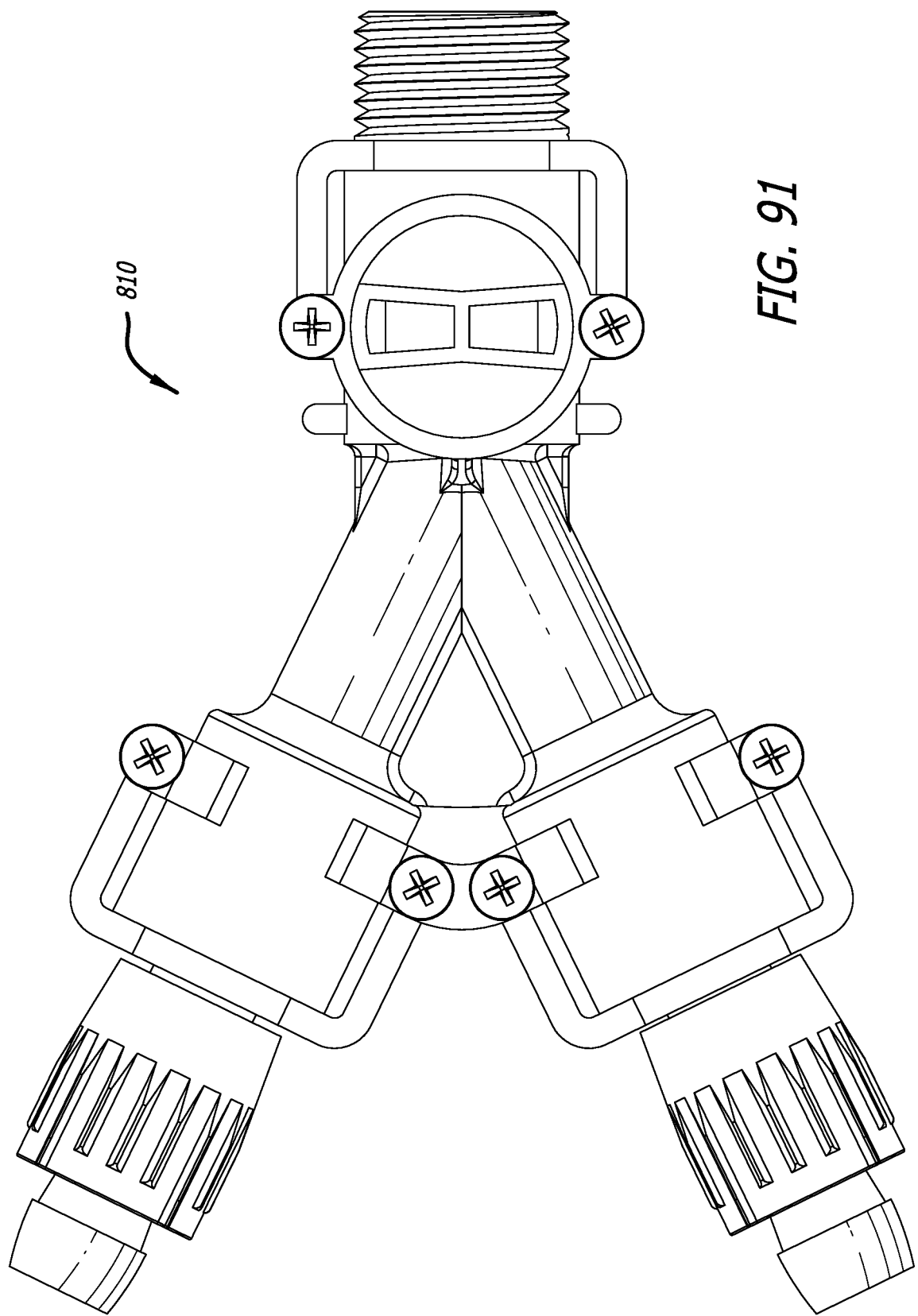
FIG. 91 is a top plan view thereof.
Figure 92:
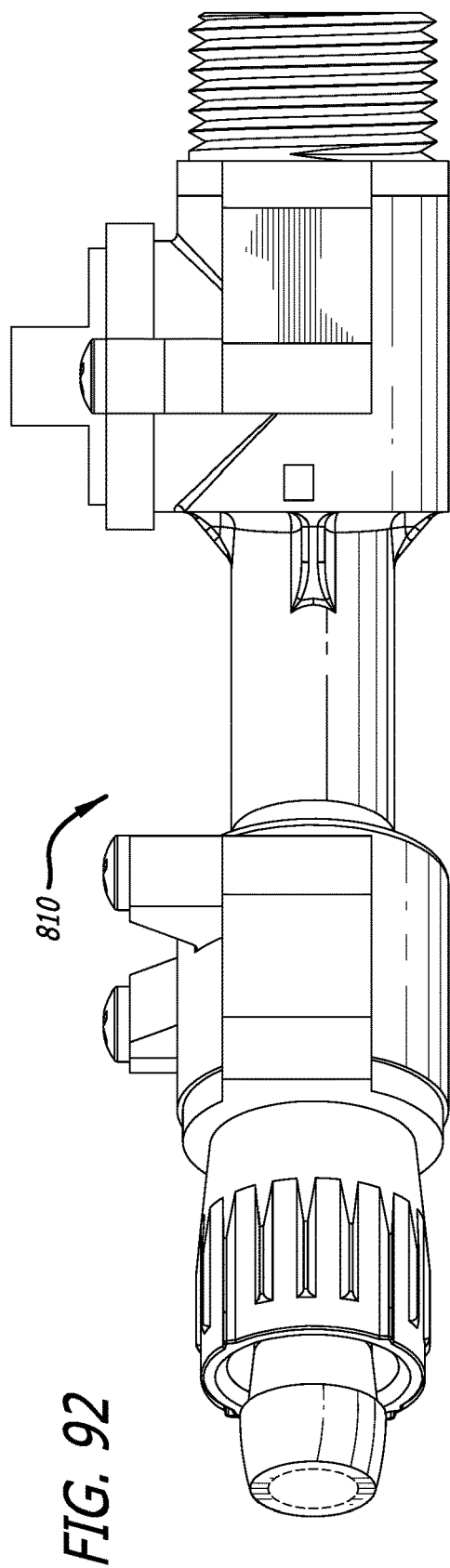
FIG. 92 is a left side elevational view thereof.
Figure 93:
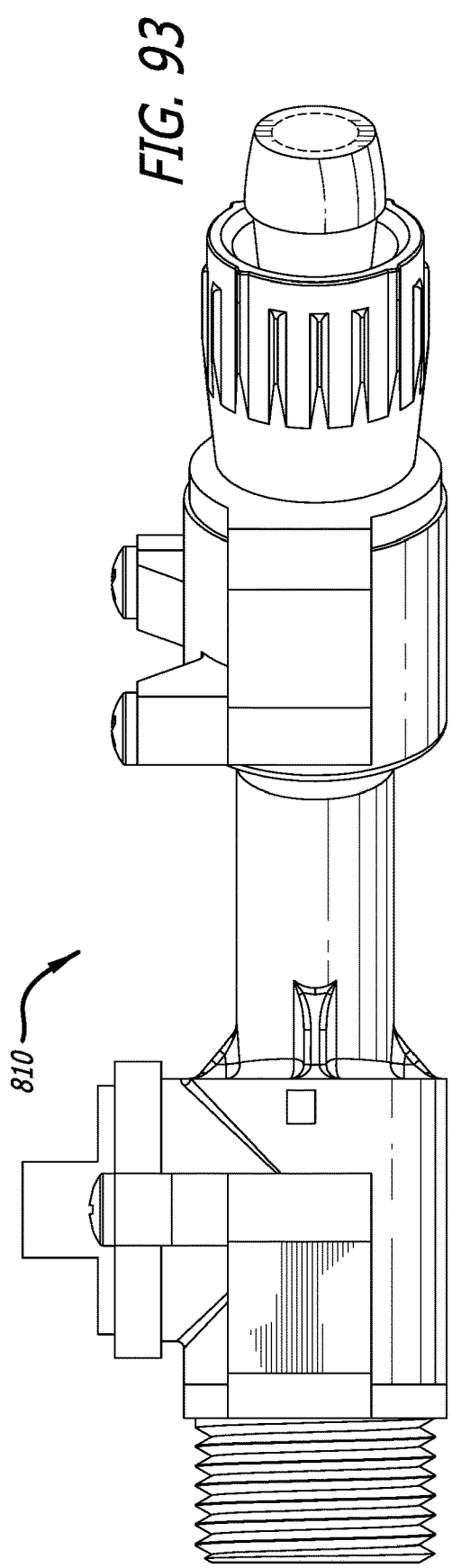
FIG. 93 is a right side elevational view thereof.
Figure 94:
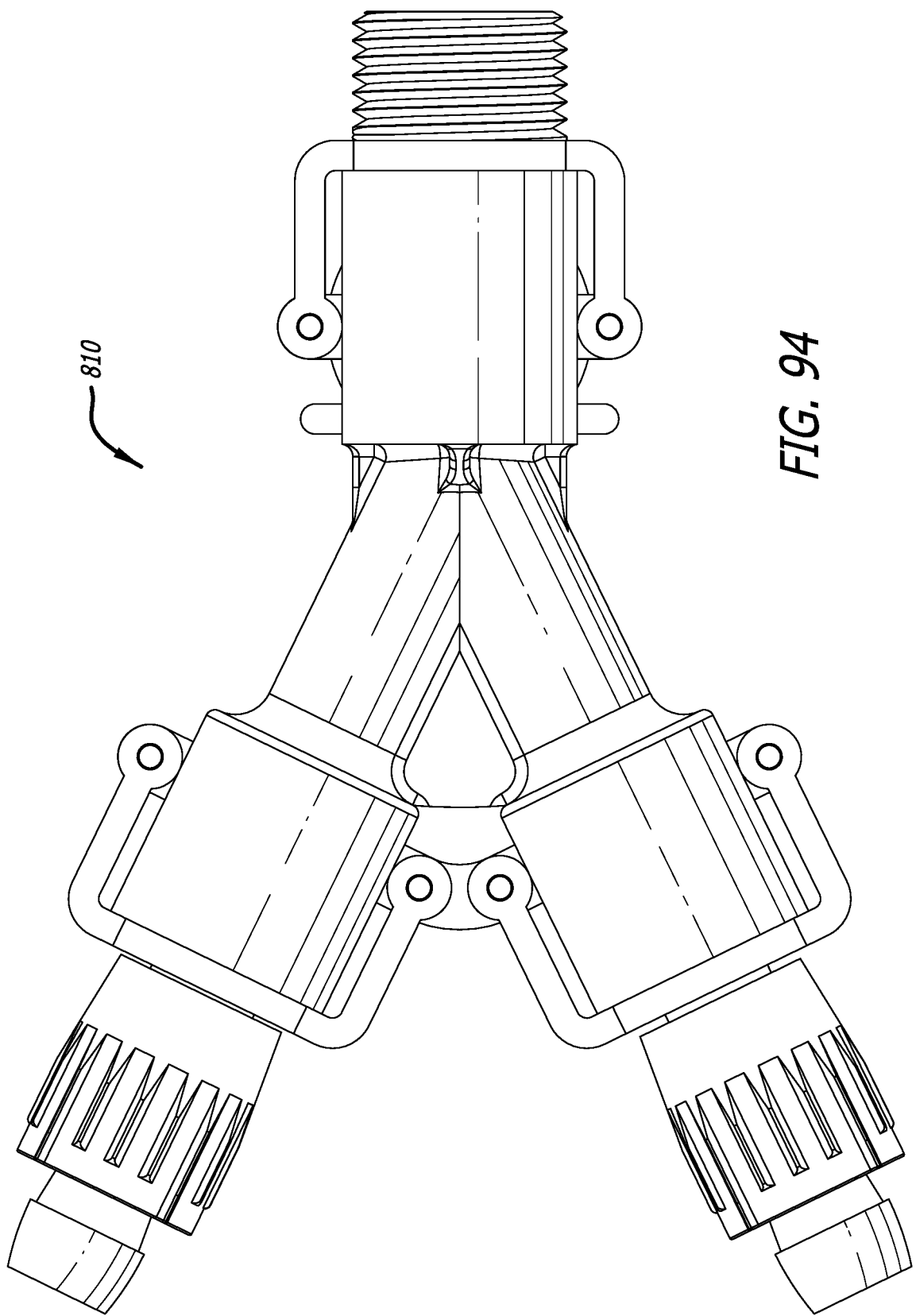
FIG. 94 is a bottom plan view thereof.
Figure 95:
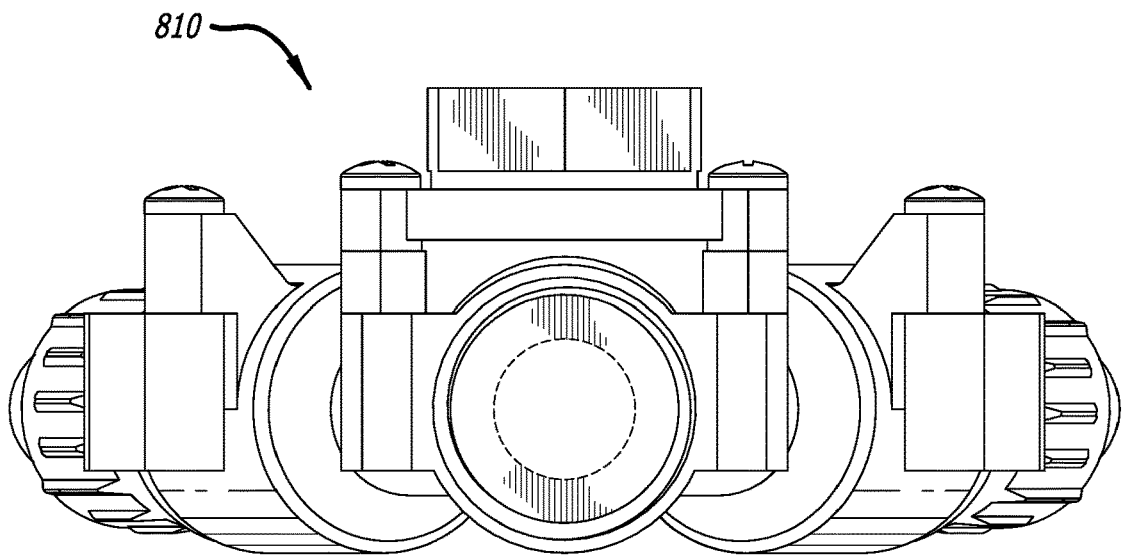
FIG. 95 is a front side elevational view thereof.
Figure 96:
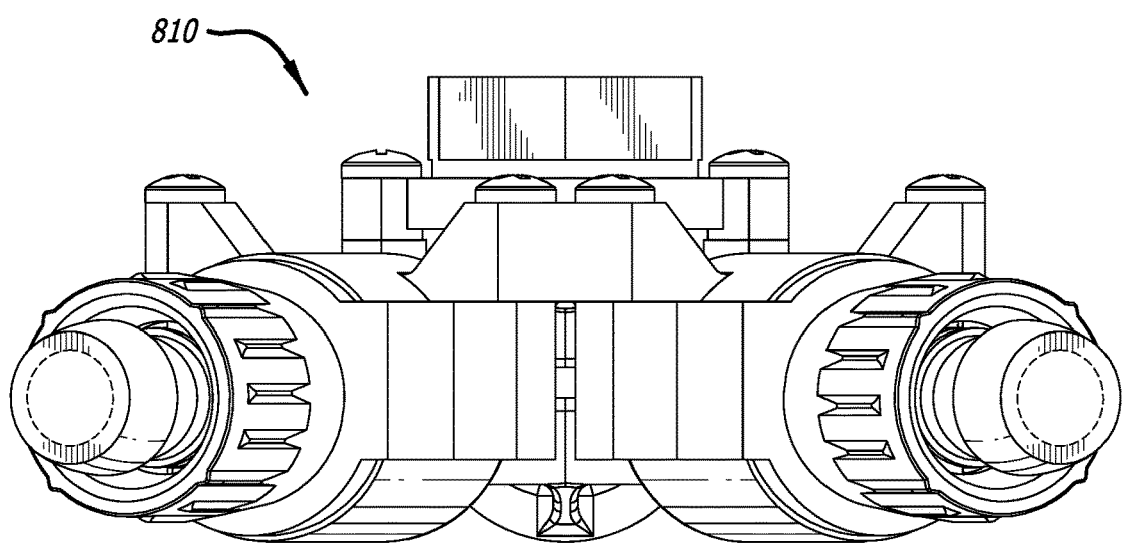
FIG. 96 is a rear side elevational view thereof.
Figure 108:
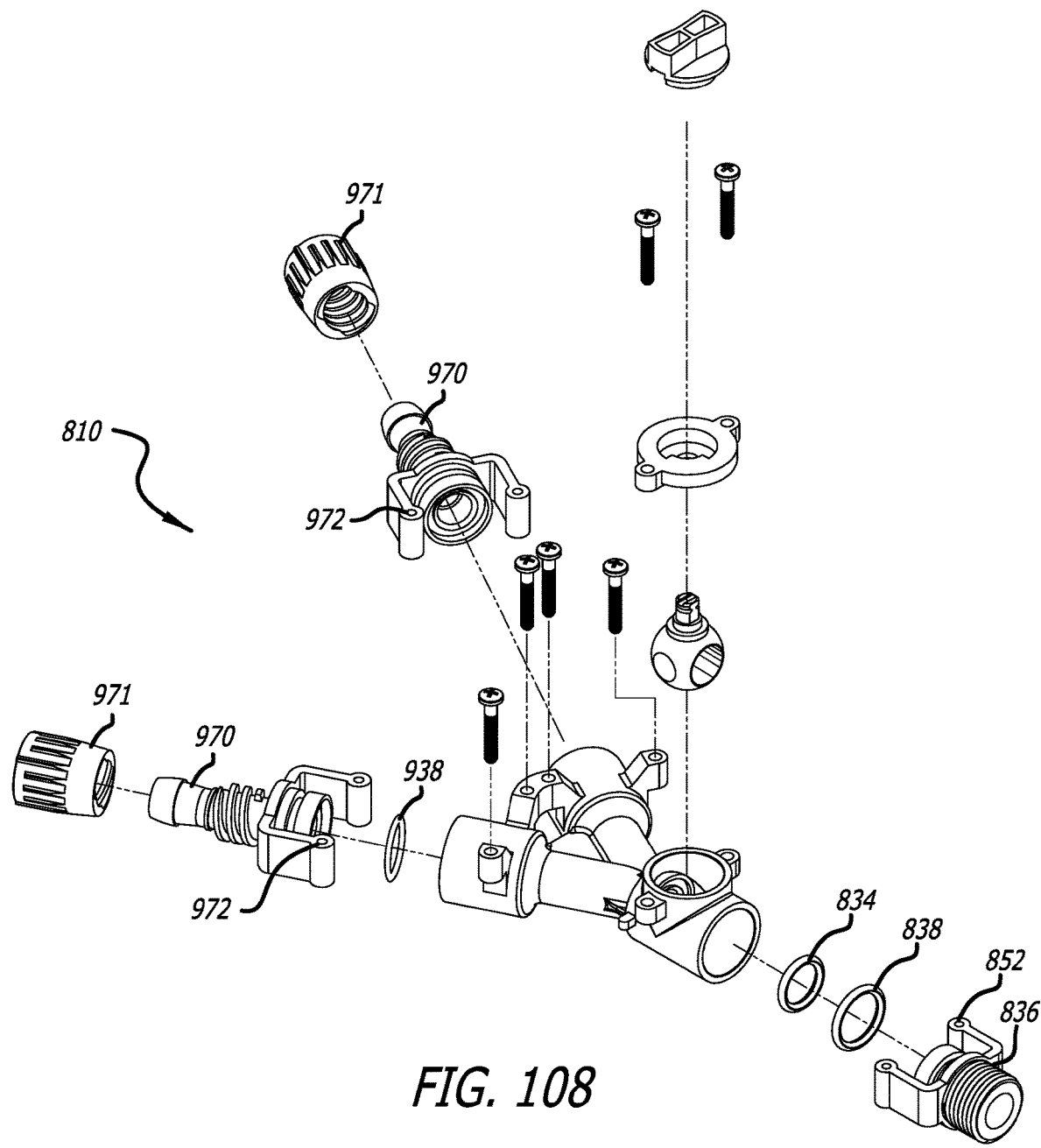
FIG. 108 is an exploded view of the Y-valve manifold with tube outlet of FIG. 89.

The Y-manifold further includes two manifold outlets 920 opposite the valve 816. A manifold outlet fitting 936 is attached to each manifold outlet. Moreover, a manifold outlet seal 938 is received by each manifold outlet fitting. In the preferred embodiment depicted herein, the manifold outlet fitting 936 is illustrated as a ¾" MHT threaded outlet identical to that of outlet fitting 836, although other sizes and outlet types may be used according to user preference. For example, in the Y-manifold 810 illustrated in FIGS. 89-96 and 108, each threaded manifold outlet fitting 936 has been switched out and replaced with a tube outlet fitting 970 and threaded outlet cap 971 in which each outlet fitting 970 is received.

In preferred aspects of the present invention, each ball 822 includes a through bore 840 allowing for bidirectional water flow through the valve, and includes a side 842 which abuts each first outlet seal 834. Moreover, each first inlet seal 826, second inlet seal 830, first outlet seal 834, and second outlet seal 838 can be O-rings or any type of seal known to one of ordinary skill in the art.

In the preferred embodiment illustrated herein, the cap 828 is simultaneously fastened to the valve 816 and to the outlet fitting 836. In particular, each valve 816 includes two fasteners 846 such as screws, bolts, or the like. Each cap includes two flanges each having a cap aperture 848 configured to receive the fasteners 846. Each valve 816 further includes two flanges each having a valve aperture 850 correspondingly aligned with the cap apertures which also receive the fasteners 846. Additionally, each outlet fitting includes two flanges each having a fitting aperture 852 correspondingly aligned with the valve apertures which further receive the fasteners 846.

The manifold outlet fittings 936 can be fastened to the manifold 812 similarly using a set of fasteners 946 such as screws, bolts, or the like. Each manifold outlet 920 includes two flanges each having a manifold aperture 950 configured to receive the fasteners 946. Each manifold outlet fitting further includes two flanges each having a fitting aperture 952 corresponding aligned with the manifold apertures which also receive the fasteners 946.

In this way, the ball valve 810 allows for each set of fasteners 846 to hold each cap 828 and outlet fitting 836 in place, and allows for each set of fasteners 946 to hold each manifold outlet fitting 936 in place, while also allowing each manifold outlet fitting to be easily replaced with other desired fittings. For example, each threaded manifold outlet fitting 936 illustrated herein may be replaced with the tube outlet fitting 970, which itself can be fastened to each ball valve 810 similarly through its own two flanges with fitting apertures 972. Additionally, the ball valve 810 thus facilitates repair of either the valves or outlet fittings in the field, since a user can simply unfasten one or more sets of screws 846, 946 to repair a defective part therein. Although the preferred embodiment uses two screws inserted in multiple sets of flanges and apertures for each valve, any number of screws or other fasteners or fastening mechanisms can be used, for example threads, connecting pins, or the like.

In any of the above-described preferred embodiments, the manifold can have side inlet (e.g. side inlet 690 in four-way ball valve 610, or side inlet 790 in six-way ball valve 710) which allows a filter screen to be installed in the middle of the manifold, without the need for additional fittings.

Although many embodiments have been described and depicted herein, the invention is not limited to those descriptions and depictions unless expressly stated. Rather, it is apparent that a person of ordinary skill in the art would appreciate many modifications and substitutions, and that the scope of the present invention is intended to include all such modifications and substitutions. Accordingly, the scope of the present invention is properly measured by the words of the appended claims using their plain and ordinary meaning.

I claim:

1. A ball valve for controlling the flow of water to a drip hose, comprising:
  a cylindrical manifold having an axial centerline, the cylindrical manifold including a manifold inlet configured to attach to a riser hose; and
  first and second valves integrated with the manifold, said first and second valves concentrically aligned along a common valve axis and said first and second valves aligned perpendicular to the manifold centerline, said first and second valves each including:
    a cylindrical valve body comprising a valve inlet and a valve outlet, a cylindrical hatch oriented transverse with the common valve axis and defining a valve hatch opening, the cylindrical valve body further comprising first and second diametrically opposed lugs outside the cylindrical hatch including holes for receiving a respective fastener;
    a spherical ball disposed in the respective first and second valves at the cylindrical hatch, the spherical ball having a through hole alignable with the common valve axis and adapted for rotation within said valve, the spherical ball having a stem extending into the cylindrical hatch;
    a first inlet seal received on the stem of the ball;
    a collar mounted over the valve hatch opening at the first and second lugs via first and second fasteners;
    a handle mounted on the collar and directly engaging said stem of said spherical ball for rotation of said spherical ball within said respective first and second valve body; and
    a valve outlet fitting including first and second arm members with apertures adapted to align with the lugs on the valve body and receive a respective fastener therein for locking the valve outlet fitting onto the valve;

whereby the valve outlet fitting connects to the respective first and second valve outlet without a threaded engagement therebetween.

2. The ball valve of claim 1, wherein the spherical ball allows for bidirectional water flow.

3. The ball valve of claim 1, wherein the outlet fitting includes a threaded outlet opposite the connection with the respective first and second valve.

4. The ball valve of claim 1, wherein the manifold inlet is attached to a reducing coupler.

\* \* \* \* \*